United States Patent
Munakata et al.

(10) Patent No.: US 8,894,488 B2
(45) Date of Patent: Nov. 25, 2014

(54) GAMING MACHINE AND GAMING SYSTEM HAVING CONTROL LEVER

(71) Applicants: Universal Entertainment Corporation, Koto-ku, Tokyo (JP); Aruze Gaming America, Inc., Las Vegas, NV (US)

(72) Inventors: Hiroki Munakata, Tokyo (JP); Gou Miyamoto, Tokyo (JP); Daisyun Okamoto, Tokyo (JP); Kensaku Yoshikawa, Tokyo (JP); Kazuo Okada, Tokyo (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 20 days.

(21) Appl. No.: 13/987,301

(22) Filed: Sep. 21, 2012

(65) Prior Publication Data

US 2014/0141880 A1    May 22, 2014

(51) Int. Cl.
*A63F 13/20* (2014.01)

(52) U.S. Cl.
CPC ..................................... *A63F 13/06* (2013.01)
USPC ........................................................... 463/31

(58) Field of Classification Search
CPC ....... G06F 3/033; G06F 3/038; G06F 3/0383; G05G 9/047; A63F 13/06
USPC .......................... 273/148 B; 345/161; 463/31
See application file for complete search history.

(56) References Cited

U.S. PATENT DOCUMENTS

| | | | |
|---|---|---|---|
| 6,589,117 B1 * | 7/2003 | Moritome et al. ............. | 463/37 |
| 6,722,976 B2 | 4/2004 | Adams | |
| 6,966,837 B1 * | 11/2005 | Best ............................... | 463/33 |
| 8,602,895 B2 * | 12/2013 | Fujisawa et al. ................ | 463/37 |
| 2002/0065127 A1 * | 5/2002 | Kamimura et al. ............. | 463/20 |
| 2002/0151360 A1 * | 10/2002 | Durham et al. ................. | 463/30 |
| 2003/0073492 A1 * | 4/2003 | Tosaki et al. .................... | 463/37 |
| 2005/0133650 A1 * | 6/2005 | Stiner et al. .................... | 242/223 |
| 2010/0178983 A1 * | 7/2010 | Marufuji ......................... | 463/37 |
| 2011/0032219 A1 * | 2/2011 | Aoyama et al. ................ | 345/184 |
| 2011/0223999 A1 * | 9/2011 | Tsujino et al. .................. | 463/37 |
| 2011/0244962 A1 * | 10/2011 | Kidakarn ........................ | 463/36 |
| 2012/0115607 A1 * | 5/2012 | Fujisawa et al. ................ | 463/32 |

(Continued)

*Primary Examiner* — William M Brewster
*Assistant Examiner* — Jason Skaarup
(74) *Attorney, Agent, or Firm* — KMF Patent Services, PLLC; Kenneth M. Fagin, Esq.; S. Peter Konzel, Esq.

(57) ABSTRACT

A gaming machine includes a control lever gripped by a player, a display configured to display an effect image, and a controller programmed to execute a predetermined process. The control lever includes a rotation axis, a reel handle configured to rotate the rotation axis, a rotation sensor configured to detect the number of rotation of the rotation axis, and a rotation resistance imparting unit configured to impart resistance to the rotation axis such that the torque increases in accordance with the rotational speed in one direction of the rotation axis. In accordance with the game status of the game, the controller causes the rotation sensor to detect the number of rotation of the rotation axis which is rotated as the reel handle of the control lever is rotated, and changes the content of the effect image displayed on the display in accordance with the detected number of rotation.

5 Claims, 82 Drawing Sheets

(56) References Cited

U.S. PATENT DOCUMENTS

| | | | |
|---|---|---|---|
| 2012/0115611 A1* | 5/2012 | Munakata et al. | 463/42 |
| 2012/0115612 A1* | 5/2012 | Munakata et al. | 463/42 |
| 2012/0115613 A1* | 5/2012 | Munakata et al. | 463/42 |
| 2012/0115614 A1* | 5/2012 | Munakata et al. | 463/42 |
| 2013/0040719 A1* | 2/2013 | Fujisawa et al. | 463/16 |
| 2013/0040723 A1 | 2/2013 | Fujisawa et al. | |
| 2013/0084983 A1* | 4/2013 | Masumi et al. | 463/37 |
| 2014/0057721 A1* | 2/2014 | Loose et al. | 463/37 |

* cited by examiner

FIG.11

LEVER POSITION DETERMINING TABLE

| LEVER POSITION | DETECTED MAGNETIC FORCE VALUES |
|---|---|
| START POINT | ND78 |
| FIRST POSITION | ND84 |
| SECOND POSITION | ND90 |
| THIRD POSITION | ND96 |
| FOURTH POSITION | ND102 |
| ... | ... |
| END POINT | ND126 |

FIG.15

BASE GAME SYMBOL TABLE

| CODE NUMBERS | RANDOM NUMBERS | FIRST COLUMN SYMBOLS | SECOND COLUMN SYMBOLS | THIRD COLUMN SYMBOLS | FOURTH COLUMN SYMBOLS | FIFTH COLUMN SYMBOLS |
|---|---|---|---|---|---|---|
| 0 | 0-3277 | J | SPECIFIC SYMBOL | A | Q | J |
| 1 | 3278-6555 | Q | A | J | J | A |
| 2 | 6556-9833 | ANGELFISH | Q | ANGELFISH | ANGELFISH | ANGELFISH |
| 3 | 9834-13111 | J | CLOWNFISH | TUNA | ANGELFISH | J |
| 4 | 13112-16389 | Q | TUNA | COELACANTH | Q | A |
| 5 | 16390-19667 | COELACANTH | SPECIFIC SYMBOL | ANGELFISH | ANGELFISH | ANGELFISH |
| 6 | 19668-22945 | A | ANGELFISH | SPECIFIC SYMBOL | A | COELACANTH |
| 7 | 22946-26223 | CLOWNFISH | CLOWNFISH | A | K | SPECIFIC SYMBOL |
| 8 | 26224-29501 | TUNA | K | J | CLOWNFISH | K |
| 9 | 29502-32779 | CLOWNFISH | COELACANTH | CLOWNFISH | Q | CLOWNFISH |
| 10 | 32780-36057 | A | SPECIFIC SYMBOL | A | CLOWNFISH | Q |
| 11 | 36058-39335 | Q | A | Q | TUNA | ANGELFISH |
| 12 | 39336-42613 | TUNA | CLOWNFISH | CLOWNFISH | SPECIFIC SYMBOL | K |
| 13 | 42614-45891 | COELACANTH | CLOWNFISH | K | K | CLOWNFISH |
| 14 | 45892-49169 | K | J | ANGELFISH | TUNA | TUNA |
| 15 | 49170-52447 | A | TUNA | Q | CLOWNFISH | J |
| 16 | 52448-55725 | CLOWNFISH | TUNA | SPECIFIC SYMBOL | A | SPECIFIC SYMBOL |
| 17 | 55726-59003 | J | ANGELFISH | A | CLOWNFISH | CLOWNFISH |
| 18 | 59004-62281 | Q | SPECIFIC SYMBOL | CLOWNFISH | ANGELFISH | TUNA |
| 19 | 62282-65535 | ANGELFISH | SPECIFIC SYMBOL | TUNA | COELACANTH | Q |

RANGE OF RANDOM NUMBERS: 0-65535

FIG.16

BASE GAME QUALIFICATION TIME AWARDING TABLE

| PAYOUT RATES | NUMBER OF ACTIVATED PAYLINES | | | | |
|---|---|---|---|---|---|
| | 1 | 2 | 3 | 5 | 10 |
| 1 | 5 | 0 | 0 | 0 | 0 |
| 2 | 0 | 5 | 0 | 0 | 0 |
| 3 | 0 | 0 | 5 | 0 | 0 |
| 4 | 0 | 0 | 0 | 0 | 0 |
| 5 | 0 | 0 | 0 | 5 | 0 |
| 6 | 0 | 0 | 0 | 0 | 0 |
| 7 | 0 | 0 | 0 | 0 | 0 |
| 8 | 0 | 0 | 0 | 0 | 0 |
| 9 | 0 | 0 | 0 | 0 | 0 |
| 10 | 0 | 0 | 0 | 0 | 5 |

FIG.17

GAME QUALIFICATION TIME MANAGEMENT TABLE

| PAYOUT RATES | GAMING TERMINAL | | | | | |
|---|---|---|---|---|---|---|
| | 10a | 10b | 10c | 10d | 10e | 10f |
| 1 | 6 | 30 | 0 | 6 | 41 | 1 |
| 2 | 12 | 2 | 0 | 0 | 20 | 1 |
| 3 | 18 | 1 | 0 | 0 | 3 | 3 |
| 4 | 6 | 0 | 0 | 0 | 6 | 4 |
| 5 | 0 | 0 | 0 | 0 | 2 | 2 |
| 6 | 0 | 0 | 0 | 0 | 7 | 14 |
| 7 | 0 | 0 | 0 | 0 | 9 | 10 |
| 8 | 0 | 0 | 0 | 0 | 12 | 2 |
| 9 | 0 | 0 | 0 | 0 | 2 | 0 |
| 10 | 0 | 0 | 0 | 0 | 6 | 0 |
| ... | ... | ... | ... | ... | ... | ... |

FIG.18

| PAYOUT RATES | UPPER LIMIT OF ACCUMULATION |
|---|---|
| 1 OR HIGHER | 40 |
| 2 OR HIGHER | 40 |
| 3 OR HIGHER | 40 |
| 4 OR HIGHER | 40 |
| 5 OR HIGHER | 40 |
| 6 OR HIGHER | 40 |
| 7 OR HIGHER | 40 |
| 8 OR HIGHER | 40 |
| 9 OR HIGHER | 40 |
| 10 OR HIGHER | 40 |

FIG.19

ACCUMULATION CALCULATION TABLE

| PAYOUT RATES | ... | 5 | 4 | 3 | 2 | 1 |
|---|---|---|---|---|---|---|
| BEFORE-AWARDED GAME QUALIFICATION TIME | ... | 0 | 6 | 16 | 14 | 2 |
| TO-BE-AWARDED GAME QUALIFICATION TIME | ... | 0 | 0 | 5 | 0 | 0 |
| AWARDED GAME QUALIFICATION TIME | ... | 0 | 6 | 21 | 14 | 2 |
| ACCUMULATION OF AWARDED GAME QUALIFICATION TIME | ... | 0 | 6 | 27 | 41 | 43 |
| ACCUMULATION UPPER LIMIT OF QUALIFICATION TIMES | ... | 40 | 40 | 40 | 40 | 40 |
| VALUE EXCEEDING THE ACCUMULATION UPPER LIMIT OF QUALIFICATION TIMES | ... | 0 | 0 | 0 | 1 | 2 |
| VALUE FROM WHICH VALUE EXCEEDING THE ACCUMULATION UPPER LIMIT OF QUALIFICATION TIMES IS SUBTRACTED | ... | 0 | 6 | 21 | 13 | 0 |

FIG.20

QUICK CATCH BONUS NORMAL PAYOUT TABLE

| BENEFIT | NUMBER OF ACTIVATED PAYLINES | | | | |
|---|---|---|---|---|---|
| | 1 | 2 | 3 | 5 | 10 |
| GAME QUALIFICATION TIME AWARDED FOR ONE BET | 311 | 0 | 0 | 0 | 0 |
| GAME QUALIFICATION TIME AWARDED FOR TWO BETS | 0 | 311 | 0 | 0 | 0 |
| GAME QUALIFICATION TIME AWARDED FOR THREE BETS | 0 | 0 | 311 | 0 | 0 |
| GAME QUALIFICATION TIME AWARDED FOR FIVE BETS | 0 | 0 | 0 | 311 | 0 |
| GAME QUALIFICATION TIME AWARDED FOR TEN BETS | 0 | 0 | 0 | 0 | 311 |
| LOSING | 17727 | 17727 | 17727 | 17727 | 17727 |
| TOTAL | 18038 | 18038 | 18038 | 18038 | 18038 |

RANGE OF RANDOM NUMBERS:1-18038

FIG.21

QUICK CATCH BONUS SPECIAL PAYOUT TABLE

|  | NUMBER OF ACTIVATED PAYLINES | | | | |
|---|---|---|---|---|---|
| TYPE OF BENEFIT | 1 | 2 | 3 | 5 | 10 |
| GAME QUALIFICATION TIME AWARDED FOR ONE BET | 471 | 160 | 160 | 160 | 160 |
| GAME QUALIFICATION TIME AWARDED FOR TWO BETS | 80 | 391 | 80 | 80 | 80 |
| GAME QUALIFICATION TIME AWARDED FOR THREE BETS | 0 | 0 | 311 | 0 | 0 |
| GAME QUALIFICATION TIME AWARDED FOR FIVE BETS | 0 | 0 | 0 | 311 | 0 |
| GAME QUALIFICATION TIME AWARDED FOR TEN BETS | 0 | 0 | 0 | 0 | 311 |
| LOSING | 17487 | 17487 | 17487 | 17487 | 17487 |
| TOTAL | 18038 | 18038 | 18038 | 18038 | 18038 |

RANGE OF RANDOM NUMBERS:1-18038

FIG.24

INDEPENDENT SPECIAL GAME QUALIFICATION TIME AWARDING TABLE

| PAYOUT RATES | NUMBER OF ACTIVATED PAYLINES | | | | |
|---|---|---|---|---|---|
| | 1 | 2 | 3 | 5 | 10 |
| 1 | 29 | 0 | 0 | 0 | 0 |
| 2 | 5 | 30 | 0 | 0 | 0 |
| 3 | 0 | 4 | 29 | 0 | 0 |
| 4 | 0 | 0 | 3 | 0 | 0 |
| 5 | 0 | 0 | 0 | 30 | 0 |
| 6 | 0 | 0 | 0 | 0 | 0 |
| 7 | 0 | 0 | 0 | 0 | 0 |
| 8 | 0 | 0 | 0 | 0 | 0 |
| 9 | 0 | 0 | 0 | 0 | 0 |
| 10 | 0 | 0 | 0 | 0 | 27 |

FIG.26

BONUS TYPE TABLE

| BONUS TYPES | UNIT PAYOUT AMOUNTS | RANKS |
|---|---|---|
| BLUE MARLIN | 10000 | 1 |
| BLUE FIN TUNA | 5000 | 2 |
| DOLPHIN FISH | 4000 | 2 |
| NAPOLEON FISH | 3000 | 2 |
| YELLOW FIN TUNA | 2000 | 3 |
| WAHOO | 1500 | 3 |
| BLACK SEA BASS | 1500 | 3 |
| HALIBUT | 1000 | 4 |
| ... | ... | ... |

FIG.27

INDEPENDENT SPECIAL GAME PROBABILITY TABLE

| RANDOM NUMBERS | WINNING BONUS TYPES |
|---|---|
| 0-9 | BLUE MARLIN |
| 10-19 | BLUE FIN TUNA |
| 20-22 | DOLPHIN FISH |
| 23-25 | NAPOLEON FISH, BLACK SEA BASS |
| 26-48 | YELLOW FIN TUNA, HALIBUT |
| 49-116 | WAHOO, BLACK SEA BASS |
| 117-210 | BLACK SEA BASS, HALIBUT |
| 211-293 | WAHOO, BLACK SEA BASS, HALIBUT |
| ... | ... |

RANGE OF RANDOM NUMBERS : 0-65535

FIG.29

MYSTERY BONUS START RANDOM DETERMINATION TABLE

|  | NUMBER OF ACTIVATED PAYLINES | | | | |
|---|---|---|---|---|---|
| MYSTERY BONUS | 1 | 2 | 3 | 5 | 10 |
| OCCURRENCE | 0-1 | 0-2 | 0-3 | 0-4 | 0-5 |
| EFFECT ONLY | 2-5 | 3-8 | 4-11 | 5-14 | 6-17 |
| NON-OCCURRENCE | 6-299 | 9-299 | 12-299 | 15-299 | 18-299 |

RANGE OF RANDOM NUMBERS: 0-299

FIG.30

MYSTERY BONUS PROBABILITY TABLE

| RANDOM NUMBERS | WINNING BONUS TYPES |
|---|---|
| 0-1 | BLUE MARLIN |
| 2-5 | BLUE FIN TUNA |
| 6-11 | DOLPHIN FISH |
| 12-19 | NAPOLEON FISH |
| 20-29 | YELLOW FIN TUNA |
| 30-40 | WAHOO |
| 41-53 | BLACK SEA BASS |
| 54-67 | HALIBUT |
| ... | ... |

RANGE OF RANDOM NUMBERS : 0-5000

FIG.32

| COMMON GAME OCCURS | 0-3 |
|---|---|
| COMMON GAME DOES NOT OCCUR | 4-1214 |

RANGE OF RANDOM NUMBERS: 0-1214

FIG.33

| FIRST COMMON GAME | 9-96 |
|---|---|
| SECOND COMMON GAME (PROGRESSIVE BONUS GAME) | 97-109 |

RANGE OF RANDOM NUMBERS: 0-109

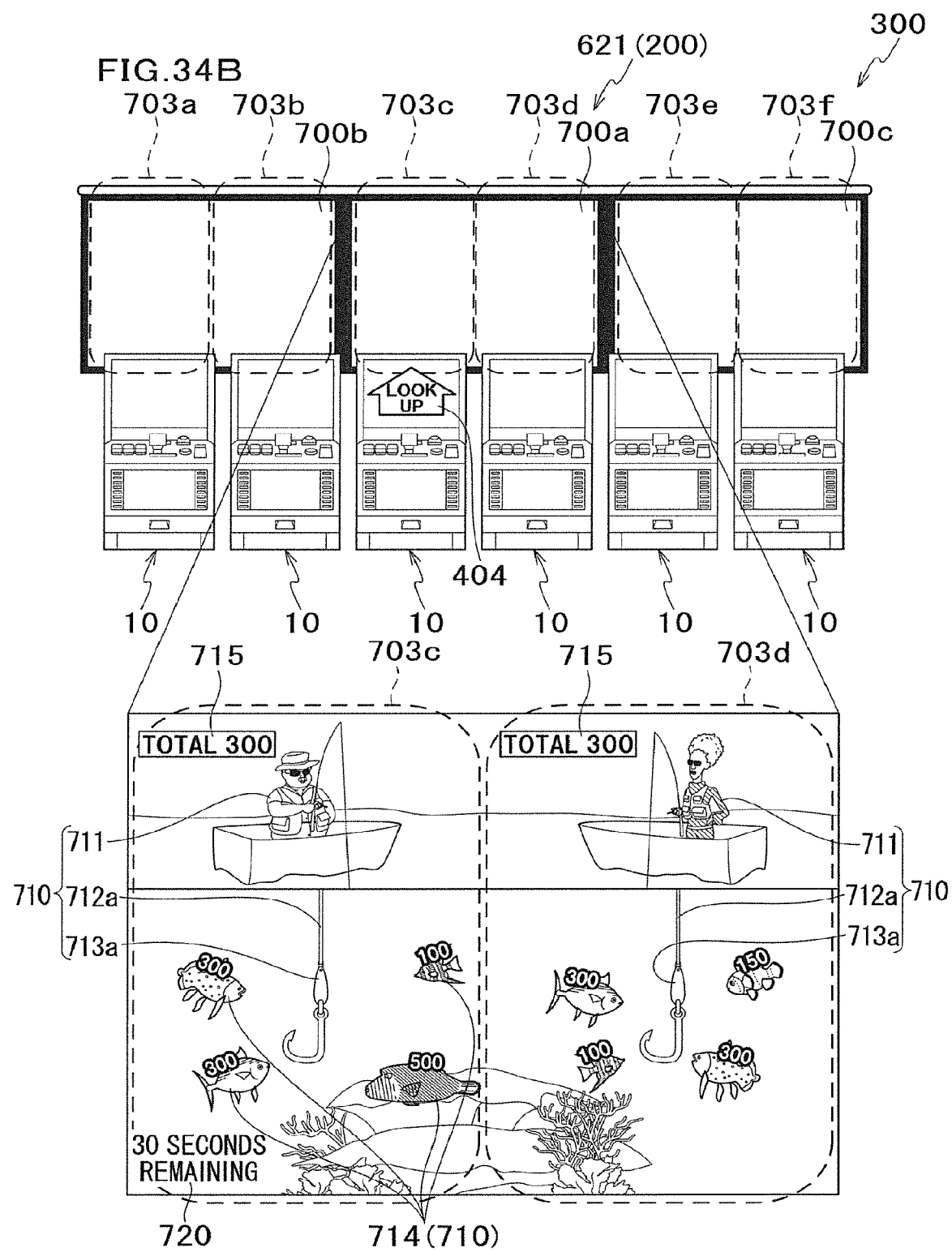

FIG.39A

LEVEL SELECTION TABLE　　　　　　　　　　　　　　　　Da20

| TYPE (SIZE) OF FISH | LEVEL 1 | LEVEL 2 | LEVEL 3 | LEVEL 4 | FISH HOOKING TIME |
|---|---|---|---|---|---|
| SMALL | 0 TIME | 1-10 TIMES | 11-15 TIMES | 16 TIMES OR MORE | 6.5(sec) |
| MIDDLE AND LARGE | 0 TIME | 1-15 TIMES | 16-25 TIMES | 26 TIMES OR MORE | 12(sec) |
| EXTRA LARGE AND SUBSPECIES | 0 TIME | 1-20 TIMES | 21-30 TIMES | 31 TIMES OR MORE | 18(sec) |

FIG.39B

FAILURE EFFECT DETERMINATION TABLE　　　　　　　　Da30

|  | LEVEL 1 | LEVEL 2 | LEVEL 3 | LEVEL 4 |
|---|---|---|---|---|
| COLOR OF FAILURE OBJECT IMAGE | BLUE | BLUE | YELLOW | RED |
| VOLUME | MINIMUM | SMALL | MIDDLE | LARGE |

FIG.40

| GAME PROGRESS DETERMINATION TABLE | Da10 |
|---|---|
| TOTAL PAYOUT AMOUNT | FISHING GAME PROGRESS DATA |
| 1000 | FISHING GAME PROGRESS DATA (Da101a,Da101b,Da101c) |
| 600 | FISHING GAME PROGRESS DATA (Da102a,Da102b,Da102c) |
| 300 | FISHING GAME PROGRESS DATA (Da103a,Da103b,Da103c) |

FIG.41A

| | TYPE (SIZE) OF FISH | RESULT OF FISHING | PAYOUT AMOUNT | TIMING TO START FISHING | FISH HOOK TIMING | FISH HOOKING TIME |
|---|---|---|---|---|---|---|
| FIRST FISHING | LARGE | FAILURE | 0 | s1(sec) | s11(sec) | 12(sec) |
| SECOND FISHING | EXTRA LARGE | SUCCESS | 500 | s2(sec) | s12(sec) | 18(sec) |
| THIRD FISHING | EXTRA LARGE | SUCCESS | 500 | s3(sec) | s13(sec) | 18(sec) |

| | TYPE (SIZE) OF FISH | RESULT OF FISHING | PAYOUT AMOUNT | TIMING TO START FISHING | FISH HOOK TIMING | FISH HOOKING TIME |
|---|---|---|---|---|---|---|
| FIRST FISHING | LARGE | SUCCESS | 300 | s4(sec) | s14(sec) | 12(sec) |
| SECOND FISHING | SMALL | FAILURE | 0 | s5(sec) | s15(sec) | 6.5(sec) |
| THIRD FISHING | EXTRA LARGE | FAILURE | 0 | s6(sec) | s16(sec) | 18(sec) |
| FOURTH FISHING | LARGE | SUCCESS | 33 | s7(sec) | s17(sec) | 12(sec) |

| | TYPE (SIZE) OF FISH | RESULT OF FISHING | PAYOUT AMOUNT | TIMING TO START FISHING | FISH HOOK TIMING | FISH HOOKING TIME |
|---|---|---|---|---|---|---|
| FIRST FISHING | EXTRA LARGE | FAILURE | 0 | s7(sec) | s17(sec) | 18(sec) |
| SECOND FISHING | EXTRA LARGE | FAILURE | 0 | s8(sec) | s18(sec) | 18(sec) |
| THIRD FISHING | LARGE | SUCCESS | 300 | s9(sec) | s19(sec) | 12(sec) |

VIBRATION PATTERN TABLE

| IDENTIFICATION INFORMATION | VIBRATION PATTERN |
|---|---|
| 0001 | HIGH VIBRATION |
| 0002 | MIDDLE VIBRATION |
| 0003 | LOW VIBRATION |
| ... | ... |

FIG.43A

DISPLAY PATTERN TABLE

| IDENTIFICATION INFORMATION | DISPLAY PATTERN |
|---|---|
| 0001 | FISH HOOKED IMAGE |
| 0002 | SUCCESS IMAGE |
| 0003 | FAILURE IMAGE |
| ... | ... |

FIG.43B

ILLUMINATION PATTERN TABLE

| IDENTIFICATION INFORMATION | ILLUMINATION PATTERN |
|---|---|
| 0001 | BLINKING IN FOURTH BLINKING PATTERN |
| 0002 | LED IS SUCCESSIVELY TURNED ON FOR PREDETERMINED TIME |
| 0003 | BLINKING IN THIRD BLINKING PATTERN |
| ... | ... |

FIG.57

BASE GAME QUALIFICATION TIME AWARDING TABLE

| PAYOUT RATES | NUMBER OF ACTIVATED PAYLINES | | | | |
|---|---|---|---|---|---|
| | 1 | 2 | 3 | 5 | 10 |
| 1 | 6 | 1 | 1 | 1 | 1 |
| 2 | 0 | 4 | 2 | 1 | 1 |
| 3 | 0 | 1 | 3 | 1 | 1 |
| 4 | 0 | 0 | 1 | 1 | 1 |
| 5 | 0 | 0 | 0 | 4 | 2 |
| 6 | 0 | 0 | 0 | 0 | 1 |
| 7 | 0 | 0 | 0 | 0 | 1 |
| 8 | 0 | 0 | 0 | 0 | 1 |
| 9 | 0 | 0 | 0 | 0 | 1 |
| 10 | 0 | 0 | 0 | 0 | 1 |

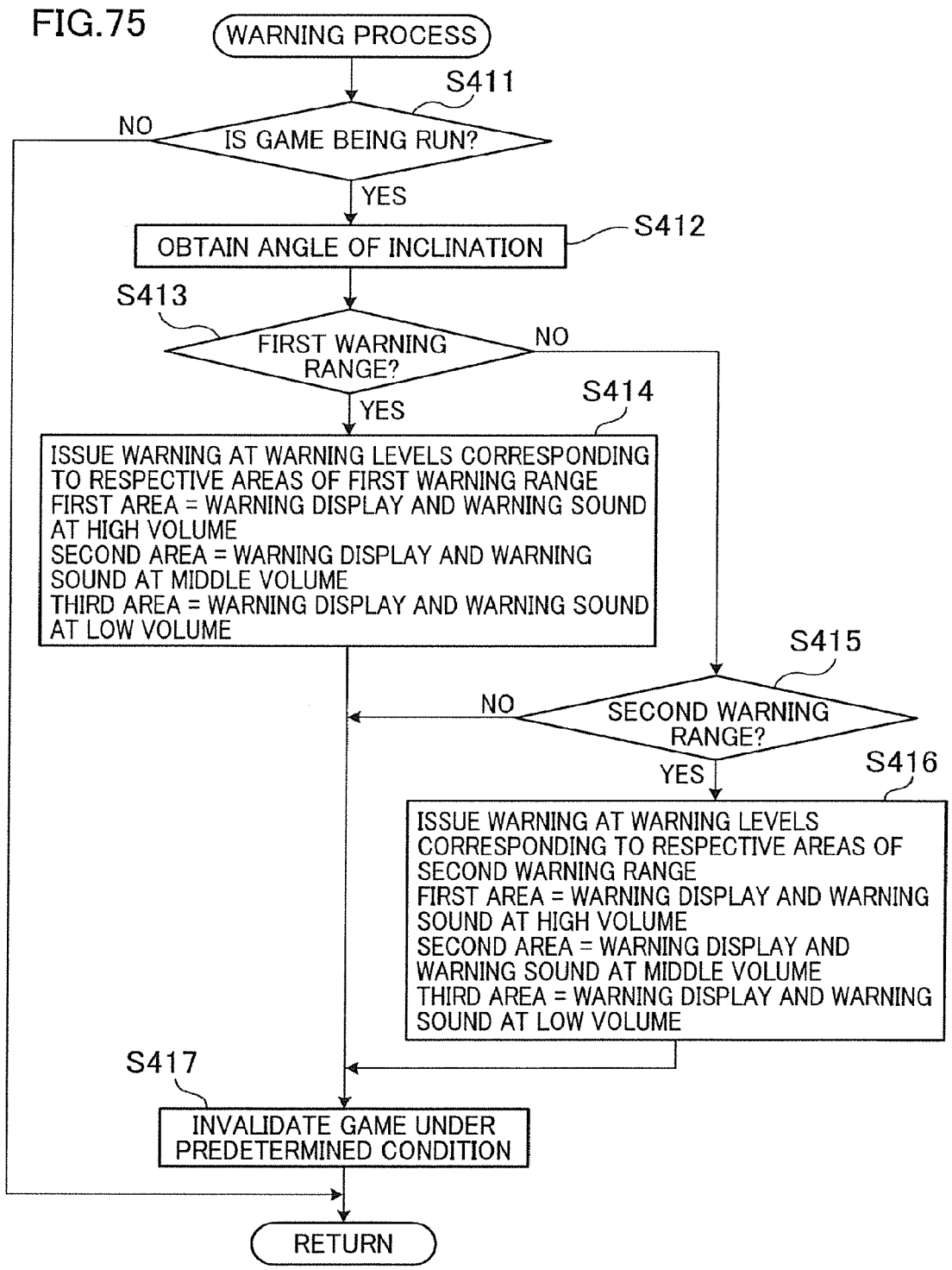

GAMING MACHINE AND GAMING SYSTEM HAVING CONTROL LEVER

BACKGROUND OF THE INVENTION

1. Field of the Invention

The present invention relates to a gaming machine including a control lever and to a gaming system.

2. Description of Related Art

A gaming machine displaying fishing game images has been known. In such a known gaming machine, a game image showing a fishline with a fishhook (e.g., a lure) and fish is displayed on a display, and an image showing that the fish is hooked by the fishhook on the fishline is displayed when a predetermined condition is satisfied. Thereafter, either an image indicating the success in the fishing or an image indicating the success in the fishing is displayed.

In the gaming machine above, it is important to display a game image of fishing that induces the player to feel as if he/she is actually playing fishing, to enhance the excitement of the fishing game.

SUMMARY OF THE INVENTION

An object of the present invention is to provide a gaming machine and a gaming system capable of running a fishing game that induces players to feel as if they are actually playing fishing.

The present invention relates to a gaming machine configured to allow a normal game to be shifted to a special game, the gaming machine including:
a control lever gripped by a player;
a display configured to display an effect image; and
a controller programmed to execute a predetermined process,
the control lever including a rotation axis, a reel handle configured to rotate the rotation axis, a rotation sensor configured to detect the number of rotation of the rotation axis, and a rotation resistance imparting unit configured to impart resistance to the rotation axis so that a torque is increased in accordance with the rotational speed in one direction of the rotation axis,
the controller executing the steps of:
(a1) causing the normal game to be shifted to the special game when a predetermined condition is satisfied;
(a2) in accordance with a game status of the special game, causing the rotation sensor to detect the number of rotation of the rotation axis which is rotated as the reel handle of the control lever is rotated; and
(a3) in accordance with the detected number of rotation, changing an effect content represented by the effect image displayed on the display.

According to the arrangement above, as the player rotates the reel handle of the control lever in accordance with the game status, the number of rotation of the rotation axis is detected by the rotation sensor and the effect content represented by the effect image displayed on the display is changed in accordance with the detected number of rotation. In a fishing game which is a common game, for example, the player can therefore imitate the action of rotating a reel by rotating the reel handle with the assumption that the control lever is a fishing rod, and can change the game content and effect images by rotating the handle. This provides the player with an effect of as if he/she is actually playing fishing.

Furthermore, because the control lever is provided with the rotation resistance imparting unit which imparts resistance to the rotation axis such that the torque increases in accordance with the rotational speed in one direction of the rotation axis, rotation resistance imparted to a reel of an actual fishing rod is reproduced.

In the present invention the above-described gaming machine is arranged so that the control lever further includes an effect sound generator which is configured to generate sound by causing a gear attached to the rotation axis to contact a flexible plate fixed to the control lever.

Because the effect sound generator is provided in the control lever as described above, the teeth of the gear slap the flexible blade fixed to the control lever as the reel handle is rotated by the player, with the result that ticking sound is generated as if a real fishing reel is rotating. This provides the player with an effect of as if he/she is actually playing fishing.

In the present invention, the above-described gaming machine is arranged such that the control lever further includes a vibration generator configured to vibrate the control lever, and in accordance with the game status of the special game, the controller executes a step of vibrating the control lever by causing the vibration generator to vibrate.

Because the vibration motor is provided in the control lever as described above, the control lever is vibrated as the vibration motor is vibrated in accordance with the game status of the fishing game in the common game. This provides the player with an effect of as if he/she is actually playing fishing.

In the present invention, a gaming system in which a normal game is shifted to a common game,
the gaming system including:
a plurality of gaming terminals each including a control lever gripped by a player and a terminal controller programmed to execute a predetermined process;
a common display configured to display a common effect image; and
a center controller programmed to executed a predetermined process,
the control lever including a rotation axis, a reel handle configured to rotate the rotation axis, a rotation sensor configured to detect the number of rotation of the rotation axis, and a rotation resistance imparting unit configured to impart resistance to the rotation axis such that a torque increases in accordance with the rotational speed in one direction of the rotation axis,
the center controller executing the steps of:
(b1) when a predetermined condition is satisfied, executing the common game in which the gaming terminals are synchronized;
(b2) sending a common game start instruction to the gaming terminals at which the common game is executed; and
(b3) when information regarding the number of rotation is supplied, changing an effect content represented by the common effect image displayed on the common display, in accordance with the number of rotation, and
the terminal controller executing the steps of:
(c1) causing the normal game to be shifted to the common game when the common game start instruction is supplied;
(c2) in accordance with a game status of the common game, causing the rotation sensor to detect the number of rotation of the rotation axis which is rotated as the reel handle of the control lever is rotated; and
(c3) sending the information regarding the number of rotation to the center controller.

According to the arrangement above, as the player rotates the reel handle of the control lever in accordance with the game status, the number of rotation of the rotation axis is detected by the rotation sensor and the effect content represented by the effect image displayed on the display is changed in accordance with the detected number of rotation. In a fishing game which is a common game in which the gaming terminals are synchronized, for example, the player can therefore imitate the action of rotating a reel by rotating the reel handle with the assumption that the control lever is a fishing rod, and can change the game content and effect images by rotating the handle. This provides the player with an effect of as if he/she is actually playing fishing.

Furthermore, because the control lever is provided with the rotation resistance imparting unit which imparts resistance to the rotation axis such that the torque increases in accordance with the rotational speed in one direction of the rotation axis, rotation resistance imparted to a reel of an actual fishing rod is reproduced.

BRIEF DESCRIPTION OF THE DRAWINGS

FIG. 11 illustrates a lever position determining table.
FIG. 15 illustrates a normal game symbol table.
FIG. 16 illustrates a normal game qualification time awarding table.
FIG. 17 illustrates a game qualification time management table.
FIG. 18 illustrates a maximum qualification time table.
FIG. 19 illustrates an accumulation calculation table.
FIG. 20 illustrates a quick catch bonus normal payout table.
FIG. 21 illustrates a quick catch bonus special payout table.
FIG. 24 illustrates an independent special game qualification time awarding table.
FIG. 26 illustrates a bonus type table.
FIG. 27 illustrates an independent special game probability table.
FIG. 29 illustrates a mystery bonus start random determination table.
FIG. 30 illustrates a mystery bonus probability table.
FIG. 32 illustrates a common game start random determination table.

FIG. 33 illustrates a common game type random determination table.
FIG. 34B illustrates the display state on the upper display 700 during the first common game.
FIG. 39A shows an example of a level selection table.
FIG. 39B shows an example of a failure effect determination table.
FIG. 40 shows an example of a game progress determination table.
FIG. 41A shows an example of a fishing game progress data.
FIG. 41B shows an example of the fishing game progress data.
FIG. 41C shows an example of the fishing game progress data.
FIG. 42 illustrates a vibration pattern table.
FIG. 43A illustrates a display pattern table.
FIG. 43B illustrates an illumination pattern table.
FIG. 57 illustrates a modification of the normal game qualification time awarding table.

FIG. 75 is a flowchart of a warning process.

DESCRIPTION OF THE PREFERRED EMBODIMENTS

The following will describe an embodiment of the present invention with reference to the drawings.

(Outline of Gaming Machine)

A gaming machine includes a plurality of gaming terminals and a center controller data-communicably connected to the gaming terminals. Each gaming terminal runs independently of the other gaming terminals a base game using symbol columns, and runs a common game in sync with the other gaming terminals.

Figure 1:
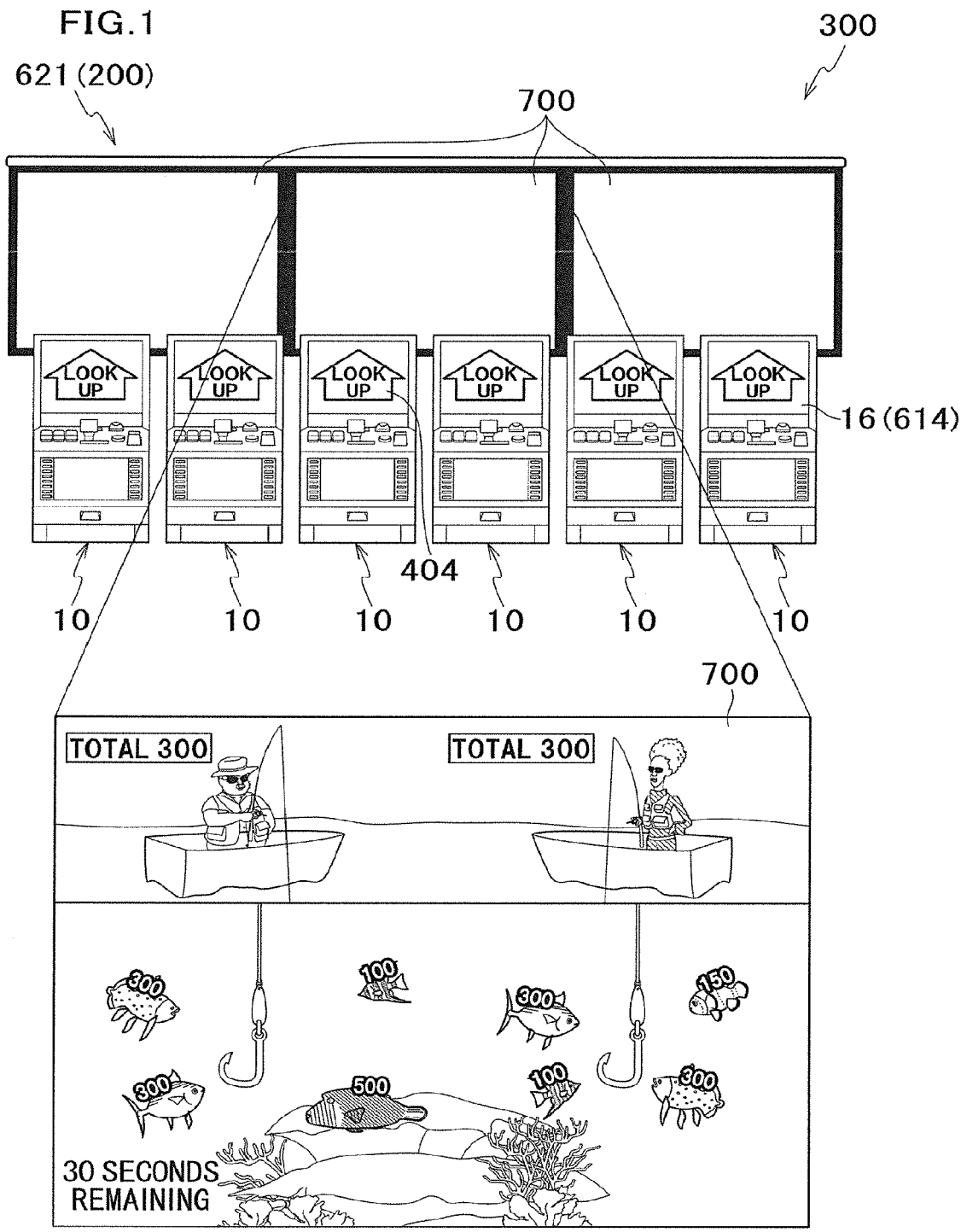
FIG. 1 illustrates the outline of a gaming machine.
Figure 2:
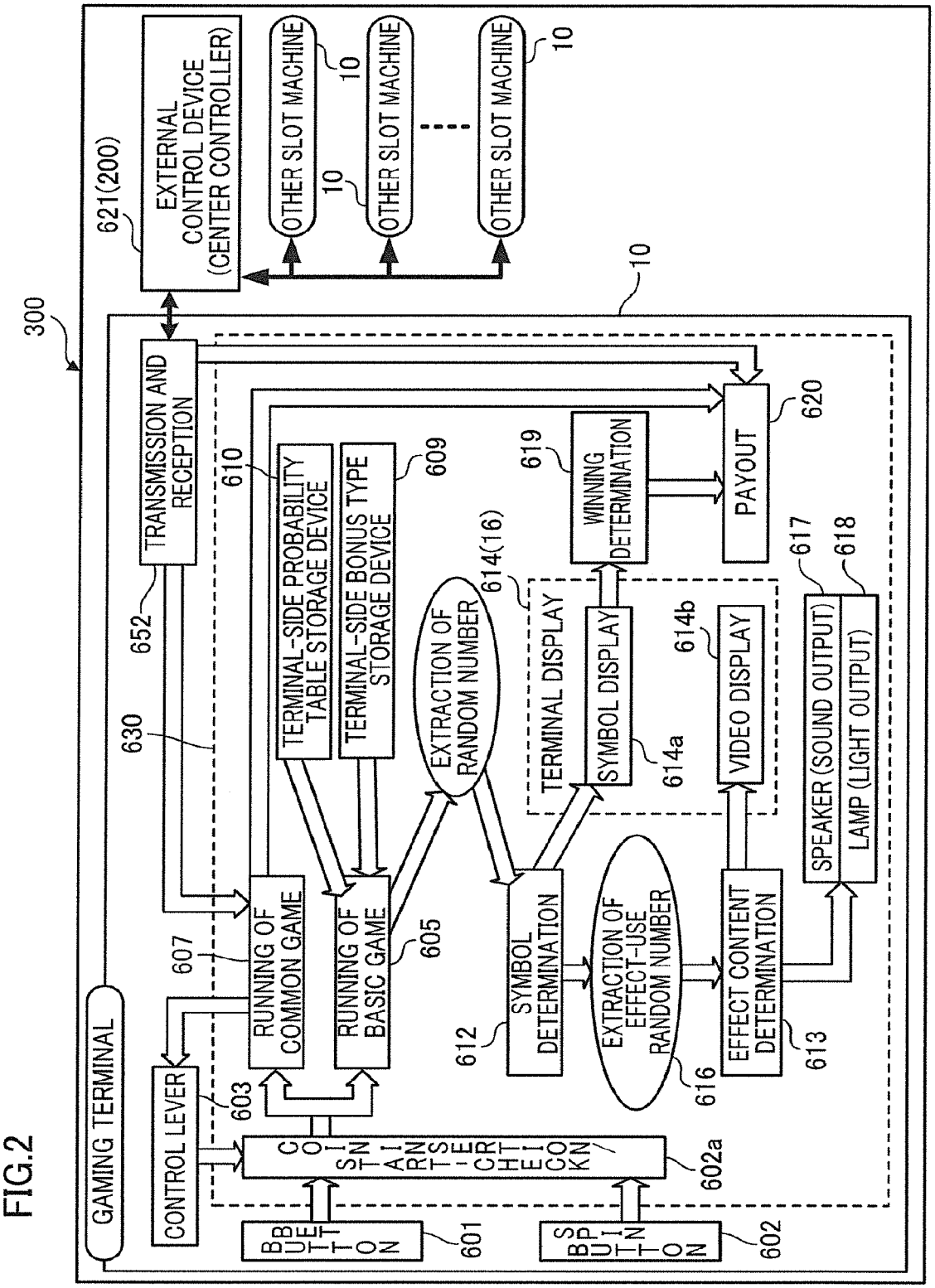
FIG. 2 is a block diagram of a gaming terminal.
Figure 3:
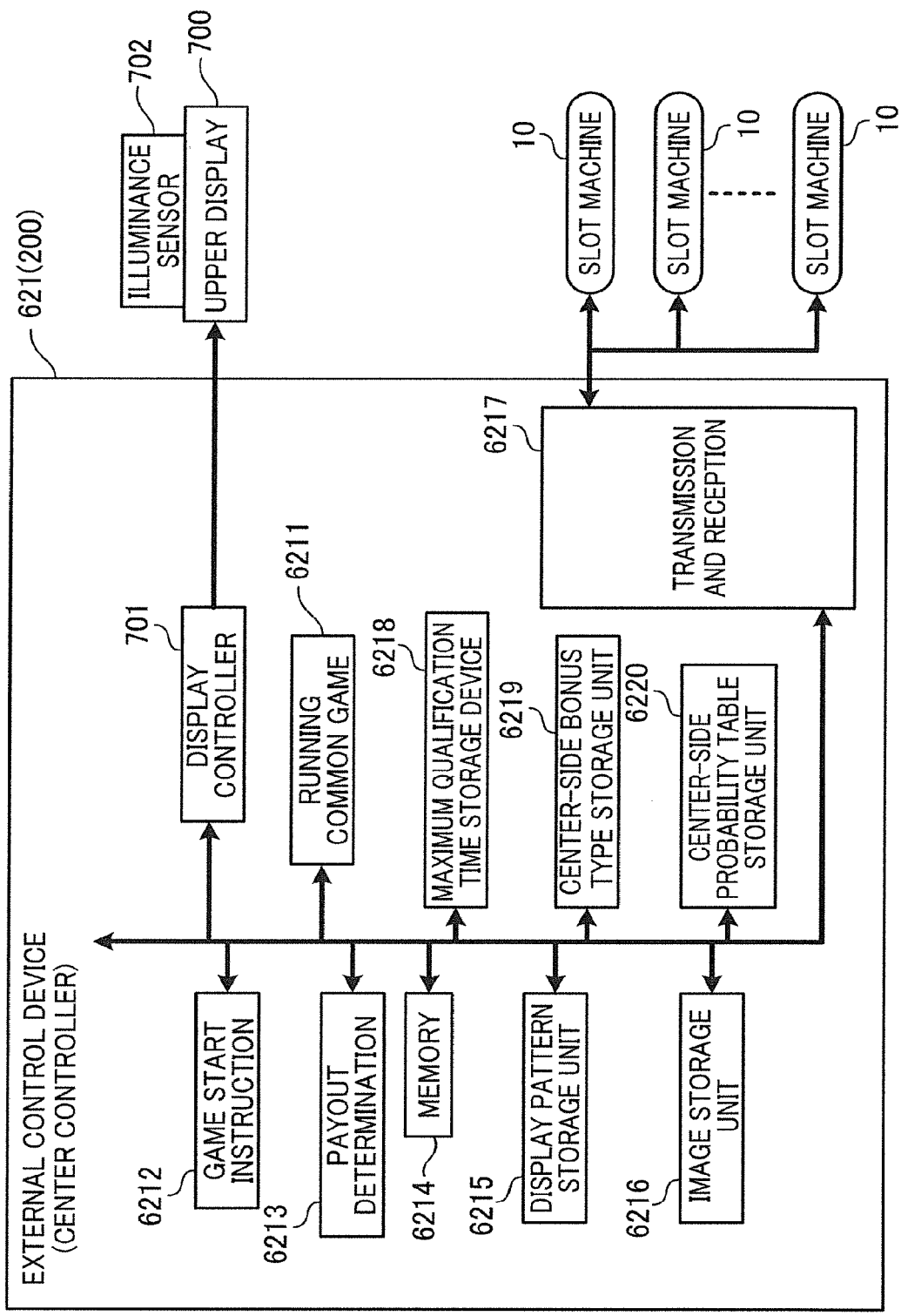
FIG. 3 is block diagram of a center controller.

More specifically, as shown in FIG. 1 to FIG. 3, the gaming machine 300 of the present embodiment has a multi-player type structure, where gaming terminals 10 are connected in a parallel manner and in communication with a center controller 200. The gaming machine 300 is structured so that each gaming terminal 10 is able to individually run a base game such as a slot game, independently of the other gaming terminals 10. In the base game, symbols 501 are rearranged on the terminal display 614 (terminal image display panel 16) of the gaming terminal 10.

(Functional Block of Gaming Machine 300: Gaming Terminal 10)

The gaming machine 300 having the above structure includes the gaming terminals 10 and the external controller 621 (center controller 200) data-communicably connected to the gaming terminals 10, as illustrated in FIGS. 1 to 3. The external controller 621 is data-communicably connected to the gaming terminals 10 which are provided in a parallel manner.

The gaming terminal 10 includes a bet button unit 601, a spin button unit 602, a control lever 603, a terminal display 614, a movement pattern storage device 608, a terminal-side bonus type storage device 609, and a terminal-side probability table storage device 610. The gaming terminal also includes a terminal controller 630 which controls these units and devices. Note that the bet button unit 601, the spin button unit 602, and the control lever 603 each is a kind of an input device. Further, the gaming terminal 10 includes a transceiver unit 652 which enables data communication with the external controller 621.

The bet button unit 601 has a function of accepting a player's operation for entering a bet amount. The spin button unit 602 and the control lever 603 have a function of receiving a start of a game such as a base game through a player's operation, i.e., start operation. The terminal display 614 has a function of displaying, in the form of a still image, various symbols 501, numerical values, marks, or the like, and displaying moving pictures such as an effect movie.

With the control lever 603, input operation from the outside is possible, and the control lever 603 is controlled by the terminal controller 630 so that it is movable in accordance with a plurality of movement patterns.

The terminal-side bonus type storage device 609 stores bonus types and unit payout amounts of the terminal bonus games, in association with one another. The terminal-side probability table storage device 610 stores a probability table in which combinations of the terminal bonus games are associated with the probabilities of the combinations.

The terminal controller 630 includes: a coin insertion/start-check unit 602a; a base game running unit 605; a common game running unit 653; a random number sampling unit 615; a symbol determining unit 612; an effect-use random number sampling unit 616; an effect determining unit 613; a speaker unit 617; a lamp unit 618; a winning determining unit 619; and a payout unit 620.

The coin insertion/start-check unit 602a determines which one of the base game, the bonus game, the common game, and the like is to be started, and determines whether the determined one of the base game, the bonus game, the common game, and the like is startable, based on signals output from the bet button unit 601, the spin button unit 602, and the control lever device 600, and a signal or the like from the center controller 200.

The base game running unit 605 has a function of running a base game on condition that the bet button unit 601 is operated. The base game running unit 605 determines whether to run a terminal bonus game, based on a combination of rearranged symbols 501 resulted from the base game.

Further, the base game running unit 605 has a function of outputting the state of the base game to the center controller 200, via the transceiver unit 652. That is, the base game running unit 605 outputs the execution state information to the center controller 200.

The common game running unit 653 has a function of running the common game, based on a game start command from the center controller 200.

The symbol determining unit 612 has: a function of determining symbols 501 to be rearranged, by using a random number given by the random number sampling unit 615; a function of rearranging selected symbols 501 on the symbol display region 614a of the terminal display 614; and a function of outputting information of the symbols 501 rearranged, to the winning determining unit 619.

More specifically, the symbol determining unit 612 has functions of: selecting a symbol column image 500 according to the game (base game or common game); scroll-displaying the symbol column image 500 selected on the terminal display 614; and stopping the scroll display to rearrange the symbols 501 determined.

The effect-use random number sampling unit 616 has functions of: when receiving the effect instruction signal from the symbol determining unit 612, sampling an effect-use random number; and outputting the effect-use random number to the effect determining unit. The effect determining unit has: a function of determining an effect by using the effect-use random number; a function of outputting, to a image display region 614b of the terminal display 614, image information of the effect thus determined; and a function of outputting audio information and illumination information of the effect to the speaker unit 617 and the lamp unit 618, respectively.

The winning determining unit 619 has: a function of determining whether a winning is achieved when rearrangement information of the symbols 501, which is a display state rearranged on the terminal display 614, is obtained; a function of calculating a payout amount based on a winning combination when it is determined that a winning is achieved; and a function of outputting a payout signal based on the payout amount to the payout unit 620. The payout unit 620 has a function of awarding the player a game value in the form of a coin, a medal, credit, or the like, based on a payout signal from the winning determining unit 619 or the center controller.

The transceiver unit 652 has functions of: outputting the running state of the base game, points calculated in the common game, or the like to the center controller 200, along with the identification information of each gaming terminal 10; and receiving the game start command, the common game symbol column image 500b, or the like from the center controller 200.

(Functional Block of Gaming Machine 300: External Controller)

The gaming terminal 10 structured as above is connected to the external controller 621. This external controller 621 has a function of remotely operating and monitoring the operation state of each gaming terminal 10 and processes such as changes in various game setting values. Further, the external controller 621 has a function of running the common game in a plurality of gaming terminals 10 simultaneously.

More specifically, as shown in FIG. 3, the external controller 621 includes a common game running unit 6211, a game start command unit 6212, a payout determining unit 6213, a memory 6214, a transceiver unit 6217, a plurality of upper displays 700, display controllers 701, an illuminance sensor 702, a display pattern storage unit 6215, an image storage unit 6216, a center-side bonus type storage unit 6219, and a center-side probability table storage unit 6220.

The common game running unit 6211 has functions of determining whether to start the common game, based on the state of the base game obtained from the terminal controller 630, and synchronizing the common game run in each of the gaming terminals 10. The game start command unit 6212 has a function of outputting the game start command to the gaming terminal 10. The memory 6214 stores, for each gaming terminal 10, common game qualification times in association with respective payout rates. The transceiver unit 6217 has a function of allowing data exchange with the gaming terminals 10.

The upper displays 700 are provided in a parallel manner, and are controlled by the associated display controllers 701 so that the upper displays 700 form a single common effect display screen. The common effect display screen is arranged to display a plurality of individual images corresponding to the respective gaming terminals 10. Furthermore, the common effect display screen is arranged to display a common game start effect image. The common game start effect image is stored in the image storage unit 6216. The display controllers 701 are controlled by the common game running unit 6211. The illuminance sensor 702 detects the brightness of the disturbance light on the upper displays 700.

The display pattern storage unit 6215 stores sets of identification information in association with a plurality of display patterns of the individual image. Furthermore, the center-side bonus type storage unit 6219 stores bonus types and unit payout amounts of the common game in association with one another. The center-side probability table storage unit 6220 stores a probability table in which combinations of the bonus types are associated with the probabilities of these combinations.

It is noted that the gaming terminals 10 are connected to the center controller 200 by wire, wireless, or a combination thereof. A unit of bet amount may be a currency such as dollar, yen, euro, or the like, or may be a game point used exclusively in a hole having the gaming machine 300 or in the industry.

The expression "rearrange" means dismissing an arrangement of symbols 501, and once again arranging symbols 501. An "arrangement" means a state of symbols 501, which can be visually confirmed by a player.

Note that a "unit game" includes a series of operations performed within a period between a start of receiving a bet to a point where a winning may be resulted. In the present embodiment, a unit game is repeatable in the base game, and contains one each of the following: a bet time where a bet is accepted; a game time where symbols 501 having been stopped are rearranged; and a payout time where a payout process is performed to award a payout. Note that the "base game" is a game runnable on condition that a game value is bet, which base game awards an amount of game media based on symbols 501 rearranged. In other words, the "base game" is a game in which a unit game is started on the premise that a game value is consumed. The "unit game" in the present embodiment is a so-called slot game which is run in each gaming terminal 10 independently of the other gaming terminals 10.

Note that the gaming machine 300 of the present embodiment is structured so that each gaming terminal 10 is able to run a bonus game (terminal bonus game) independently of the other gaming terminals 10. Another bonus game may be adopted in combination, provided that the player is given a more advantageous gaming state than the base game. For example, in the bonus game, various states such as a state in which a larger amount of game values than in the base game is obtainable, a state in which the probability of obtaining a game value is higher than in the base game, and a state in which the amount of consumed game values is smaller than in the base game such as a free game may be realized independently or in combination.

A game runnable with a bet of less game values than the base game is referred to as "free game". Note that "bet of less game values" encompasses a bet of zero game value. The "free game" therefore may be a game runnable without a bet of game value, which awards an amount of game values according to symbols 501 having been rearranged. In other words, the "free game" may be a game which is started without the premise that a game value is consumed. To the contrary, the "base game" is a game runnable on condition that a game value is bet, which awards an amount of game values according to symbols 501 rearranged. In other words, the "base game" is a game which starts on the premise that a game value is consumed.

The gaming machine 300 of the present embodiment has a state in which the base game or the bonus game is runnable, and a state in which the common game is runnable. The base game is also referred to as normal game. Further, the common game or the period during which the common game is run is referred to as "event time".

The "game value" is a coin, bill, or electronic information corresponding to them. Note that the game value in the present invention is not particularly limited. Examples of the game value include game media such as medals, tokens, electronic money, tickets, and the like. Further, the ticket is not particularly limited and may be a ticket with a barcode or the like.

Although the present embodiment describes a gaming machine 300 which has a center controller 200 in addition to the gaming terminals 10, the invention is not limited to this. The gaming machine 300 may be arranged so that one or more gaming terminal 10 has the function of the center controller 200 and the gaming terminals 10 are connected with each other to be able to exchange data therebetween.

(Internal Connection Layout of Gaming Machine 300)

Figure 4:
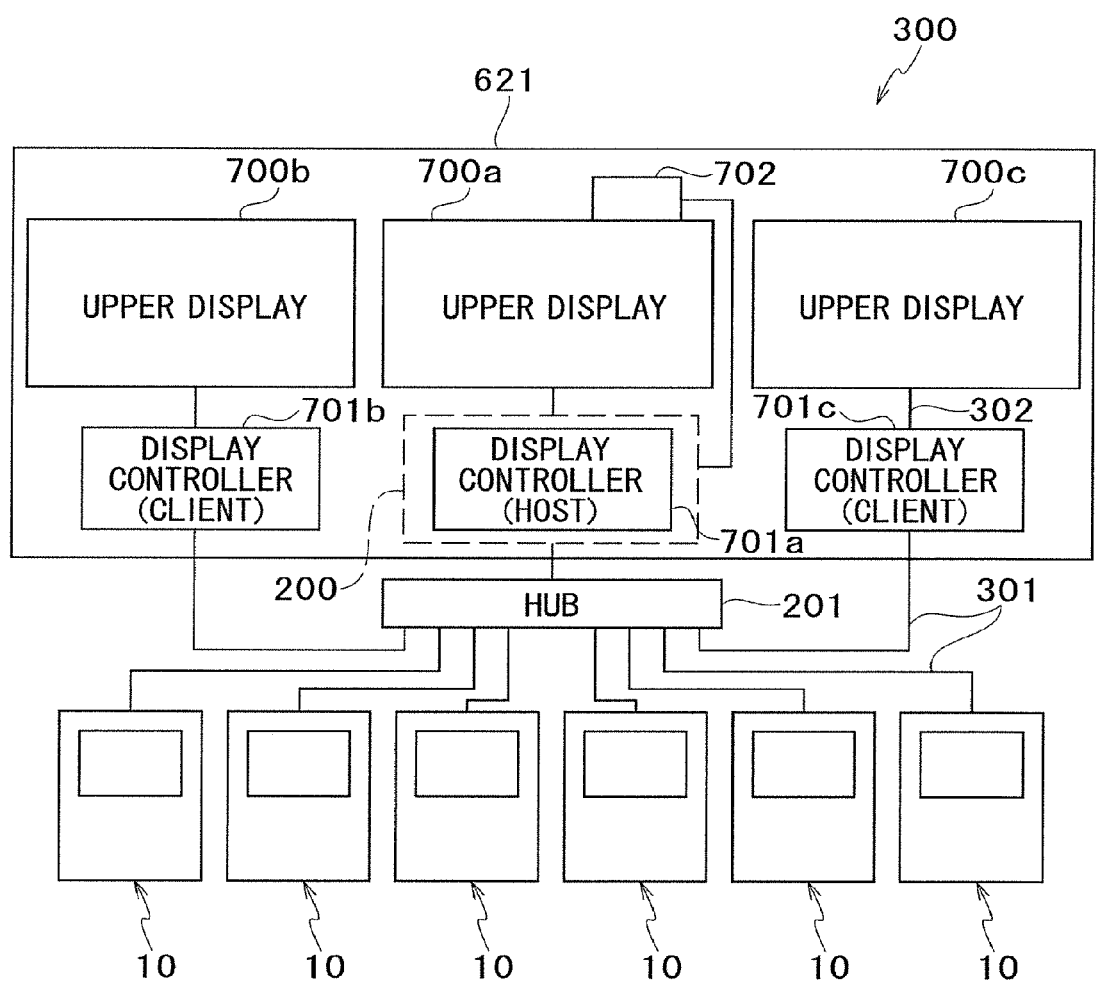
FIG. 4 illustrates the internal connection layout of the gaming machine.

Now, referring to FIG. 4, the internal connection layout of the gaming machine 300 including the gaming terminals 10 will be described. FIG. 4 shows the gaming machine 300 including the gaming terminals 10 according to the embodiment of the present invention.

The gaming machine 300 includes six gaming terminals 10 and an external controller 621. The external controller 621 includes three upper displays 700 (700a, 700b, and 700c) and three display controllers 701 (701a, 701b, and 701c). The display controller 701a is a component of the center controller 200 and hosts the other display controllers 701b and 701c. In other words, the display controllers 701b and 701c are clients of the display controller 701a. The display controllers 701a, 701b, and 701c are connected with the respective upper displays 700a, 700b, and 700c via monitor cables 302, so as to function as system controllers controlling the respective upper displays 700.

In addition to the above, the gaming machine 300 is provided with a hub 201. Upstream of the hub 201, the display controller 701a (center controller 200) and an unillustrated progressive controller 340 are connected via a LAN cable 301. On the other hand, downstream of the hub 201, the gaming terminals 10 and the display controllers 701b and 701c are connected via the LAN cable 301. That is to say, the center controller 200 is connected with the gaming terminals 10 to be able to conduct data communications therebetween, and the center controller 200 (display controller 701a) is connected to be able to control the display controllers 701b and 701c. This makes it possible to control the display controllers 701a, 701b, and 701c to cause the upper displays 700 to display images as a single common effect display screen.

In addition to the above, the upper display 700a is provided with an illuminance sensor 702 to detect the brightness of disturbance light applied to the upper display 700a.

(Mechanical Structure of Gaming Machine 300)

Next, the following describes a specific example of mechanical and electrical structures of the gaming machine 300 thus structured.

Figure 5:
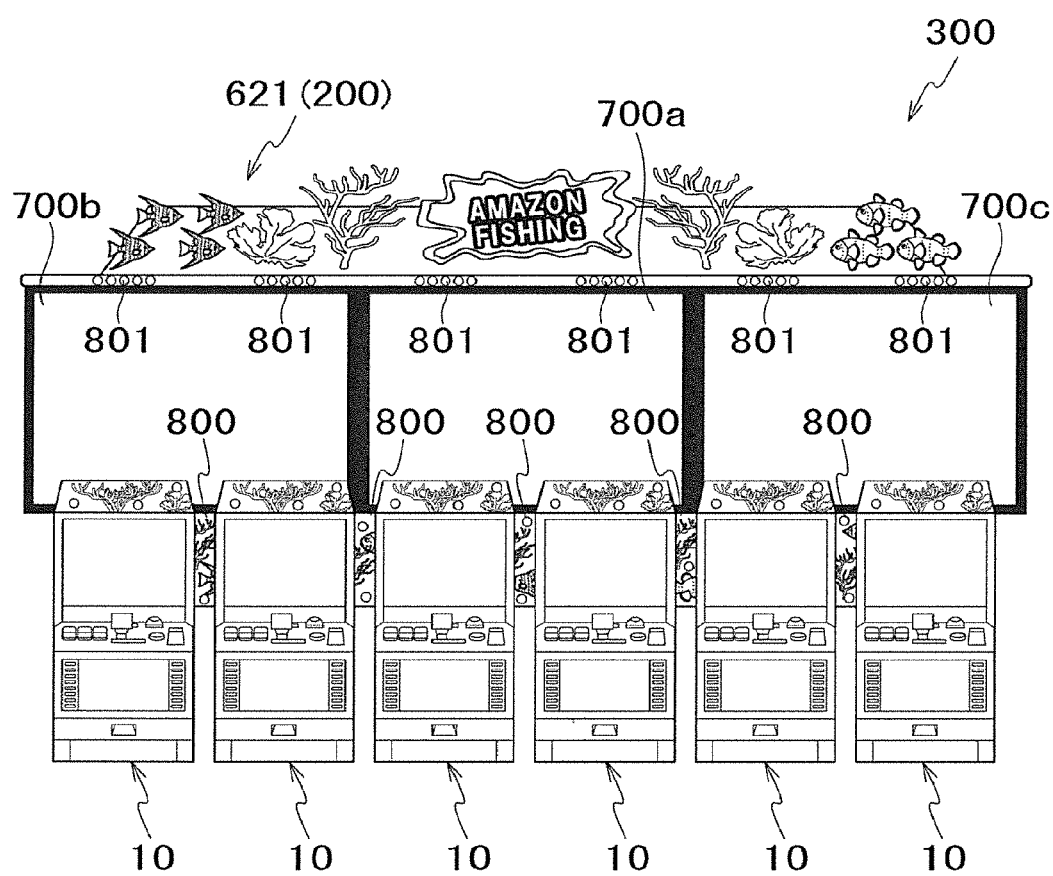
FIG. 5 is a front elevation of the entirety of the gaming machine.

As shown in FIG. 5, the gaming machine 300 includes: six gaming terminals 10 which are provided in a parallel manner and each independently runs a base game (first game); an external controller 621 (center controller 200) which is connected with the gaming terminals 10 to be able to communicate therewith and runs a common game (third game); and the progressive controller 340 which is not illustrated. The external controller 621 has three parallel upper displays 700a, 700b, and 700c forming a single common effect display screen, independently from the gaming terminals 10.

Between neighboring gaming terminals 10, an inter-terminal panel 800 is provided. Each inter-terminal panel 800 has at least one LED to light the panel itself. The inter-terminal panel 800 is decorated with pictures indicating the theme of the games playable by the gaming machine 300, giving integrity to the gaming terminals 10. This makes the entirety of the gaming machine 300 look larger than the actual size.

In addition to the above, the upper displays 700 are provided with LED units 801 corresponding to the respective gaming terminals 10. More specifically, the LED units 801 are provided at the upper parts of the frame of each upper display 700 to be immediately above the respective gaming terminals 10. That is to say, the LED units 801 are provided to enclose the upper displays 700. For example, when a later-described independent special game starts at the corresponding gaming terminal 10, the LED unit 801 produces an effect such as flickering for the corresponding gaming terminal 10. This makes it possible to report which gaming terminal 10 wins the independent special game.

In addition to the above, above the external controller 621 and above each gaming terminal 10, decoration panels decorated with pictures indicating the theme of the games playable by the gaming machine 300 are provided. It is noted that, except FIG. 9, the inter-terminal panels 800, the LED units 801, and the decoration panels are omitted from the figures.

Figure 6:
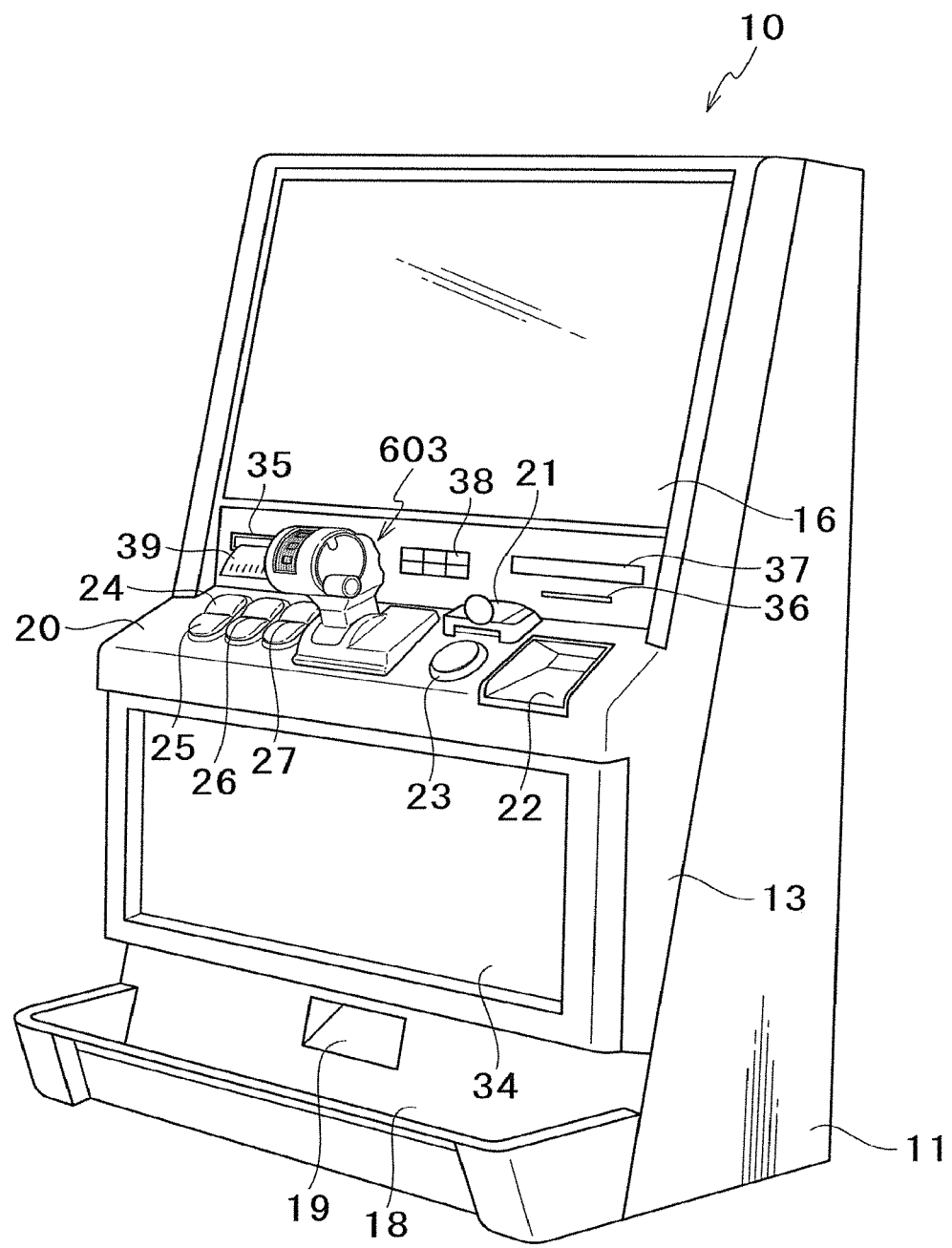
FIG. 6 is a perspective view of the gaming terminal.

As shown in FIG. 6, the gaming terminal 10 includes a cabinet 11 and a main door 13 provided on the front surface of the cabinet 11. The main door 13 has a terminal image display panel 16 (terminal display showing a game result). The terminal image display panel 16 has a transparent liquid crystal panel for displaying various kinds of information. The terminal image display panel 16 displays display windows 150 (video reels 151 to 155) for scroll-displaying and arranging a plurality of symbols 501 (see FIG. 14). Further, the terminal image display panel 16 displays various information and effect images related to a game, as needed.

The present embodiment deals with a case where the terminal image display panel 16 electrically displays symbols 501 arranged in five columns and three rows. However, the present invention is not limited to this.

Note that the terminal image display panel 16 may have a credit amount display unit and a payout amount display unit. The credit amount display unit displays a total value (hereinafter also referred to as total credit amount) which the gaming terminal 10 can pay out to a player. The payout amount display unit displays the number of coins to be paid out when symbols stopped along a payline form a winning combination.

Below the terminal image display panel 16 provided are a control panel 20, a coin receiving slot 21, and a bill validator 22. The control panel 20 is provided with buttons 23 to 27 and the control lever 603. These buttons 23 to 27 and the control lever 600 allow the player to input instructions concerning the progress of a game. Through the coin receiving slot 21, a coin is received in the cabinet 11.

Figure 7:
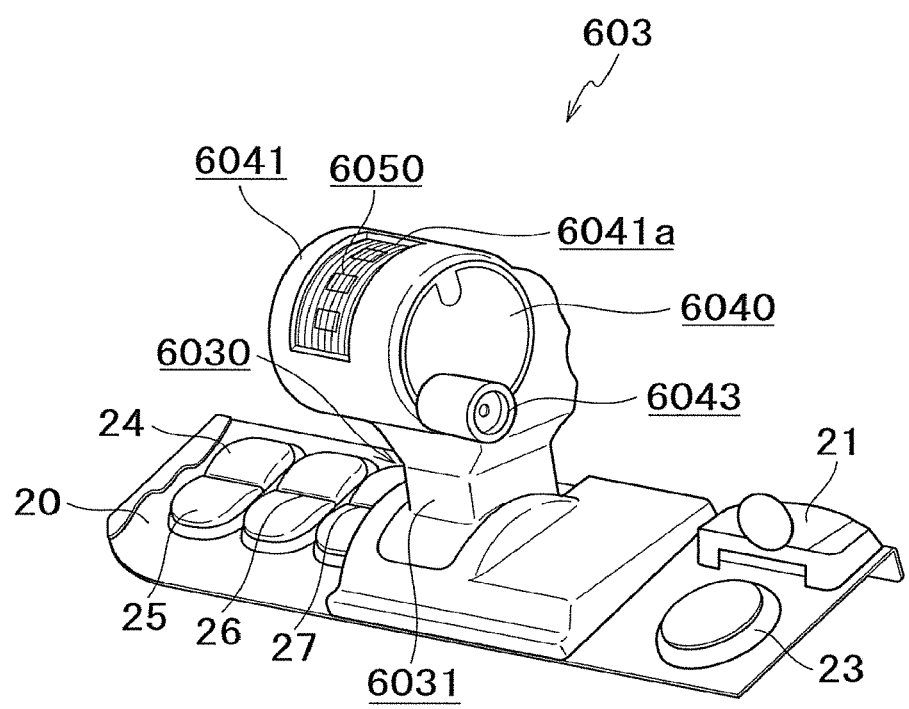
FIG. 7 is a schematic drawing of a control lever.

As shown in FIG. 7, the control panel 20 has: a spin button 23, a change button 24, a cashout button 25, a 1-bet button 26 (switch for receiving a bet), and a maximum bet button 27 (switch for receiving a bet). The spin button 23 is for inputting an instruction to start symbol scrolling. The change button 24 is used to ask a staff person in the gaming facility for exchange of money. The cashout button 25 is for inputting an instruction to pay out coins corresponding to the total credit amount into the coin tray 18.

The 1-bet button 26 is used for betting one coin out of those corresponding to the total credit amount. The maximum bet button 27 is used for betting, out of those corresponding to the total credit amount, a upper limit of coins (e.g., 50 coins) which can be bet in one game.

The bill validator 22 validates whether a bill is genuine or not and receives the genuine bill into the cabinet 11. Note that the bill validator 22 is capable of reading a barcode attached to a later-mentioned barcoded ticket 39. When the bill validator 22 reads the barcoded ticket 39, it outputs to the main CPU 41 a read signal representing information having read from the barcode.

On the lower front surface of the main door 13, that is, below the control panel 20, a belly glass 34 is provided as shown in FIG. 6. On the belly glass 34, a character of the gaming terminal 10, or the like is drawn.

Below the terminal image display panel 16 are provided a ticket printer 35, a card reader 36, a data displayer 37, and a keypad 38. The ticket printer 35 prints on a ticket a barcode and outputs the ticket as the barcoded ticket 39. The barcode is encoded data containing a credit amount, date and time, an identification number of the gaming terminal 10, or the like. A player can play a game in another gaming terminal 10 using the barcoded ticket 39 having the barcode, or can exchange the barcoded ticket 39 having the barcode with a bill or the like at a change booth of the gaming facility.

The card reader 36 reads/writes data from/into a smart card. The smart card is carried by a player, and stores therein data for identifying the player, data relating to a history of games played by the player, or the like.

The data displayer 37 includes a fluorescent display or the like, and displays the data read by the card reader 36 and the data input by the player through the keypad 38, for example. The keypad 38 is for entering instructions or data relating to issuing of a ticket or the like.

Figure 8:
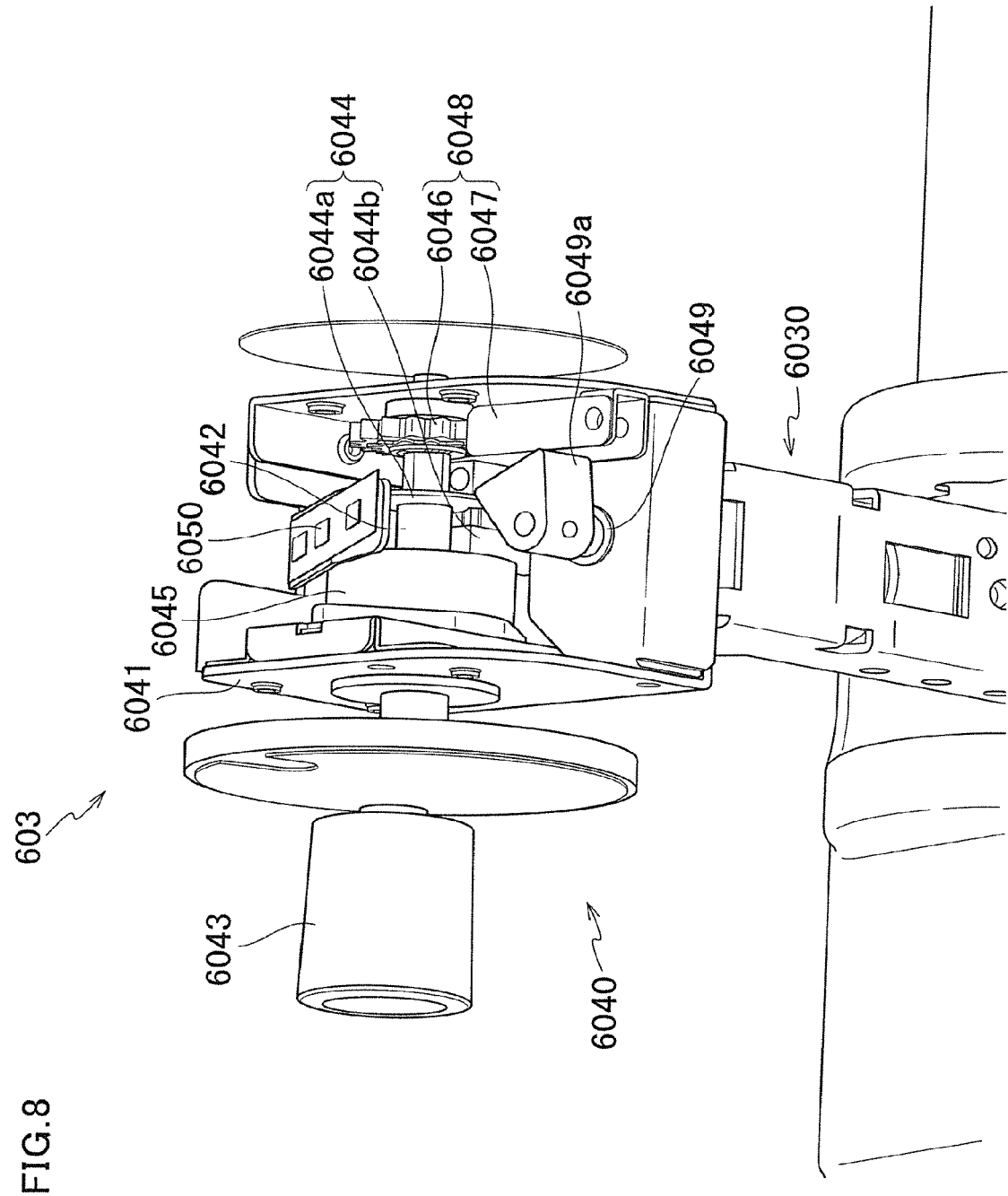
FIG. 8 shows the inside of the control lever.

Now, with reference to FIGS. 6 to 10, the control lever 603 will be described. As shown in FIG. 7, the control lever 603 includes: a grip 6030 including a lever 6031 which is held by a hand of a player and is rotatable by the player about a rotation axis 6030a and a rotation motor 6033 which is provided in the lever 6031 as shown in FIG. 10 and biases the lever 6031 forward or backward about the rotation axis 6030a (more specifically, in a rotation direction R shown in FIG. 10); and a reel unit 6040 that, as shown in FIG. 8, includes: a rotation axis 6042 rotatably housed in a reel box 6041; a reel handle 6043 configured to rotate the rotation axis 6042; a rotation sensor 6044 configured to detect the number of rotation of the rotation axis 6042; a rotary dumper 6045 (rotation resistance imparting unit) configured to impart resistance to the rotation axis 6042 such that the torque increases in accordance with the rotational speed of the rotation of the rotation axis 6042 in one direction; an effect sound generator 6048 configured to generate the sound of slapping a blade 6047 by causing the blade 6047 which is flexible and fixed to the reel box 6041 to contact the teeth of a gear 6046 provided on the rotation axis 6042; a vibration motor 6049 (vibration generator) configured to vibrate the control lever 603; and LED 6050 (light emission unit) provided at an upper part of the reel box 6041.

The reel unit 6040 is provided on a side of the grip 6030 (i.e., on the right side of the grip 6030 when the gaming terminal 10 is viewed from the front) such that, while the control lever 603 is fixed as the player holds the grip 6030 by one hand, the reel handle 6043 can be rotated by the other hand of the player. The rotation axis 6030a of the grip 6030 and the rotation axis 6042 of the reel unit 6040 are disposed to be in parallel to each other. The reel handle 6043 is provided to be rotatable about the rotation axis 6042 which is in parallel to the rotation axis 6030a of the grip 6030, in such a way that, while the lever 6031 is held and rotated by one hand of the player, the reel handle 6043 can be rotated by the other hand of the player.

The lever 6031 has grooves with which the player can easily grip the lever. Furthermore, the lever 6031 is rotatable forward and backward about the rotation axis 6030a, when viewed from the front side of the gaming terminal 10 (i.e., in rotation directions R in FIG. 10). With this, the control lever 603 is fixed or rotated forward or backward as the player holds the lever 6031 by one hand. Furthermore, the grip 6030 includes a rotation motor 6033 at a lower part of the lever 6031, i.e., inside the cabinet 11, and the rotation motor 6033 transfers the torque to the rotatable lever 6031 in a rotation direction R.

The rotation axis 6042 rotates as the player grips and rotates the reel handle 6043. To this rotation axis 6042, a semicircular encoder 6044a constituting a rotation sensor 6044 is attached. Furthermore, the reel box 6041 is provided with an optical photo sensor 6044b (which constitutes the rotation sensor 6044). This photo sensor 6044b is provided with a light emitting portion emitting light and a photo acceptance portion provided to oppose the light emitting portion and receiving light emitted from the light emitting portion. As the light emitted from the light emitting portion is blocked by the encoder 6044a that rotates in accordance with the rotation of the rotation axis 6042, the photo sensor 6044b detects the rotation of the rotation axis 6042. This makes it possible to detect that the reel handle 6043 has rotated once. The number of rotation of the rotation axis 6042 is calculated by storing each rotation of the rotation axis 6042 detected by the photo sensor 6044b in the RAM 43, and the stored number of rotation is referred to according to need. Alternatively, the rotation sensor 6044 is arranged so that, an encoder generating pulses is attached to the rotation axis 6042, and the number of rotation of the rotation axis 6042 is detected such that pulses generated by the encoder are detected by a photo sensor fixed to the reel box 6041.

In addition to the above, the rotation axis 6042 is provided with a rotary dumper 6045. Because a one way clutch is provided in the rotary dumper 6045, resistance is imparted to the rotation axis 6042 such that the torque increases as the rotational speed of the rotation of the rotation axis 6042 in one direction increases, and the torque imparted to the rotation axis 6042 becomes consistent when the rotational speed becomes equal to or higher than a predetermined rotational speed.

Figure 9:
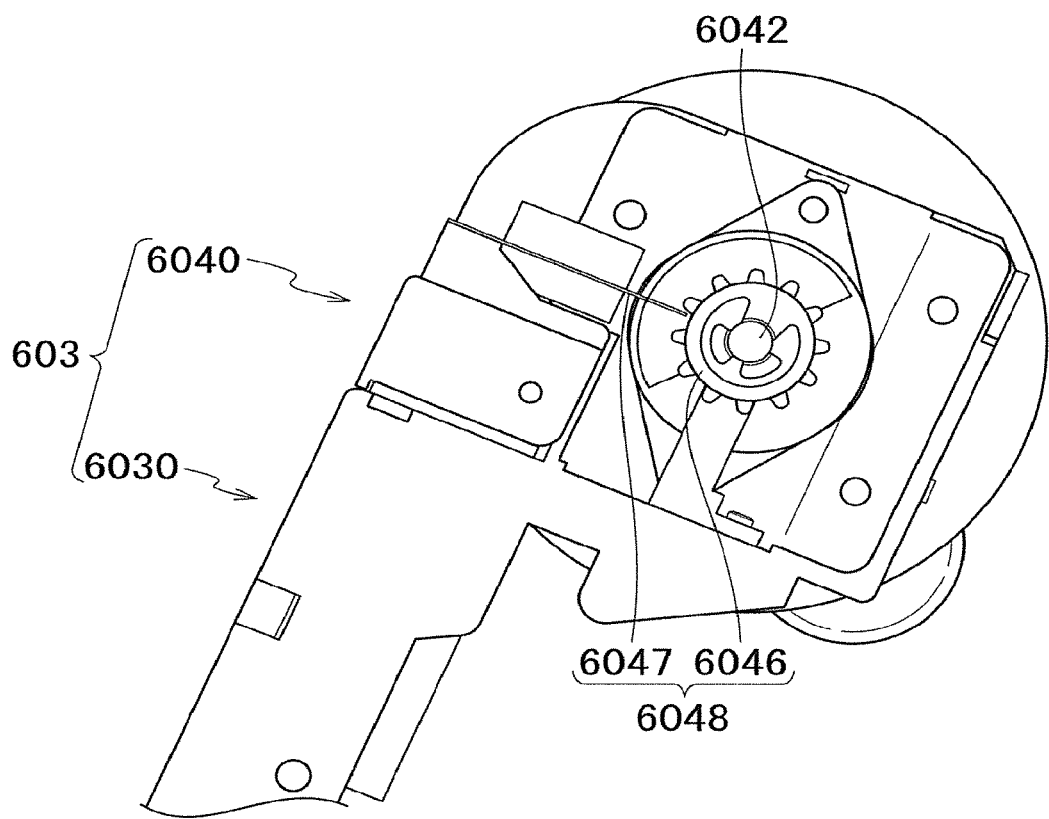
FIG. 9 illustrates an effect sound generator provided in the control lever.
Figure 10:
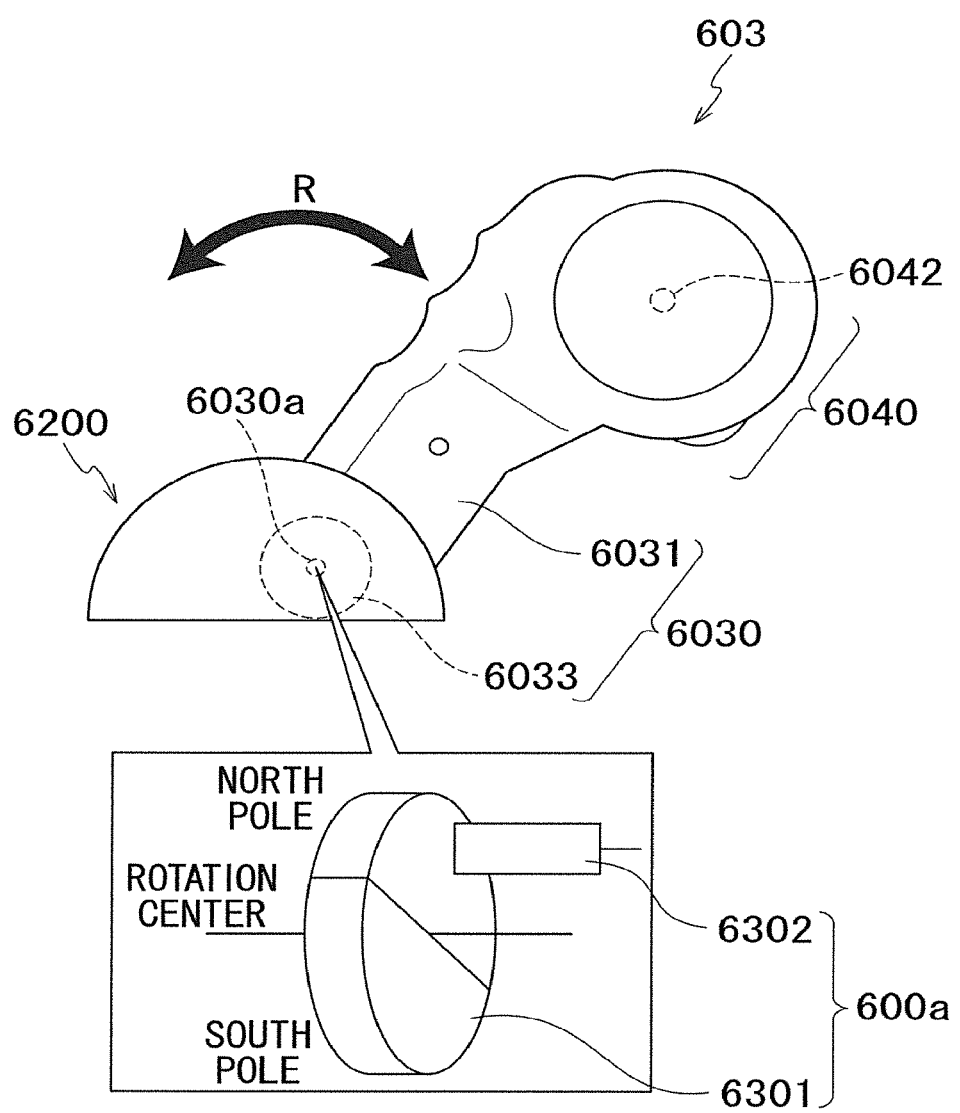
FIG. 10 is a profile of the control lever.

In addition to the above, as shown in FIG. 8 and FIG. 9, the rotation axis 6042 is provided with a gear 6046. As the teeth of the gear 6046 slap a flexible blade 6047 fixed to the reel box 6041 in accordance with the rotation of the rotation axis 6042, ticking sound is generated as if a real fishing reel is rotated.

In addition to the above, the reel unit 6040 is provided with a vibration motor 6049. To the rotation axis of the vibration motor 6049, a pendulum component 6049a is attached so that a part thereof radially protrudes in a fan shape. With this, as the vibration motor 6049 rotates, the entirety of the control lever 603 vibrates.

In an upper part of the reel box 6041 is provided a light-transmissive cover 6041a that allows light from a LED 6050 to pass through. Inside the reel box 6041 is provided the LED 6050, and the light emitted from the LED 6050 goes out through the light-transmissive cover 6041a. With this, effects with varying light emitted from the LED 6050 to the outside for the viewers become possible.

Note that, as shown in FIG. 10, the control lever 603 is provided with an inclination detecting mechanism 600a, and this inclination detecting mechanism 600a includes a magnet 6301 and a magnetic force detecting mechanism 6302 provided in the vicinity of the magnet 6301. Since the magnet 6301 is attached to the rotation axis of the control lever 603, the magnet 6301 rotates along with the rotation of the control lever 603. Thus, with the rotation of the control lever 603, the magnet 6301 changes an external magnetic field. Further, the magnetic force detecting mechanism 6302 includes: a magnetic force sensor which outputs a magnetic force detection signal of an output intensity corresponding to the magnetic force; and a sensor fixing mechanism which fixes the magnetic force sensor to a predetermined position. The magnetic force detecting mechanism 6302 detects the magnetic force of the magnetic field which is generated by the magnet 6301 and varies with the rotation of the control lever 603, and then outputs a magnetic force detection signal indicating the value of the detected magnetic force (detected magnetic force value). The detected magnetic force value represents the degree of inclination of the control lever 603 with respect to the reference position (the position of the control lever 603 which is not being operated by the player), so that the degree of inclination of the control lever 603 is derived from the detected magnetic force value. The degree of inclination of the control lever 603 (lever position) and a detected magnetic force are associated with each other and registered in a later-described lever position determining table.

(Lever Position Determining Table)

FIG. 11 shows a lever position determining table for associating a lever position with a detected magnetic force. The lever position determining table has a lever position field and a detected magnetic force field. The table is updated in the later-described RAM 43 when the gaming terminal 10 is activated. More specifically, the lever position field stores lever positions indicating the angles of the control lever 603. The detected magnetic force field stores magnetic forces detected by the magnetic force detecting mechanism 6302 when the control lever 603 is at the respective lever positions.

To be more specific, when the gaming terminal 10 is activated, the control lever 603 is rotated by the rotation motor 6033 from the start to the end, while the magnetic forces at the respective positions are detected by the magnetic force detecting mechanism 6302. With this, the magnetic forces at the respective positions of the control lever 603 are detected and the lever position determining table is updated with the positions and the magnetic forces associated with one another. For example, in the example shown in FIG. 11, the detected magnetic force at the start is "ND78" whereas the detected magnetic force at the end is "ND126", and hence the magnetic force varies within the range between "ND78" and "ND126" in the movable range of the control lever 603. It is therefore possible to specify the position (angle) of the control lever 603 when the detected magnetic force is read out.

(Electric Configuration of Gaming Machine 300)

Figure 12:
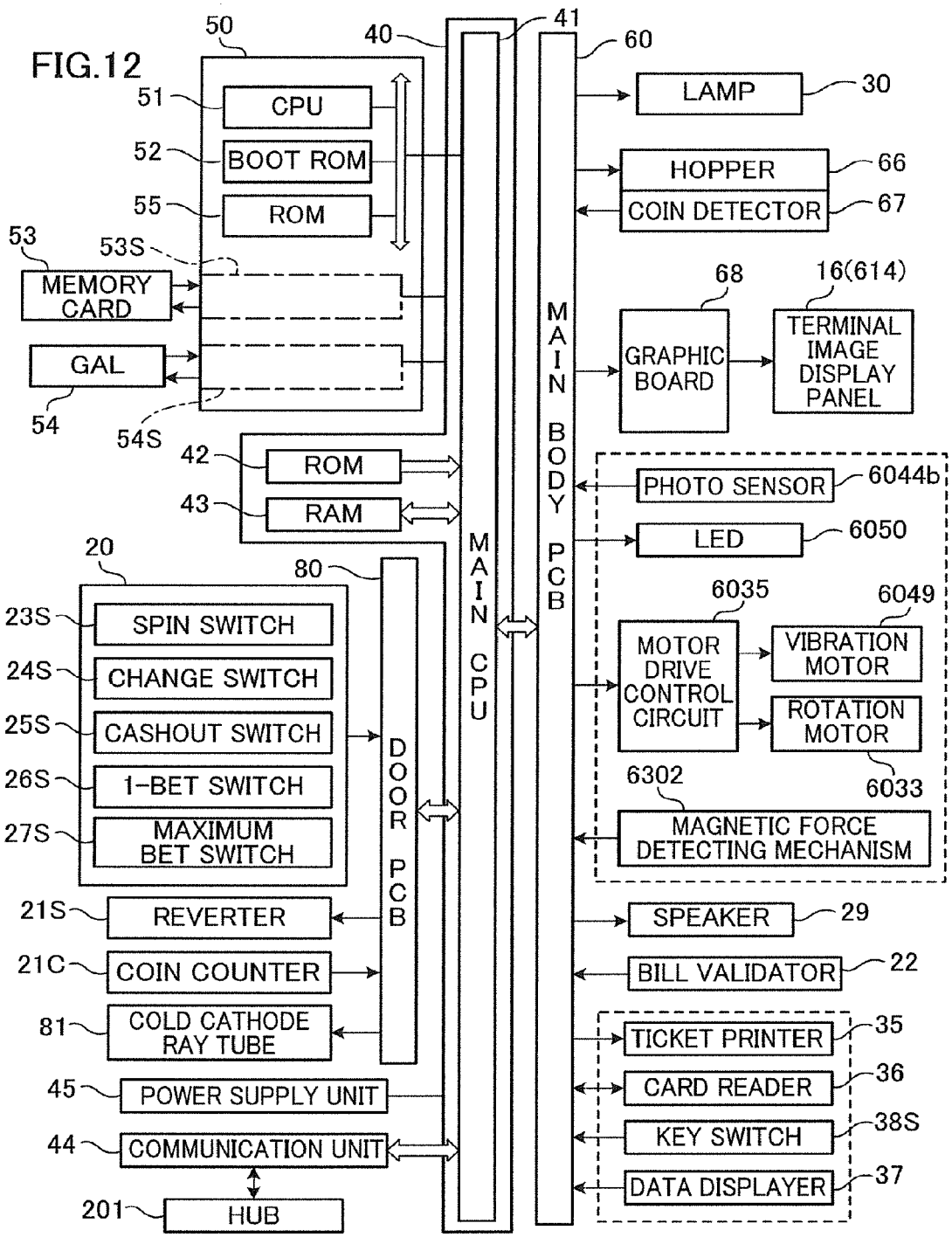
FIG. 12 is a block diagram of a control circuit of the terminal controller.
Figure 13:
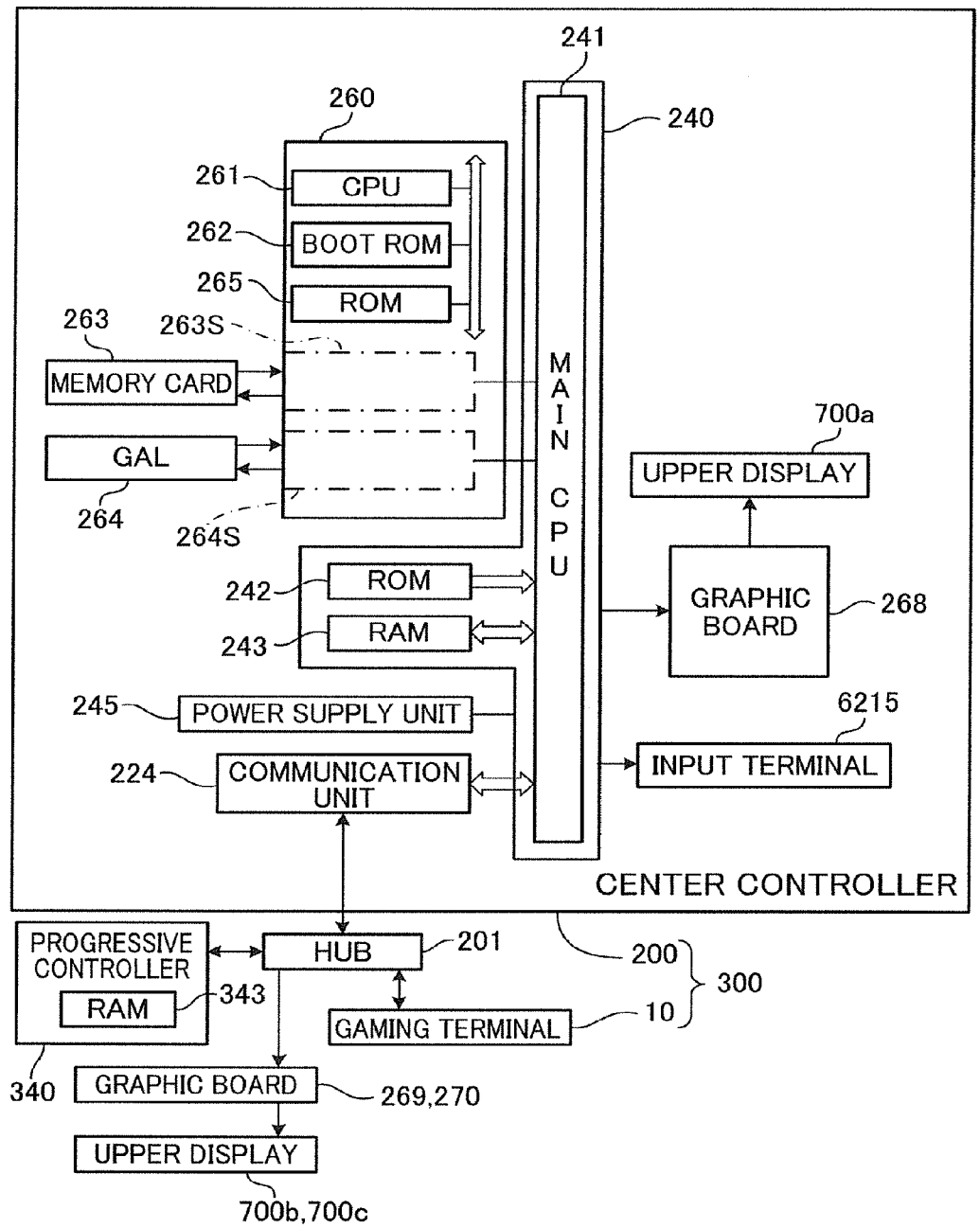
FIG. 13 is a block diagram of a control circuit of the center controller.

FIGS. 12 and 13 are block diagrams each illustrating an electric configuration of the entirety of the gaming machine 300.

(Electrical Configuration of Gaming Terminal 10)

FIG. 12 is a block diagram illustrating an electric configuration of each of the gaming terminals 10. As illustrated in FIG. 12, the cabinet 11 includes a control unit having a terminal controller 630. The control unit includes a motherboard 40, a main body PCB (Printed Circuit Board) 60, a gaming board 50, a door PCB 80, various switches, sensors, or the like, as shown in FIG. 12.

The gaming board 50 is provided with a CPU (Central Processing Unit) 51, a ROM 55, a boot ROM 52, a card slot 53S corresponding to a memory card 53, and an IC socket 54S corresponding to a GAL (Generic Array Logic) 54. The CPU 51, the ROM 55, and the boot ROM 52 are connected to one another through an internal bus.

The memory card 53 stores therein various types of data for use in the game programs and the game system programs. The game program contains a stop symbol determination program. The stop symbol determination program determines symbols (code number corresponding to the symbol) to be stopped in the display windows 150. This stop symbol determination program contains sets of symbol weighting data respectively corresponding to various payout rates (e.g., 80%, 84%, 88%). Each set of the symbol weighting data indicates, for each of the video reels 151 to 155, a code number of each symbol and at least one random number allotted to the code number. The random number is a value within a predetermined range of 0 to 256 for example.

The payout rate is determined based on payout rate setting data output from the GAL 54. Based on a set of the symbol weighting data corresponding to the payout rate determined, a symbol to be stopped is determined.

The memory card 53 stores therein various types of data for use in the game programs and the game system programs. For example, the memory card 53 stores a table listing combinations of a symbol 501 to be displayed on the video reels 151 to 155 and an associated range of random numbers. This data is transferred to the RAM 43 of the motherboard 40, at the time of running a game program.

The card slot 53S is structured so as to allow the memory card 53 to be attached/detached to/from the card slot 53S. This card slot 53S is connected to the motherboard 40 through an IDE bus. Thus, a type and contents of a game run at the gaming terminal 10 can be changed by detaching the memory card 53 from the card slot 53S, writing a different game program and a different game system program into the memory card 53, and inserting the memory card 53 back into the card slot 53S.

Each of the game programs includes a program related to the progress of the game and/or a program for causing a transition to a common game. Each of the game programs includes image data and audio data output during the game.

The GAL 54 has input ports and output ports. When the GAL 54 receives data via an input port, it outputs data corresponding to the input data from its output port. This data from the output port is the payout rate setting data described above.

The IC socket 54S is structured so as to allow the GAL 54 to be attached/detached to/from the IC socket 54S. The IC socket 54S is connected to the motherboard 40, via a PCI bus. Thus, the payout rate setting data to be output from the GAL 54 can be modified by: detaching the GAL 54 from the IC socket 54S, overwriting the program stored in the GAL 54, and attaching the GAL 54 back to the IC socket 54S.

The CPU 51, the ROM 55 and the boot ROM 52 connected through the internal bus are connected to the motherboard 40 through the PCI bus. The PCI bus communicates signals between the motherboard 40 and the gaming board 50 and supplies power from the motherboard 40 to the gaming board 50. The ROM 55 stores country identification information and an authentication program. The boot ROM 52 stores a preliminary authentication program and a program (boot code) for enabling the CPU 51 to run the preliminary authentication program.

The authentication program is a program (falsification check program) for authenticating the game program and the game system program. The authentication program is a program for confirming and verifying that the game program and the game system program are not falsified. In other words, the authentication program is described in accordance with a procedure for authenticating the game program and the game system program. The preliminary authentication program is a program for authenticating the authentication program. The preliminary authentication program is described in accordance with a procedure for verifying that the authentication program to be authenticated is not falsified. In short, the preliminary authentication program authenticates the authentication program.

The motherboard 40 is provided with a main CPU 41 (terminal controller), a ROM (Read Only Memory) 42, a RAM (Random Access Memory) 43, and a communication unit 44.

The main CPU 41 serves as a terminal controller 630 and has a function of controlling the entire gaming terminal 10. In particular, the main CPU 41 controls the following operations: an operation of outputting an instruction signal instructing variable-displaying of symbols 501 to the graphic board 68, which is performed in response to pressing of the spin button 23 after betting of credit; an operation of determining symbols 501 to be stopped after the variable-displaying of symbols 501; and an operation of stopping the symbols 501 thus determined in the video reels 151 to 155.

In other words, the main CPU 41 serves as an arrangement controller which arranges symbols to form a new symbol matrix through scrolling of symbols displayed on the terminal image display panel 16. This main CPU 41 therefore determines symbols to be arranged in the symbol matrix by selecting symbols to be arranged from various kinds of symbols. Then, the main CPU 41 executes arrangement control to stop scrolling the symbols to present the symbols thus determined.

The ROM 42 stores a program such as BIOS (Basic Input/Output System) run by the main CPU 41, and permanently-used data. When the BIOS is run by the main CPU 41, each of peripheral devices is initialized and the game program and the game system program stored in the memory card 53 are read out through the gaming board 50. The RAM 43 stores data or a program used for the main CPU 41 to perform a process.

The communication unit 44 is provided to communicate with a host computer or the like equipped in the gaming facility, through a communication line. The communication unit 44 is also for communicating with the center controller 200 through a hub 201 and a communication line. Further, a main body PCB (Printed Circuit Board) 60 and a door PCB 80 are connected to the motherboard 40, through USB (Universal Serial Bus). Further, the motherboard 40 is connected to a power supply unit 45. The power supply unit 45 supplies power to the motherboard 40 to boot the main CPU 41 thereof. Meanwhile, the power unit 45 supplies power to the gaming board 50 through the PCI bus to boot the CPU 51 thereof.

The main body PCB 60 and door PCB 80 are connected to various devices or units which generate signals to be input to the main CPU 41, and various devices or units whose operations are controlled by control signals from the main CPU 41. Based on a signal input to the main CPU 41, the main CPU 41 runs the game program and the game system program stored in the RAM 43, to perform a calculation process. Then, the CPU 41 stores the result of the calculation process in the RAM 43, or transmits a control signal to the various devices and units to control them based on the result.

The main body PCB 60 is connected with the lamp 30, a hopper 66, a coin detection unit 67, the graphic board 68, a photo sensor 6044b, LEDs 6050, a motor drive control circuit 6035, a magnetic force detecting mechanism 6302, the speaker 29, the bill validator 22, the ticket printer 35, the card reader 36, a key switch 38S, and the data displayer 37.

The lamp 30 is turned on/off on the basis of a control signal from the main CPU 41.

The hopper 66 is mounted in the cabinet 11 and pays out a predetermined number of coins from a coin outlet 19 to the coin tray 18, based on a control signal from the main CPU 41. The coin detector 67 is provided inside the coin outlet 19, and outputs a signal to be input to the main CPU 41 upon sensing that a predetermined number of coins have been delivered from the coin outlet 19.

The graphic board 68 controls image displaying on the terminal image display panel 16, based on a control signal from the main CPU 41. Further, the graphic board 68 is provided with a VDP (Video Display Processor) for generating image data on the basis of a control signal from the main CPU 41, a video RAM for temporarily storing the image data generated by the VDP, or the like. Note that image data used at the time of generating the image data by the VDP is in a game program which is read out from the memory card 53 and stored in the RAM 43.

The bill validator 22 reads an image on a bill and takes only those recognized as genuine into the cabinet 11. When taking in a genuine bill, the bill validator 22 outputs an input signal indicating the value of the bill to the main CPU 41. The main CPU 41 stores into the RAM 43 a credit amount corresponding to the value of the bill indicated by the signal.

Based on a control signal from the main CPU 41, the ticket printer 35 prints on a ticket a barcode and outputs the ticket as a barcoded ticket 39. The barcode is encoded data containing the credit amount stored in the RAM 43, date and time, and the identification number of the gaming terminal 10.

The card reader 36 reads out data from the smart card and transmits the data to the main CPU 41. Further, the card reader 36 writes data into the smart card based on the control signal output from the main CPU 41. The key switch 38S is mounted to the keypad 38, and outputs a signal to the main CPU 41 in response to an operation of the keypad 38 by the player. The data displayer 37 displays, based on a control signal from the main CPU 41, the data read by the card reader 36 or the data input by the player through the keypad 38.

In addition to the above, the main body PCB 60 is connected to the photo sensor 6044b. The photo sensor 6044b detects the rotation of the rotation axis 6042 as the light emitted from the light emitting portion is blocked by the encoder 6044a that rotates in accordance with the rotation of the rotation axis 6042, and the detection signal is sent to the main body PCB 60. The number of rotation of the rotation axis 6042 is calculated by storing each rotation of the rotation axis 6042 detected by the photo sensor 6044b in the RAM 43, and the stored number of rotation is referred to according to need. Furthermore, the rotational speed of the rotation axis 6042 (reel handle 6043) is calculated by dividing the (predetermined) distance equivalent to one rotation of the rotation axis 6042 by the time required for one rotation of the rotation axis 6042 (time between two successive detections of the rotation of the rotation axis 6042 by the sensor 6044b). In addition to the above, the main body PCB 60 is connected to the motor drive control circuit 6035. The motor drive control circuit 6035 is connected to and controls the vibration motor 6049 and the rotation motor 6033. Further, the main body PCB 60 is connected to the LEDs 6050. The main body PCB 60 controls light emission from the LEDs 6050. Further, the main body PCB 60 is connected to the magnetic force detecting mechanism 6302. The magnetic force detecting mechanism 6302 detects the magnetic force indicating the position of the control lever 603 as described above, and sends a magnetic force signal to the main body PCB 60.

The door PCB 80 is connected to the control panel 20, a reverter 21S, a coin counter 21C, and a cold cathode tube 81. The control panel 20 is provided with: a spin switch 23S associated with the spin button 23; a change switch 24S associated with the change button 24; a cashout switch 25S associated with the cashout button 25; a 1-bet switch 26S associated with the 1-bet button 26; and a maximum bet switch 27S associated with the maximum bet button 27. Each of the switches 23S to 27S outputs an input signal to the main CPU 41 when corresponding one of the buttons 23 to 27 is operated by a player.

The coin counter 21C is provided within the coin receiving slot 21, and identifies whether the coin inserted into the coin receiving slot 21 by the player is genuine. A coin except the genuine coin is discharged from the coin payout exit 19. In addition, the coin counter 21C outputs an input signal to the main CPU 41 upon detection of a genuine coin.

The reverter 21S operates based on a control signal from the main CPU 41, and delivers coins that are recognized as genuine by the coin counter 21C into a not-shown cash box or the hopper 66 in the gaming terminal 10. In other words, when the hopper 66 is full of the coins, the genuine coin is distributed into the cash box by the reverter 21S. On the other hand, when the hopper 66 is not yet full of the coins, the genuine coin is distributed into the hopper 66. The cold cathode tube 81 functions as a backlight mounted to rear sides of the terminal image display panel 16 and the upper image display panel 33. This cold cathode tube 81 turns on according to a control signal from the main CPU 41.

(Electric Configuration of Center Controller 200)

FIG. 13 is a block diagram illustrating an electric configuration of the center controller 200. The center controller 200 is provided therein with a control unit. As illustrated in FIG. 13, the control unit includes a RAM 243 (which is a memory for storing a bet amount), a motherboard 240, a gaming board 260, an actuator, and the like. The center controller 200 is connected to a graphic boards 269 and 270, each gaming terminal 10, and a progressive controller 340 provided with a RAM 343, via a hub 201.

The gaming board 260 has the same structure as that of the gaming board 50. The motherboard 240 has the same structure as that of the motherboard 40. The communication unit 224 communicates with the gaming terminals 10 through a communication line.

The graphic board 268 has the same structure as that of the graphic board 68, except in that the graphic board 268 controls displaying of the upper display 700*a* based on a control signal from the main CPU 241. In other words, the graphic board 268 functions as the display controller 701*a*. Furthermore, the graphic board 268 outputs a control signal to graphic boards 269 and 270 controlling the upper displays 700*b* and 700*c*, via the communication unit 224, the hub 201, and the communication line. In other words, the graphic boards 269 and 270 function as the display controllers 701*b* and 701*c*.

(Base Game)

Now, the base game which is independently run at the gaming terminal 10 will be described. In the present embodiment, a base game is a game of awarding a payout based on a combination of symbols 501 rearranged on video reels 151 to 155 on the terminal image display panel 16. Games awarded when predetermined conditions are satisfied in the base game are a bonus game, a ground bait bonus, a quick catch bonus game, and a common game. The bonus game, the ground bait bonus game, and the quick catch bonus game are games which are run at each gaming terminal 10 independently of the other gaming terminals 10. On the other hand, the common game is run on the premise that a plurality of gaming terminals are in sync with one another, and based on a game result of this game, a payout is awarded to a gaming terminal having achieved winning. The ground bait bonus is a game in which a fixed payout is awarded at a predetermined probability. Furthermore, a later-described progressive bonus game is run as a second common game.

(Symbols, Combinations, and the Like)

Figure 14:
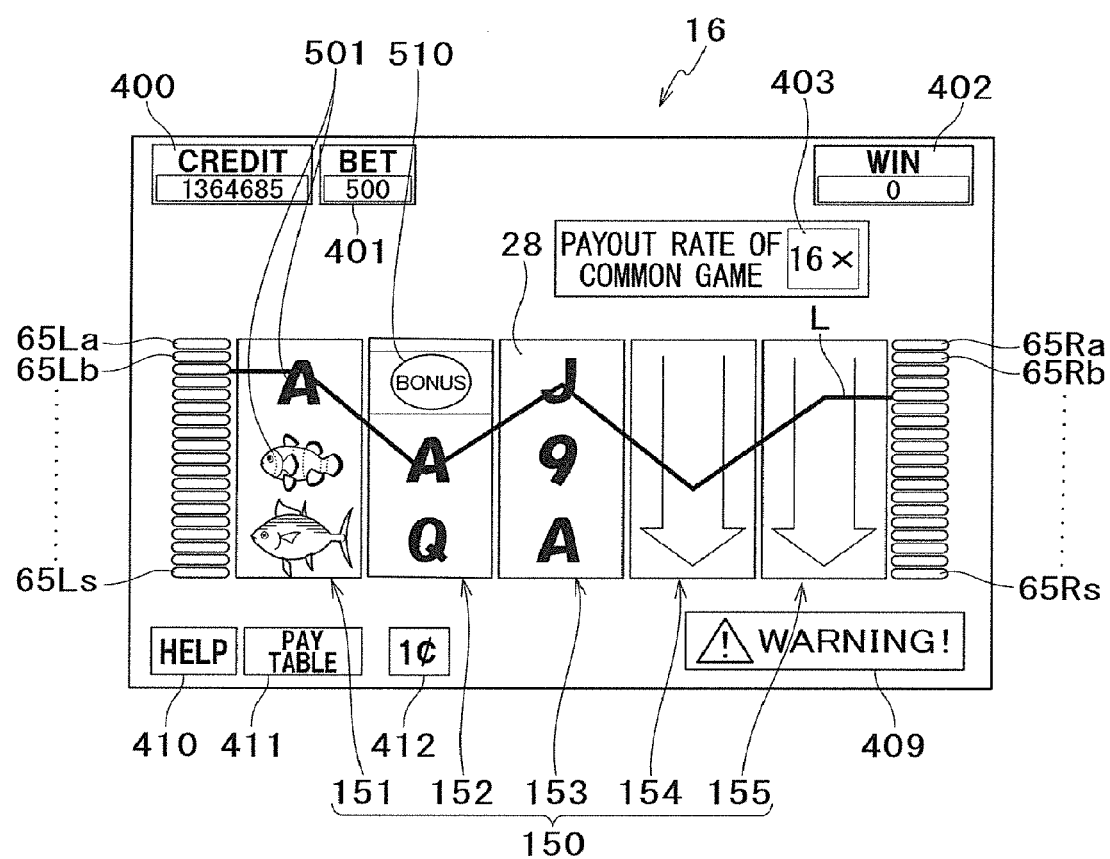
FIG. 14 shows an example of a display screen of a base game.

The symbols 501, which are displayed on the video reels 151 to 155 of the terminal image display panel 16 on which a base game is displayed, form a symbol column. As shown in FIG. 14, the terminal image display panel 16 displays a display window 150 which is constituted by the video reels 151 to 155. The display window 150 is constituted by fifteen display blocks 28 of five columns and three rows. Each of the video reels 151 to 155 is therefore constituted by three display blocks 28. Each of the video reels 151 to 155 rearranges the symbols 501 in such a way that three display blocks 28 are moved (scrolled) downward while changing the speed and the vertically moved symbols 501 in the display blocks 28 are then stopped.

At the left and right edges of the display window 150, payline occurrence columns are provided in a symmetrical manner on the left and right. The left payline occurrence column on the left side when viewed from the player has, as shown in FIG. 14, 19 payline occurrence parts 65L (65La, 65Lb, 65Lc, 65Ld, 65Le, 65Lf, 65Lg, 65Lh, 65Li, 65Lj, 65Lk, 65Ll, 65Lm, 65Ln, 65Lo, 65Lp, 65Lq, 65Lr, and 65Ls).

The right payline occurrence column on the right side when viewed from the player has 19 payline occurrence parts 65R (65Ra, 65Rb, 65Rc, 65Rd, 65Re, 65Rf, 65Rg, 65Rh, 65Ri, 65Rj, 65Rk, 65Rl, 65Rm, 65Rn, 65Ro, 65Rp, 65Rq, 65Rr, and 65Rs).

The left payline occurrence parts 65L form pairs with the respective right payline occurrence parts 65R. From the left payline occurrence parts 65L to the right payline occurrence parts 65R paired with the left payline occurrence parts 65L, paylines L are defined in advance. Note that, although FIG. 14 only shows one payline L for the sake of simplicity, there are ten paylines L in the present embodiment.

A payline L is activated when left and right payline occurrence parts 65L and 65R are connected with each other. In other cases, the paylines are inactive. The number of activated paylines L is determined based on a bet amount. When the bet amount is maximum, i.e., MAXBET, the upper limit of, i.e. 10 paylines are activated. An activated payline L allows the symbols 501 to establish various types of winning combinations. Details of the winning combinations will be described later.

The present embodiment presupposes that the gaming terminal 10 is a so-called video slot machine. The gaming terminal 10 of the present invention, however, may use so-called mechanical reels as some of the video reels 151 to 155.

As shown in FIG. 15, one of code numbers 0 to 19 is assigned to each of the symbols 501 constituting each symbol column. Each symbol column is a combination of symbols 501 which are "specific symbol 510", "A", "Q", "J", "K", "Angelfish", "Clownfish", "Tuna", and "Coelacanth".

Three successive symbols 501 in each of the symbol columns are, as shown in FIG. 14, respectively displayed (arranged) on an upper stage, a central stage, and a lower stage of each of the display region of each of the video reels 151 to 155, to form a symbol matrix of five columns and three rows on the display windows 150. When at least the start button 23 is pressed or the control lever 603 is operated to start a game, the symbols 501 forming a symbol matrix start scrolling. This scrolling of the symbols 501 stops (rearrangement) after a predetermined period elapses from the beginning of the scrolling.

Various kinds of winning combinations are set in advance for each symbol 501. The term "winning combination" indicates that a winning is established. A winning combination is a combination of stopped symbols 501 on the payline L which puts the player in an advantageous state. Examples of an advantageous state include: a state where coins according to a winning combination are paid out, a state where the number of coins to be paid out is added to a credit, a state where a bonus game is started.

A winning combinations in the present embodiment is established when a predetermined number or more of the symbols 501 of at least one type, namely "A", "Q", "J", "K", "BAT", "Angelfish", "Clownfish", "Tuna", or "Coelacanth", are rearranged on an activated payline L. When a predetermined type of symbols 501 is set as scatter symbols, a winning combination is established when a predetermined number or more of scattered symbols are rearranged, no matter whether a payline L is active.

For example, in a base game, when "BAT" symbols 501 forms a winning combination on a payline L, coins (values) calculated by multiplying the basic payout amount of "BAT" by the bet amount are paid out.

(Symbol Table)

FIG. 15 shows a symbol table which is used for determining which symbols 501 are targets of rearrangement in a base game. In the symbol table, symbols 501 on the display blocks 28 in each symbol column are associated with code numbers, and 20 numerical ranges defined by dividing a numerical range of 0 to 65535 by 20 are associated with the respective code numbers.

The numerical range of 0 to 65535 may be equally or unequally divided. When unequally divided, it is possible to adjust the probabilities of winning for the respective types of the symbols 501 by determining the ranges of the random numbers. In this regard, the range corresponding to the specific symbol 510 may be arranged to be narrower than the ranges of the other types of the symbols 501. In this case, results of games can be easily adjusted in accordance of the progress of the games, by arranging valuable types of the symbols 501 to be less likely to be rearranged.

For example, when a random number randomly selected for the first column is "10000", the symbol "J" having the code number 3 associated with the random number range including the selected random number is chosen as the target of rearrangement on the video reel 151 of the first column. On the other hand, when, for example, a random number for the fourth column is "40000", the specific symbol 510 having the code number 12 associated with the random number range including the selected random number is chosen as the target of rearrangement on the video reel 151 of the fourth column.

(Base Game: Bonus Game Screen)

FIG. 14 shows an example of a base game screen which is a display screen in case of base game on the terminal image display panel 16.

More specifically, the base game screen has a display window 150 which is provided at the central portion and has five columns of video reels 151 to 155 and payline occurrence parts 65L and 65R which is symmetrically provided to the left and right of the display window 150. On the base game screen shown in FIG. 14, the video reels 151, 152, and 153 of the first to third columns are stopped whereas the video reels 154 and 155 of the fourth and fifth columns are scrolled.

At the upper parts of the terminal image display panel 16, the credit amount display unit 400 and a bet amount display unit 401 are provided on the left whereas a payout display unit 402 is provided on the right.

The credit amount display unit 400 displays credit amounts. The bet amount display unit 401 displays a bet amount on the currently-running unit game. The payout display unit 402 displays the number of coins to be paid out when a winning combination is established.

In the meanwhile, below the display window 150, a help button 410, a pay-table button 411, and a unit-of-betting display unit 412 are provided. These sections 410, 411, and 412 are provided in this order from left to right for the player.

The help button 410 is pushed by the player so that a help mode is executed. The help mode is a mode for providing information to solve player's questions concerning games.

The pay-table button 411 is pushed by the player so that a payout display mode for displaying the details of a payout is executed. The payout display mode is a mode for displaying an explanation screen explaining a relation between a winning combination and a payout rate for the player.

The unit-of-betting display unit 412 displays a current bet unit (payout unit). The unit-of-betting display unit 412 therefore allows the player to recognize that, for example, the unit of betting is one cent.

Above the display window 150 is provided a payout rate display unit 403. The payout rate display unit 403 is displayed when the player is qualified to participate in a second common game (progressive bonus game), and is not displayed when the player is not qualified. That is to say, when a second common game starts, the player can participate in the common game if the payout rate display unit 403 is displayed. The payout rate display unit 403 displays a payout rate by which a unit payout amount obtained in a second common game is multiplied.

Now, the payout rate indicating that the player is qualified will be described. A qualification is awarded to a gaming terminal 10 as a time during which the player is allowed to participate in a second common game (i.e., game qualification time), in response to betting on a base game. Regarding the awarded game qualification time, a payout rate corresponding to each unit time (one second in the present embodiment) is determined in advance in the normal game qualification time awarding table.

(Normal Game Qualification Time Awarding Table)

FIG. 16 shows a normal game qualification time awarding table which is referred to when a game qualification time is awarded in a base game. The normal game qualification time awarding table is stored in the RAM 243 of the center controller 200. In the normal game qualification time awarding table, game qualification times awarded in a base game and payout rates are determined for each of the numbers of paylines L activated in accordance with a bet amount.

For example, when the number of activated paylines L corresponding to the betting on a base game is one, five seconds are awarded as the game qualification time. The payout rate is therefore one for five seconds of the game qualification time. For example, when the number of activated paylines L corresponding to the betting on a base game is five, five seconds are awarded as the game qualification time. The payout rate is therefore five for five seconds of the game qualification time. As such, the number of activated paylines increases as the bet amount increases in a base game, and a payout rate corresponding to an awarded game qualification time also increases. It is noted that the maximum payout rate in the present embodiment is ten.

(Game Qualification Time Management Table)

The game qualification times of the respective gaming terminals 10 are managed by a game qualification time management table which is temporarily stored in the RAM 243. FIG. 17 shows a game qualification time management table which is updated when a game qualification time is awarded. In the game qualification time management table, an awarded game qualification time and a payout rate are accumulatively stored for each gaming terminal 10.

For example, the game qualification time of the gaming terminal 10a is six seconds for the payout rate of one, 12 seconds for the payout rate of two, 18 seconds for the payout rate of three, and six seconds for the payout rate of four. When the gaming terminal 10a with this arrangement participates in a second common game and a unit payout amount is awarded, the payout is calculated by multiplying the unit payout amount by the highest payout rate, i.e. four. The payout rate display unit 403 of the gaming terminal 10a therefore displays "4x" which indicates that the payout rate is four.

It is noted that, the game qualification time is decreased, by subtracting a unit time from the game qualification time corresponding to the highest payout rate, each time a predetermined time (one second in the present embodiment) elapses. Therefore, when no game qualification time is awarded to the gaming terminal 10a within the first six seconds corresponding to the payout rate of four, the maximum payout rate becomes three.

(Maximum Qualification Time Table)

In addition to the above, the upper limit of the game qualification times that the gaming terminal 10 can accumulatively store is defined in the maximum qualification time table in advance. The maximum qualification time table is stored in the RAM 243 of the center controller 200. As shown in FIG. 18, in the maximum qualification time table, a payout rate is associated with the upper limit of the accumulation of the game qualification times.

In the present embodiment, the total sum of the game qualification times is set to be 40 seconds or shorter. The upper limit of the total sum is not limited to the above. The upper limit may be 60 seconds or may be differently arranged for the respective payout rates as matters of design choice.

(Accumulation Calculation Table)

When a game qualification time is awarded, with reference to the above-described maximum qualification time table, a calculation for updating the game qualification time management table is carried out by using an accumulation calculation table. The accumulation calculation table is stored in the RAM 243 of the center controller 200. As shown in FIG. 19, the accumulation calculation table stores the following matters for each payout rate. That is to say, "before-awarded game qualification time" of the game qualification time management table, "to-be-awarded game qualification time" of the normal game qualification time awarding table in accordance with an activated payline, "awarded game qualification time" calculated by adding the before-awarded game qualification time to the to-be-awarded game qualification time, "accumulation of awarded game qualification time" of all payout rates, "accumulation upper limit of qualification times" of a payout rate set in the maximum qualification time table, "value exceeding the accumulation upper limit of qualification times", and "value from which value exceeding the accumulation upper limit of qualification times is subtracted" calculated by subtracting the "value exceeding the accumulation upper limit of qualification times" from the "accumulation of awarded game qualification time".

For example, when the before-awarded game qualification time is 0 second for the payout rates of five or more, six seconds for the payout rate of four, 16 seconds for the payout rate of three, 14 seconds for the payout rate of two, and two seconds for the payout rate of one, and a bet is made so that the number of paylines L is three, in the game qualification time five seconds are added to the time for the payout rate of three. In this case, the awarded game qualification time is arranged so that six seconds for the payout rate of four, 21 seconds for three, 14 seconds for two, and two seconds for one. As a result, the accumulation of the qualification times of N or higher is as follows: six seconds for the payout rate of four or higher, 27 seconds for three or higher, 41 seconds for two or higher, and 43 seconds for one or higher.

However, the maximum qualification time table defines that the upper limit of the accumulation of the game qualification time is 40 seconds, and a value exceeding this accumulation upper limit is set as a "value exceeding the accumulation upper limit of qualification times" corresponding to the payout rate. For example, the accumulation of the qualification time for the payout rate of two or more is 41 seconds. Because this exceeds the accumulation upper limit of 40 seconds by one second, the "value exceeding the accumulation upper limit of qualification times" is set at one second. On the other hand, the accumulation of the qualification time for the payout rate of one or more is 43 seconds. While this exceeds the accumulation upper limit of 40 seconds by three seconds, the "awarded game qualification time" corresponding to one second is only two seconds, and hence the "value exceeding the accumulation upper limit of qualification times" is set at two seconds.

Then the "value from which value exceeding the accumulation upper limit of qualification times is subtracted" calculated by subtracting the "value exceeding the accumulation upper limit of qualification times" from the "accumulation of awarded game qualification time" is stored. For example, the "value from which value exceeding the accumulation upper limit of qualification times is subtracted" is confirmed as 0 second for the payout rate of five or higher, 6 seconds for four or higher, 21 seconds for three or higher, 13 seconds for two or higher, and 0 second for one or higher. The game qualification time management table is updated with the calculation results above.

(Quick Catch Bonus Normal Payout Table and Quick Catch Bonus Special Payout Table)

Now, a quick catch bonus normal payout table and a quick catch bonus special payout table shown in FIG. 20 and FIG. 21 will be described. A quick catch bonus game is a game that occurs at the probability of 1/80 when, as a result of a base game executed by the gaming terminal 10, no specific symbol 510 stops in the display block 28 where the video reel 153 stops and the ground bait bonus is not awarded. As detailed below, when this quick catch bonus game occurs, random determination is conducted based on the quick catch bonus normal payout table or the quick catch bonus special payout table, and a benefit is awarded. The quick catch bonus normal payout table and the quick catch bonus special payout table are stored in the RAM 243 of the center controller 200.

In the quick catch bonus normal payout table, a winning probability corresponding to the type of benefit is set in advance for each number of paylines L activated in accordance with a bet amount. For example, when the number of paylines activated in response to one bet is one, a game qualification time corresponding to one bet is randomly awarded at a winning probability of 311/18038. More specifically, with reference to the normal game qualification time awarding table shown in FIG. 14, a game qualification time corresponding to the payout rate of one associated with one activated payline is awarded for five seconds. In the meanwhile, when the number of activated paylines in response to five bets is five, a game qualification time corresponding to the five bets is randomly awarded at a winning probability of 311/18038. More specifically, with reference to the normal game qualification time awarding table shown in FIG. 16, a game qualification time corresponding to the payout rate of five associated with five activated paylines is awarded for five seconds.

Now, the quick catch bonus special payout table will be described. The winning probability in the quick catch bonus special payout table is calculated by adding, to the winning probability in the quick catch bonus normal payout table, a value calculated by multiplying the above-described "value exceeding the accumulation upper limit of qualification times" by a predetermined value (which is "80/18038" in the present embodiment but is a changeable matter of design choice). In other words, the quick catch bonus special payout table is a payout table which is updated from time to time based on the "value exceeding the accumulation upper limit of qualification times" which is calculated when the game qualification time exceeds the upper limit.

For details, an example of the quick catch bonus special payout table will be described with reference to FIG. 21. It is noted that the following description also assumes that the accumulation calculation table shown in FIG. 19 is used. For example, in the accumulation calculation table, "one second" is stored as the "value exceeding the accumulation upper limit of qualification times" corresponding to the payout rate of two. In this case, a value calculated by multiplying the "one second" which is the "value exceeding the accumulation upper limit of qualification times" corresponding to the payout rate of two by "80/18038" is added to the value of the winning probability corresponding to the "game qualification time corresponding to two bets". As a result, the winning probability corresponding to the "game qualification time corresponding to two bets" and the case where "the number of activated payline is one" is "0+80/18038" and a value "80" is stored in the winning probability field, the winning probability corresponding to the "game qualification time corresponding to two bets" and the case where "the number of activated payline is two" is "311/18038+80/18038", a value "391" is stored in the winning probability field, the winning probability corresponding to the "game qualification time corresponding to two bets" and the case where "the number of activated payline is three" is "0+80/18038" and a value "80" is stored in the winning probability field, the winning probability corresponding to the "game qualification time corresponding to two bets" and the case where "the number of activated payline is five" is "0+80/18038" and a value "80" is stored in the winning probability field, and the winning probability corresponding to the "game qualification time corresponding to two bets" and the case where "the number of activated payline is ten" is "0+80/18038" and a value "80" is stored in the winning probability field.

Furthermore, in the accumulation calculation table above, "two seconds" is stored as the "value exceeding the accumulation upper limit of qualification times" corresponding to the payout rate of one. In this case, a value calculated by multiplying the "two seconds" which is the "value exceeding the accumulation upper limit of qualification times" corresponding to the payout rate of one by "80/18038" is added to the value of the winning probability corresponding to the "game qualification time for one bet" field. As a result, the winning probability corresponding to the "game qualification time for one bet" and the case where "the number of activated payline is one" is "311/18038+160/18038" and a value of "471" is stored in the winning probability field, the winning probability corresponding to the "game qualification time for one bet" and the case where "the number of activated payline is two" is "0+160/18038" and a value of "160" is stored in the winning probability field, the winning probability corresponding to the "game qualification time for one bet" and the case where "the number of activated payline is three" is "0+160/18038" and a value of "160" is stored in the winning probability field, the winning probability corresponding to the "game qualification time for one bet" and the case where "the number of activated payline is five" is "0+160/18038" and a value of "160" is stored in the winning probability field, and the winning probability corresponding to the "game qualification time for one bet" and the case where "the number of activated payline is ten" is "0+160/18038" and a value of "160" is stored in the winning probability field.

(Base Game: Bonus Game Screen)

Figure 22:
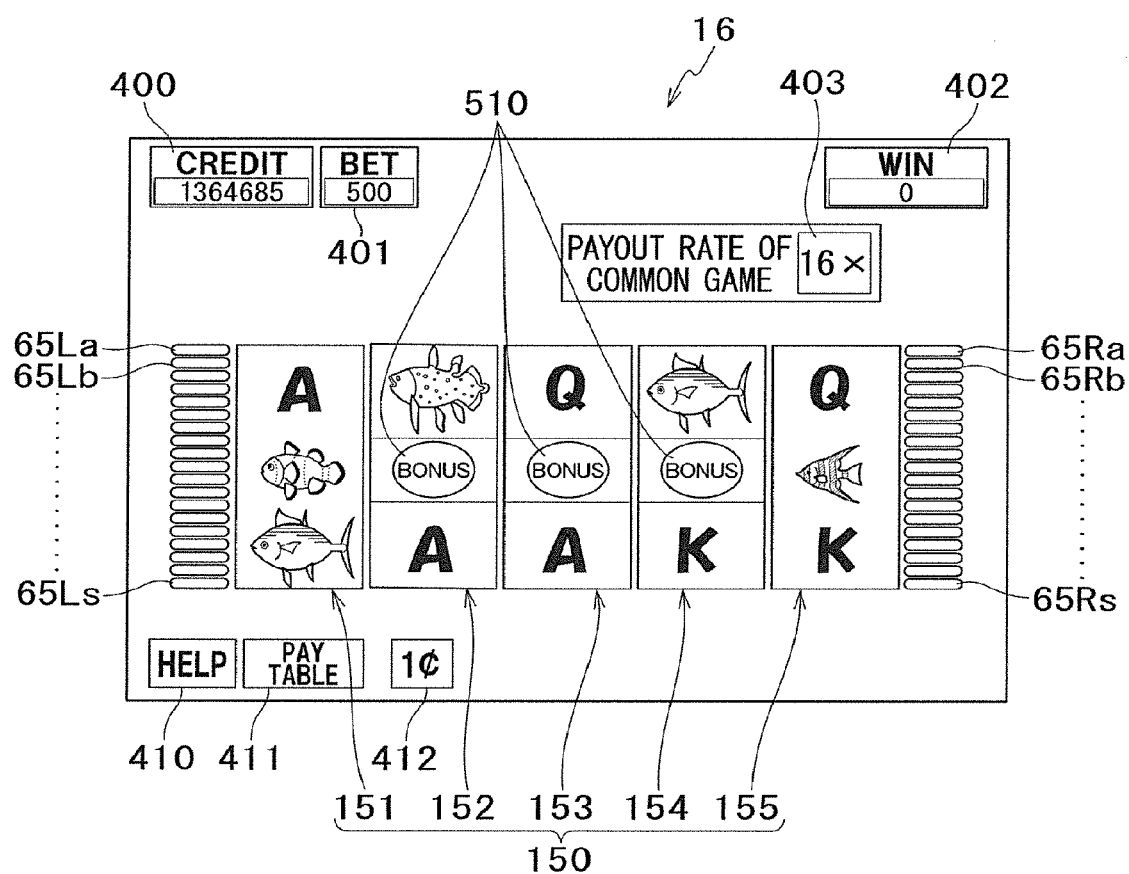
FIG. 22 shows an example of a display screen of a base game.

FIG. 22 shows an example of a base game screen on the terminal image display panel 16, when the start of an independent special game which is a bonus game is determined. In the base game screen shown in FIG. 22, all of the video reels 151 to 155 in the first to fifth columns are stopped, and three symbols 501 of "specific symbol 510" are stopped at the central stages of the video reels 152 to 154 of the second to fourth columns. This triggers the start of an independent special game which is independently run by the gaming terminal 10. The stop mode of the specific symbols 510 triggering an independent special game is not limited to this. The trigger may be a predetermined number or more of "specific symbols 510" on one of the paylines L. Furthermore, such triggering does not necessarily need the "specific symbols 510" to be stopped on a payline. For example, a game may be triggered on condition that a predetermined number or more of specific symbols 510 are provided on any display blocks 28, based on the scatter symbol method.

Figure 23:
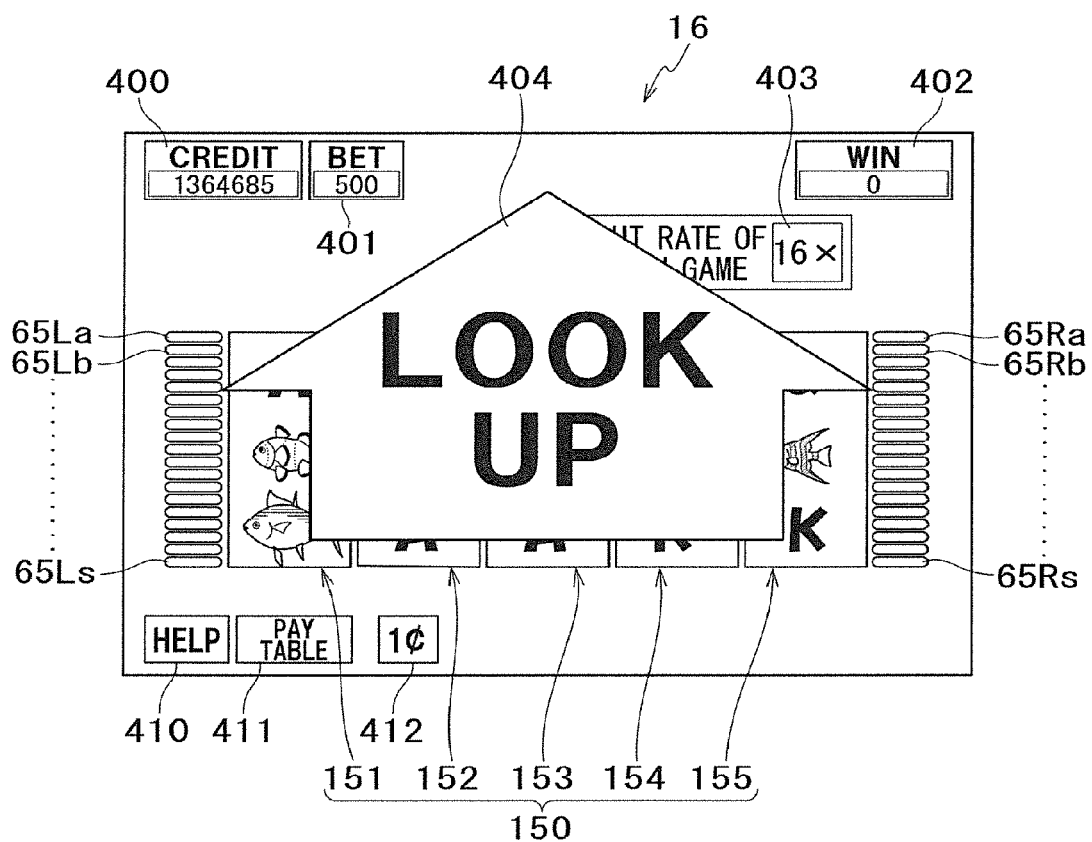
FIG. 23 illustrates a display state of a terminal image display panel and an upper display.

FIG. 23 illustrates the display states on the terminal image display panel 16 and the upper display 700 during the independent special game. During the independent special game, the terminal image display panel 16 displays a lookup display unit 404. As shown in FIG. 23, the lookup display unit 404 is displayed at the central part of the terminal image display panel 16, notifying the player that the terminal image display panel 16 is not used in the independent special game and the player is instructed to see the upper display 700.

Figure 25:
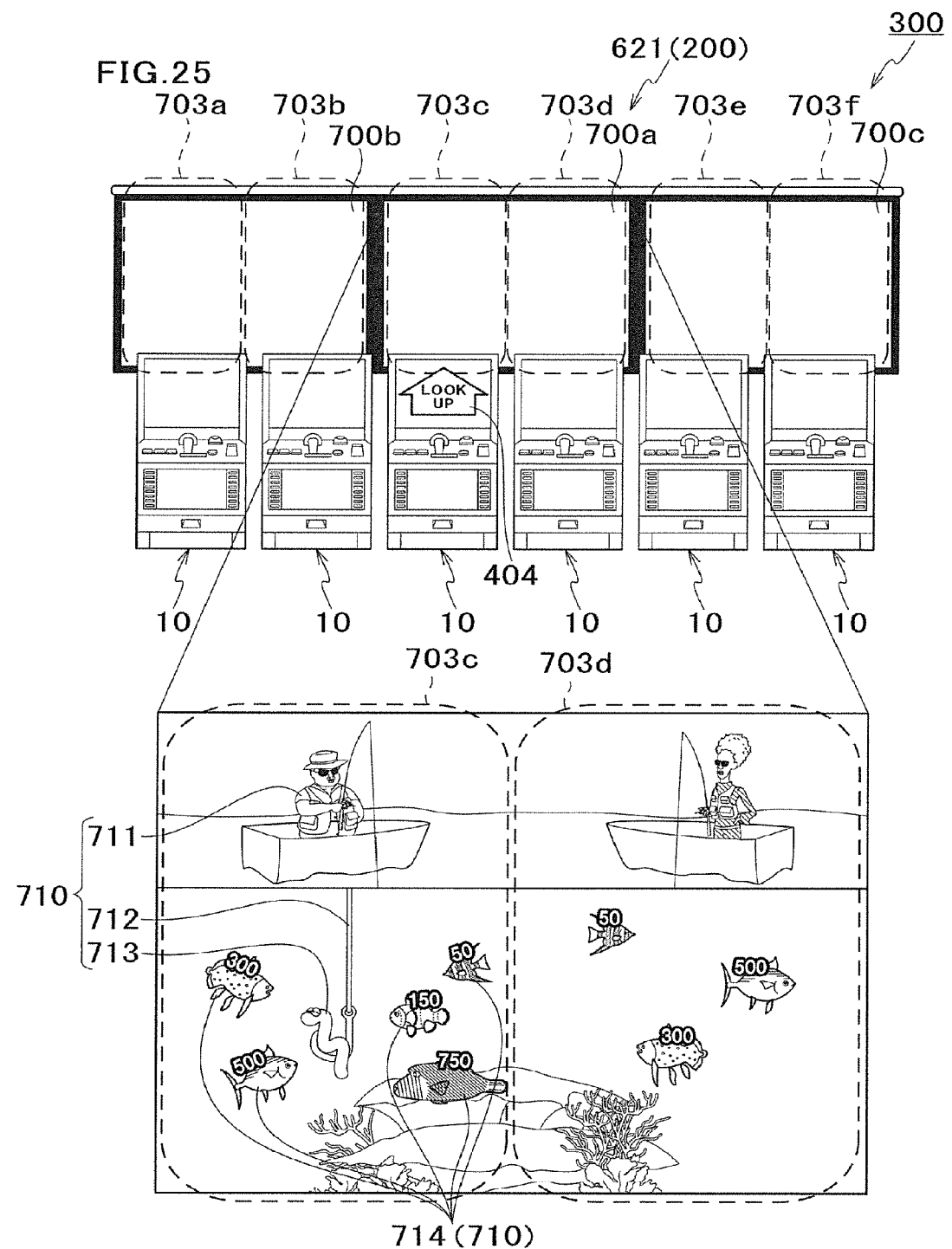
FIG. 25 illustrates a display state on the upper display during an independent special game.

FIG. 25 illustrates a display state on the upper display 700 during an independent special game. The upper display 700 constituted by the three upper displays 700a, 700b, and 700c is arranged to display a single common effect display screen. The common effect display screen is constituted by gaming terminal areas 703a to 703f corresponding to the six gaming terminals 10a to 10f, respectively.

In FIG. 25, the gaming terminal 10c is running an independent special game, and the terminal image display panel 16 of the gaming terminal 10c is displaying the lookup display unit 404. In the independent special game, the gaming terminal area 703c corresponding to the gaming terminal 10c displays an individual image 710 for the independent special game.

More specifically, the individual image 710 includes a fisherman image 711, a fishhook image 712, a fishing bait image 713, and fish images 714. The fisherman image 711 is displayed at an upper part of each of the gaming terminal areas 703a to 703f. The fisherman image 711 is different in each gaming terminal 10, to make it possible to understand how the gaming terminals 10 correspond to the respective gaming terminal areas 703a to 703 on the common effect display screen.

The fishhook image 712 is displayed substantially at the center of each of the gaming terminal areas 703a to 703f running an independent special game. The fishhook image 712 is displayed with a display pattern in accordance with the movement of the control lever 603. The fishing bait image 713 is displayed at the lower end portion of the fishhook image 712. The fishing bait image 713 is enlarged when a bonus corresponding to a predetermined unit payout amount (3000 in the present embodiment) or higher is won in the independent special game.

Each fish image 714 corresponds to a bonus awarded in a bonus game. The fish image 714 indicates, by the size of the fish, a unit payout amount in a bonus game, and also the unit payout amount is indicated by a number. In the gaming terminal area 703 in which an independent special game is run, a plurality of fish images 714 are displayed and these fish images 714 approach the fishing bait image 713 or swim beside the fishing bait image 713.

(Bonus Type Table)

Now, referring to a bonus type table shown in FIG. 26, bonuses corresponding to the fish images 714 will be described. The bonus type table stores bonus types, unit payout amounts, and ranks in association with one another. It is noted that the bonus type table is stored in both the RAM 43 of the gaming terminal 10 and the RAM 243 of the center controller 200.

For example, "Blue Marlin" corresponds to the unit payout amount of 10000 and is ranked at number one. Therefore, when the Blue Marlin is displayed on the gaming terminal area 703 as a fish image 714, the number "10000" is displayed with the fish image. Furthermore, since the unit payout amount is not lower than the predetermined amount (3000), the fishing bait image 713 is enlarged when the Blue Marlin is won.

(Independent Special Game Probability Table)

The payout amount of the independent special game is determined based on an independent special game probability table shown in FIG. 27. Though not illustrated, plural types of independent special game probability tables are stored, and which table is used is determined based on the number of paylines L activated at the start of the independent special game. In the independent special game probability table, random number ranges defined by dividing the numerical range of 0 to 65535 are associated with winning bonus types. In the winning bonus type field, at least one bonus is stored. For example, when a random number is 250, the winning bonus types to be awarded are Wahoo, Black Sea Bass, and Halibut, and payouts corresponding to all of these are to be awarded.

Figure 28:
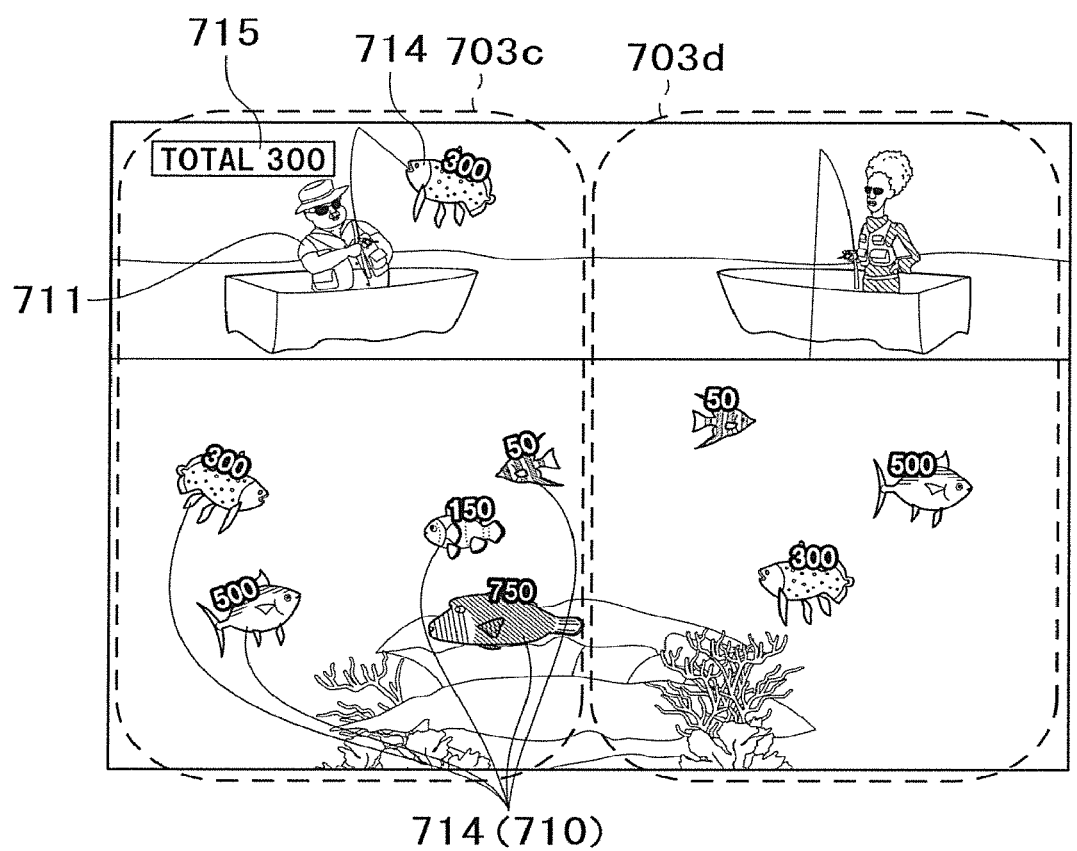
FIG. 28 shows an example of a display screen of an independent special game.

FIG. 28 shows an example of a winning screen displayed in an independent special game. On the winning screen, a display pattern in which a fisherman image 711 catches a fish image 714 is displayed. On the winning screen, moreover, a total display unit 715 is displayed at an upper part of the gaming terminal area 703. The total display unit 715 displays a total sum of bonuses having been won. The number displayed on the total display unit 715 in the end is the total amount of bonuses to be awarded. It is noted that the caught fish images 714 are displayed with sizes corresponding to the ranks defined in the bonus type table shown in FIG. 24. More specifically, a bonus type having a high rank is associated with a large unit payout amount, and the size of the caught fish image 714 corresponding thereto is large.

In addition to the above, a mystery bonus is executed as a bonus game. The mystery bonus is not generated on condition that a predetermined number or more of specific symbols 510 are stopped as in the independent special game. The mystery bonus randomly starts when the specific symbol 510 is not stopped at the video reel 153 of the third column.

The random determination of the start of the mystery bonus is conducted based on a mystery bonus start random determination table shown in FIG. 29. In the mystery bonus start random determination table, random number ranges corresponding to "occurrence of mystery bonus", "effect only", and "non-occurrence of mystery bonus" are determined for each number of activated paylines L.

For example, when the number of paylines L is three and the determined random number is "2", an effect of mystery bonus is conducted and the mystery bonus is awarded as a payout. When the number of paylines L is three and the determined random number is "5", only an effect of mystery bonus is conducted. When the number of paylines L is three and the determined random number is "15", nothing is conducted and the base game is continued.

When the mystery bonus occurs, a bonus to be won is determined with reference to a mystery bonus probability table shown in FIG. 30. Though not illustrated, plural types of mystery bonus probability tables are stored, and the table to be used is determined in accordance with the number of paylines L activated when the mystery bonus starts. In the mystery bonus probability table, random number ranges defined by dividing a numerical range of 0 to 5000 are associated with winning bonus types. In the winning bonus type field, one bonus is stored.

Figure 31:
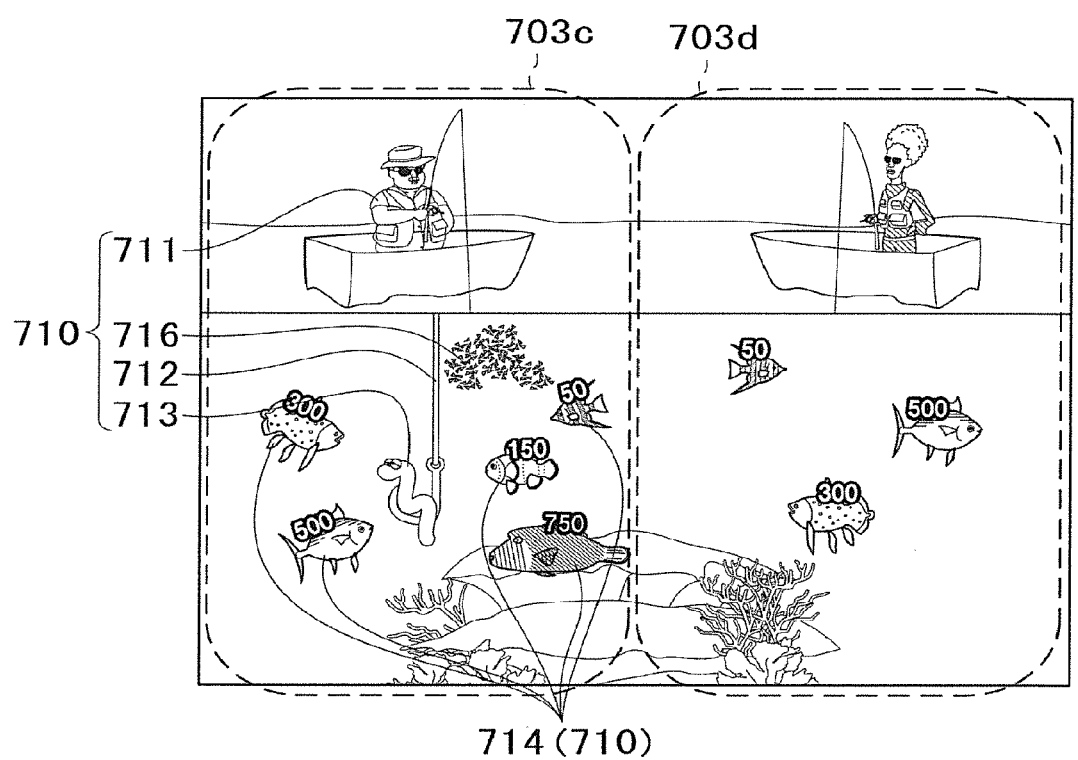
FIG. 31 shows an example of a display screen of a mystery bonus.

Whether the mystery bonus is started is determined with reference to the mystery bonus start random determination table and "occurrence" or "only effect" is selected, a mystery bonus effect screen shown in FIG. 31 is displayed. On the mystery bonus effect screen, a ground bait image 716 falling from an upper part to a lower part is displayed in the gaming terminal area 703 corresponding to the gaming terminal 10 which has been selected to display an effect screen. At the same time, in a similar manner as the independent special game, the terminal image display panel 16 displays the lookup display unit 404 shown in FIG. 23. Thereafter, if "occurrence" has been selected, a winning screen shown in FIG. 28 is displayed and the mystery bonus is finished.

Note that, when the condition to start a common game is established while the above-described independent special game and mystery bonus are being executed, the common game starts after the effect display, awarding of payout or the like of the independent special game and the mystery bonus is finished.

(Common Game)

Now, the common game run at a plurality of gaming terminals 10 in synchronization with one another will be described. In regard to the common game, random determination as to whether to start the common game is conducted at predetermined intervals (every one second in the present embodiment), with reference to a common game start random determination table shown in FIG. 32. The common game starts when the result of the random determination indicates to do so. It is noted that there are two types of common games, namely a first common game (equivalent to the fishing game of the present invention) and a second common game (progressive bonus game). In the random determination as to whether to start the common game above, which one of the two types of common games is started is randomly determined when the result of the random determination is "Run Common Game". For this random determination, a common game type random determination table shown in FIG. 33 is used.

(Common Game Start Random Determination Table)

As shown in FIG. 32, the common game start random determination table defines random number ranges corresponding to "occurrence of common game" and "non-occurrence of common game", respectively. In the present embodiment, one of the numbers from 0 to 1214 is randomly selected in the random determination of whether to start a common game (whether a common game occurs), and the random number range for the "Run Common Game" is 0 to 3 The random number range for the "No Common Game" is 4 to 1214. Therefore, when, for example, a selected random number is "1", an effect of the start of the common game (e.g., displaying a common game start effect image shown in FIG. 34A) is conducted and then the common game starts. When the determined random number is "15", nothing is carried out and the base game is continued.

(Common Game Type Random Determination Table)

As shown in FIG. 33, the random number ranges are set for the "First Common Game" and the "Second Common Game (Progressive Bonus Game)", respectively. In the present embodiment, one of the numbers 0 to 109 is randomly selected in the random determination as to which one of the two types of common game is to be run, and the random number range of 0 to 96 is set for the "First Common Game". The random number range of 97 to 109 is set for the "Second Common Game (Progressive Bonus Game)". Therefore, for example, when the selected random number is "1", the first common game is to be run. In the meanwhile, for example, when the selected random number is "100", the second common game (progressive bonus game) is to be run. In the present embodiment, a gaming terminal 10 which is qualified to participate in the first common game is randomly selected. On the other hand, a gaming terminal 10 qualified to participate in the second common game is a gaming terminal 10 which has received the game qualification time at the start of the second common game.

(Common Game: Common Game Start Effect Image)

Figure 34A:
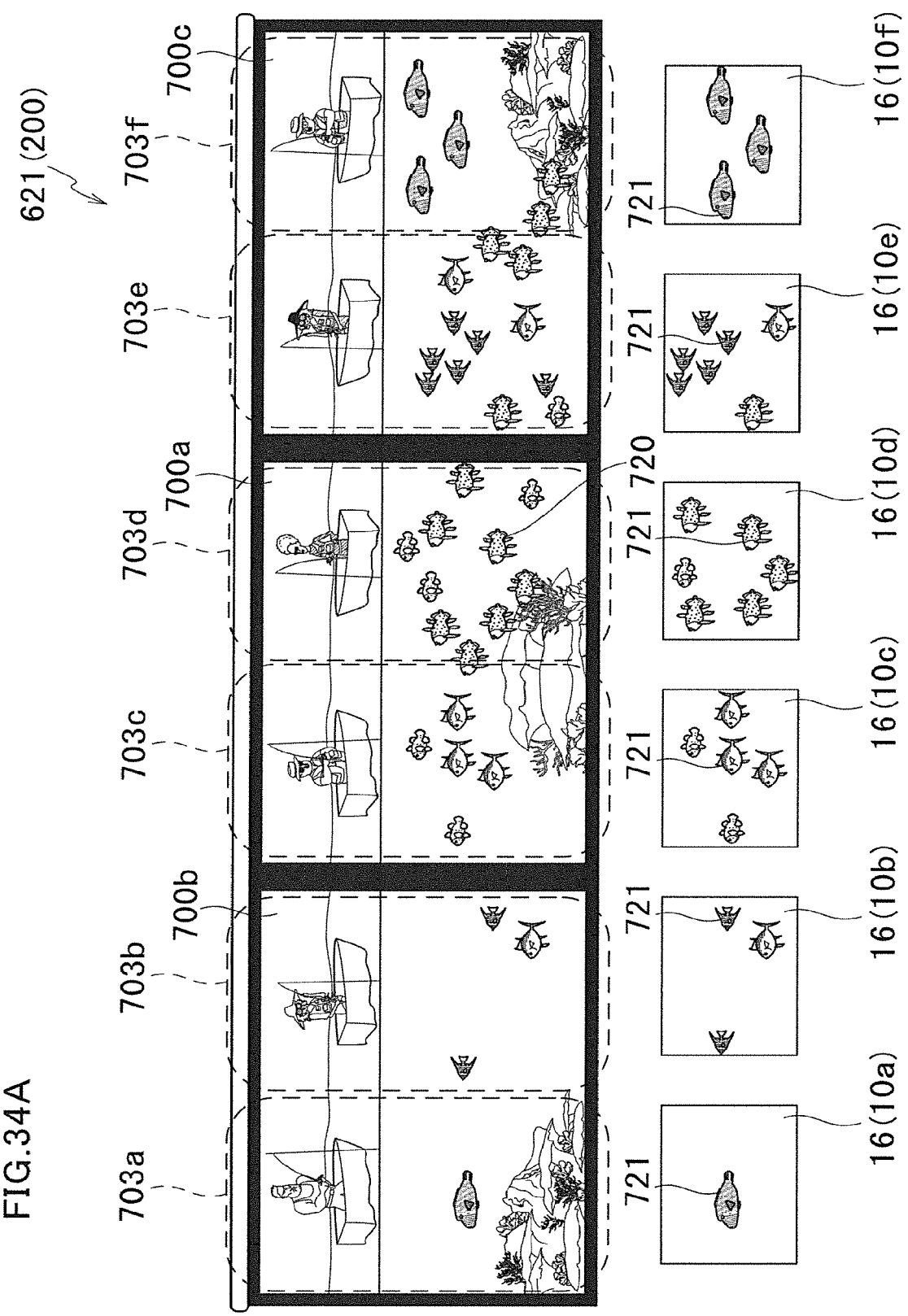
FIG. 34A illustrates an example of a common game start effect image.

As described above, the common game start effect image is displayed before the start of the common game. In this regard, the displayed common game start effect image is varied in accordance with the type of the common game to be run. The common game start effect image is stored in the RAM 243 of the center controller 200. As shown in FIG. 34A, the same common game start effect image is displayed on the upper display 700 and on the terminal image display panel 16 of each of the six gaming terminals 10.

More specifically, the upper display 700 displays a game start effect image in which a fish school image 720 showing many fishes of plural types passing from left to right is displayed as shown in FIG. 34A. Furthermore, a fish school image 721 identical with that displayed on the corresponding one of the gaming terminal areas 703a to 703f of the upper display 700 is displayed on the terminal image display panel 16 of each of the gaming terminals 10a to 10f.

The game start effect image is divided into sets of data corresponding to the six gaming terminal areas 703, respectively. The center controller 200 distributes these sets of data to the respective gaming terminals 10, thereby allowing the upper display 700 and the terminal image display panels 16 to display the game start effect image in the same manner.

(Common Game: First Common Game)

Now, the first common game will be described. Each of FIGS. 1 and 34B illustrates the display state on the upper display 700 during the first common game. The upper display 700 constituted by the three upper displays 700a, 700b, and 700c is arranged to display a single common effect display screen. The common effect display screen is constituted by gaming terminal areas 703a to 703f corresponding to the six gaming terminals 10a to 10f, respectively.

In FIG. 34B, all gaming terminals 10 are running the common game, and the terminal image display panels 16 of all gaming terminals 10 conduct the lookup display. In the first common game, the gaming terminal area 703 corresponding to each gaming terminal 10 participating in the first common game displays a game image of the first common game. More specifically, the gaming terminal area 703 corresponding to each gaming terminal 10 participating in the common game displays an individual image 710 including a fisherman image 711, a fishline image 712a, a lure image 713a, a fish image 714, and a total display unit 715.

The fisherman image 711 is an avatar of the player at the gaming terminal 10 participating in the first common game. The fishline image 712a and the lure image 713a are displayed as properties of the player. That is to say, as the reel handle 6043 of the control lever 603 is operated by the player, the position of the lure image 713a which is displayed as a property of player is changed. This change in the position of the lure image 713a will be detailed below with reference to FIG. 35A, FIG. 35B, and FIG. 35C. When the fisherman image 711 corresponding to the player successfully catches the fish image 714, the player succeeds in the fishing.

In the first common game, the fishing is executed for a predetermined number of times within a predetermined time. In the first fishing, an image showing the fisherman image 711 on standby is displayed, and then an image showing that the fish image 714 is hooked by the lure image 713a on the fishline image 712a (i.e., a fish hooked image shown in FIG. 36) is displayed. After a fish hooking time (equivalent to the "predetermined time" in the present invention) starting from the hooking of the fish image 714 by the fishline image 712a elapses, an image indicating the failure in the fishing (i.e., a failure image shown in FIG. 37, FIG. 38A, and FIG. 38B) or an image (success image) indicating the success in the fishing is displayed. In the present embodiment, the game progress at each gaming terminal 10 participating in the first common game is randomly determined at the start of the execution of the first common game. The game progress determined at this point includes at least the number of times of the fishing executed in the first common game, the type (size) of the fish image 714 hooked by the fishline image 712a in each fishing, a result of each fishing, and the total payout amount to be paid out in the first common game. The game progress at each gaming terminal 10 is determined based on a game progress determination table Da10 shown in FIG. 40. The details of the determination regarding the game progress by using the game progress determination table Da10 will be given later. Furthermore, the details of the fish hooked image and the failure image will be given later.

The individual image 710 displays a count display unit 720. This count display unit 720 displays a remaining time of the first common game. When the time indicated by the count display unit 720 reaches 0, the payout amount shown in the total display unit 715 is awarded as a payout. In the present embodiment, all gaming terminals 10 participating in the first common game have the same allotted time (time length of participating in the first common game), the terminals may have different allotted times.

Each fish image 714 is provided with a payout amount (credit amount). The payout amount is set in accordance with the size of fish. The payout amounts are "500" for the "extra large" fish, "300" for the "large" fish, "150" for the "middle" fish, and "100" for the "small" fish. Each gaming terminal 10 participating in the first common game receives the total of the payout amount (total payout amount) associated with the fish image 714 that the player has caught during the allotted time. In the present embodiment, the awarding of the total payout amount is conducted at once after the end of the first common game.

(Common Game: Change in Position of Lure Image 713a in First Common Game)

Figure 35A:
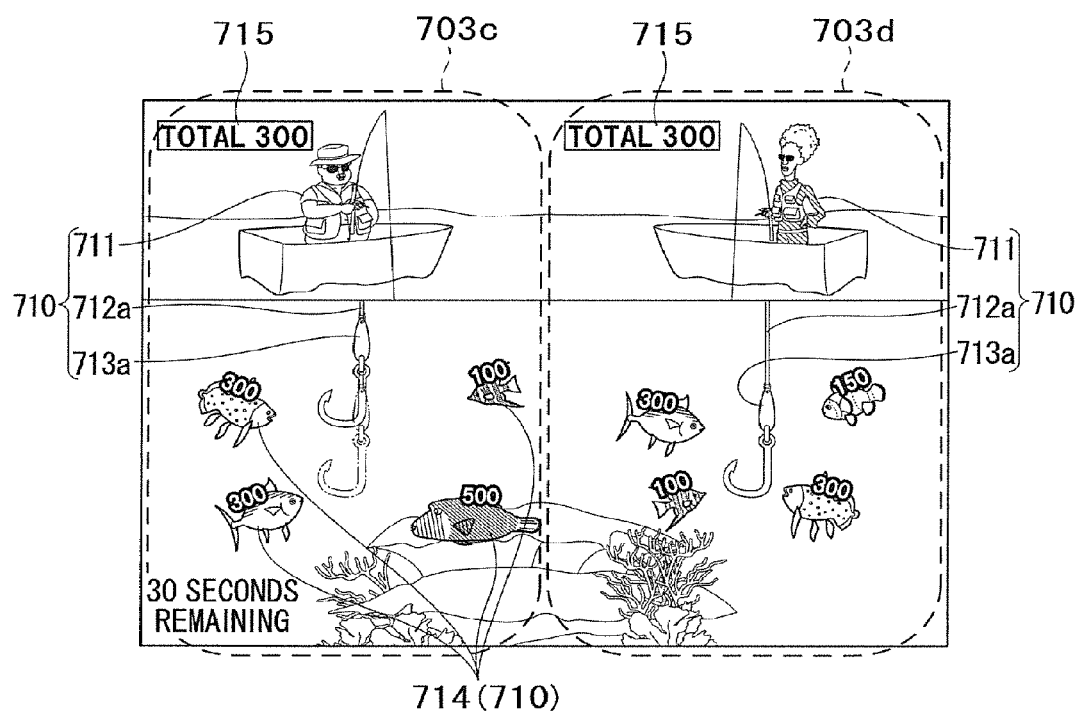
FIG. 35A illustrates the display state on the upper display 700 after the rotation of the reel handle starts in the first common game.
Figure 35B:
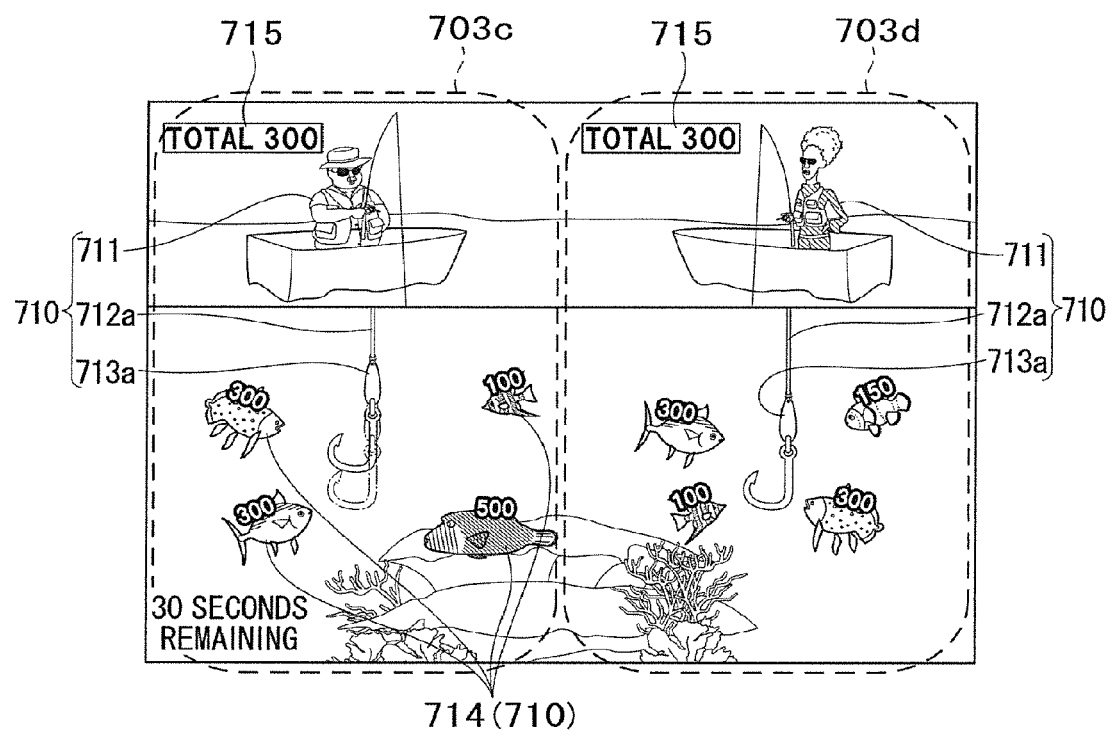
FIG. 35B illustrates the display state on the upper display 700 after the rotation of the reel handle starts in the first common game.
Figure 35C:
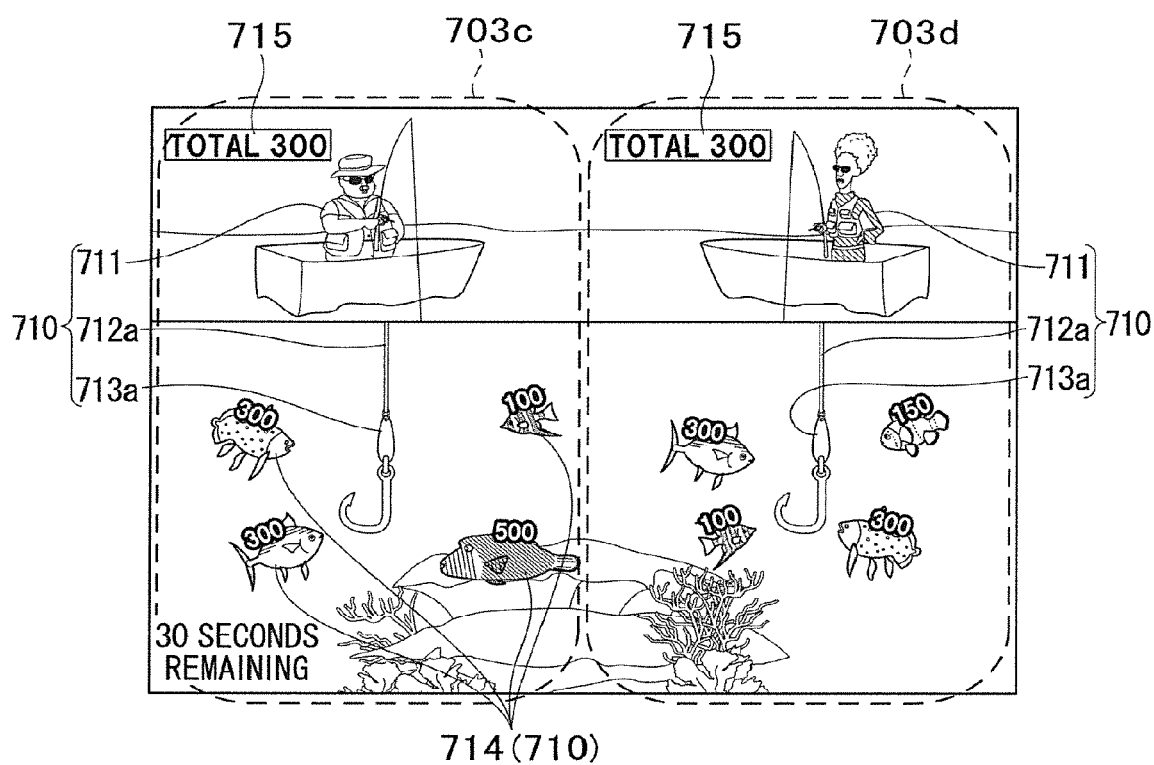
FIG. 35C illustrates the display state on the upper display 700 after the rotation of the reel handle starts in the first common game.

Now, referring to FIG. 35A to FIG. 35C, a change in the position of the lure image 713a in accordance with the player's operation of the reel handle 6043 of the control lever 603 will be described. FIG. 35A to FIG. 35C illustrate the display states of the upper display 700 after the start of the rotation of the reel handle 6043 in the first common game. In the present embodiment, when the start of the rotation of the reel handle 6043 is detected, image display is conducted such that the position of the lure image 713a corresponding to the gaming terminal 10 having that reel handle 6043 moves in a vertical direction in accordance with the rotation speed of the reel handle 6043.

In the example shown in FIG. 35A to FIG. 35C, the start of the rotation of the reel handle 6043 of the gaming terminal 10*c* is detected by the rotation sensor 6044. Therefore, as shown in FIG. 35A, the position of the lure image 713*a* corresponding to the gaming terminal 10*c* (i.e., the position of the left lure image 713*a* on the upper display 710*a*) is changed. Although the position before the change is indicated by a dashed line for convenience of explanation, such a line is not displayed in actual games. Thereafter, the position of the lure image 713*a* is returned to the original position in a predetermined time (several seconds). In FIG. 35B, because the time elapsed from the detection of the start of the rotation is longer than that in FIG. 35A, the lure image 713*a* is considerably returned toward the original position. In FIG. 35C, the elapsed time is longer than the above two cases, and hence the lure image 713*a* has completely been returned to the original position.

As described above, when the start of the rotation of the reel handle 6043 is detected, the position of the lure image 713*a* is displayed in an upper part, and the image is gradually returned to the original position. As such, because the position of the lure image 713*a* is changed in a manner similar to an actual change in the position of the reel in actual fishing, the player feels as if he/she is actually enjoying fishing. Although in the present embodiment the position of the lure image 713*a* is changed, a bait image or a fishhook image may be displayed in place of the lure image 713*a* and the position thereof may be changed.

(Common Game: First Common Game: Fish Hooked Image)

Figure 36:
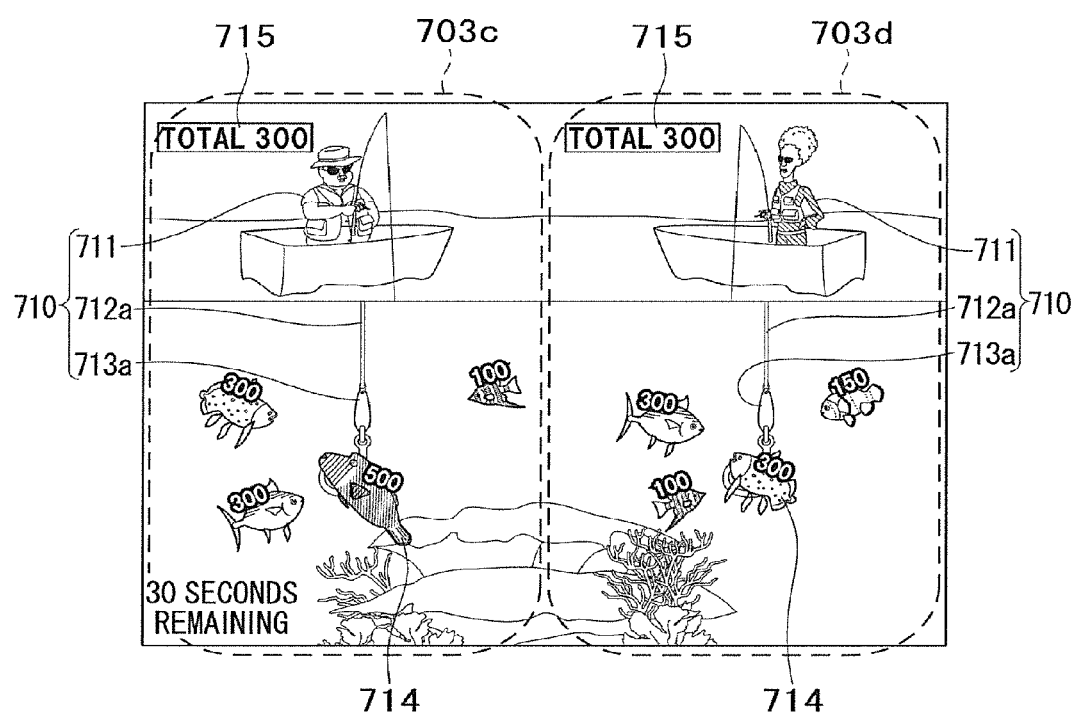
FIG. 36 shows an example of a fish hooked image.

Now, the fish hooked image will be described with reference to FIG. 36. FIG. 36 shows an example of the fish hooked image. The fish hooked image shown in FIG. 36 illustrates a situation where a fish image 714 is hooked by the fishline image 712*a* with the lure image 713*a* of the gaming terminal 10*c*. In FIG. 36, by the fishline image 712*a* in the gaming terminal area 703*c* corresponding to the gaming terminal 10*c*, an "extra large" fish image 714 is hooked. Because the "extra large" fish image 714 is associated the payout amount of 500 credits, 500 credits are awarded to the player when the player succeeds in the fishing of the hooked fish image 714 (i.e., when the player succeeds in fishing). In the meanwhile, by the fishline image 712*a* of the gaming terminal area 703*d* corresponding to the gaming terminal 10*d*, a "large" fish image 714 is hooked. Because the "large" fish image 714 is associated with the payout amount of 300 credits, 300 credits are awarded to the player when the player succeeds in the fishing of the hooked fish image 714 (i.e., when the player succeeds in fishing).

(Common Game: First Common Game: Failure Image)

Figure 37:
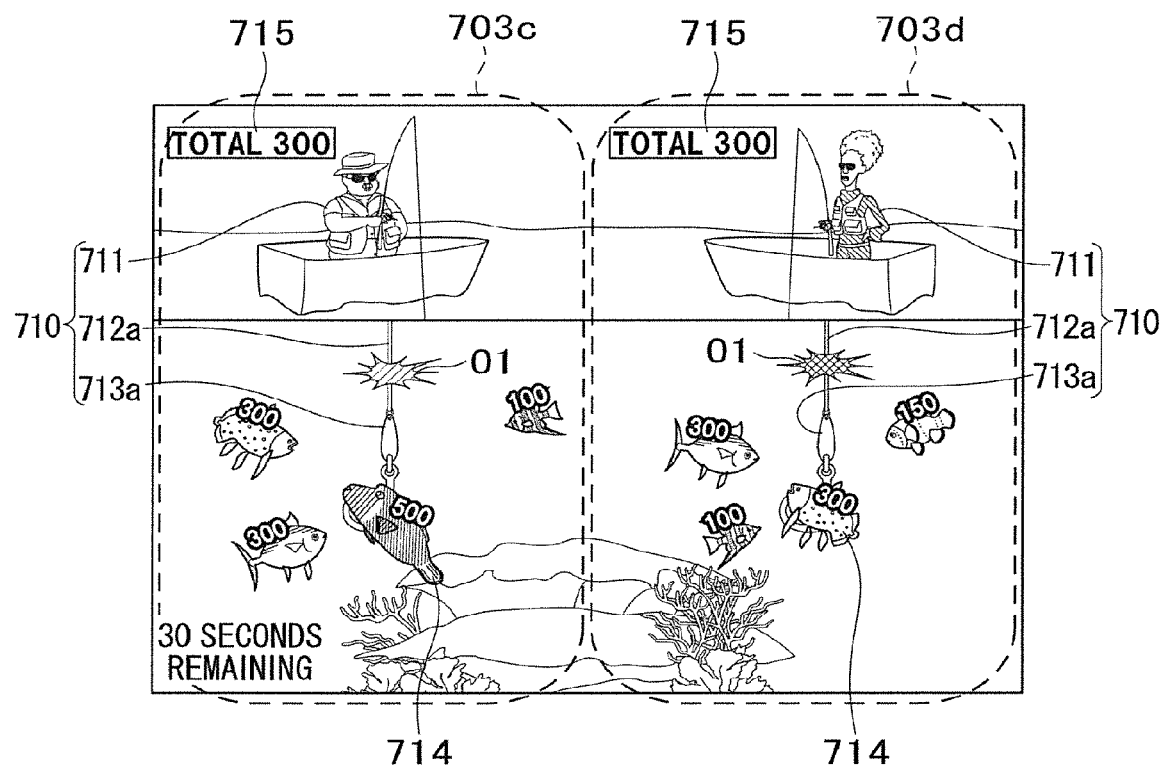
FIG. 37 shows an examples of a failure image.
Figure 38A:
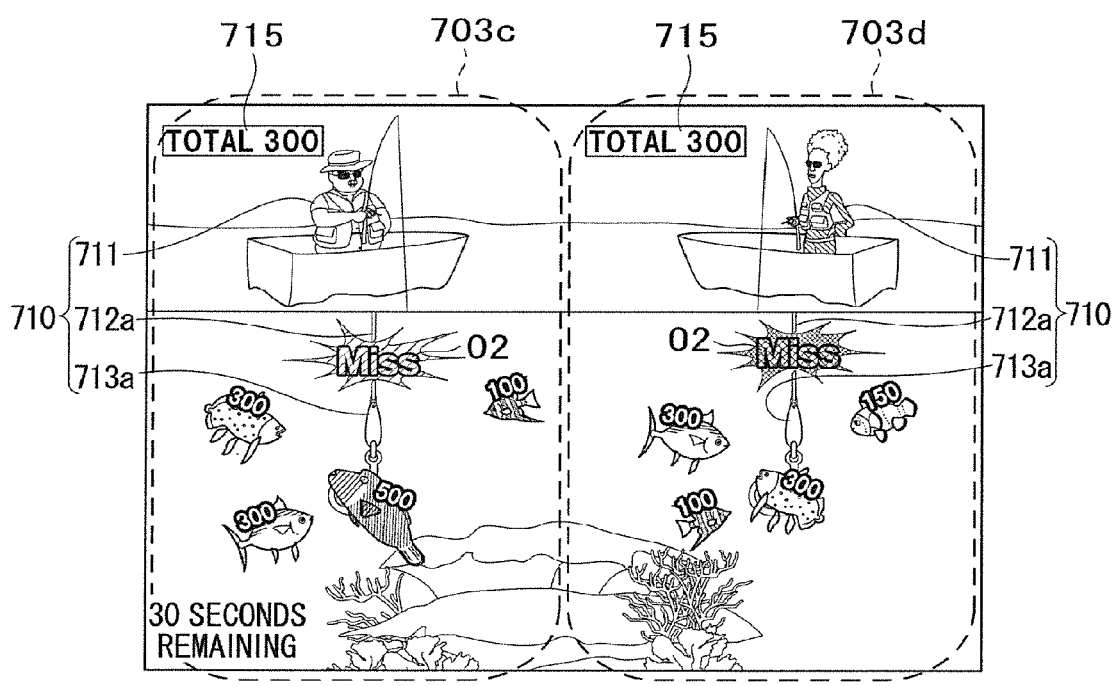
FIG. 38A shows another example of the failure image.
Figure 38B:
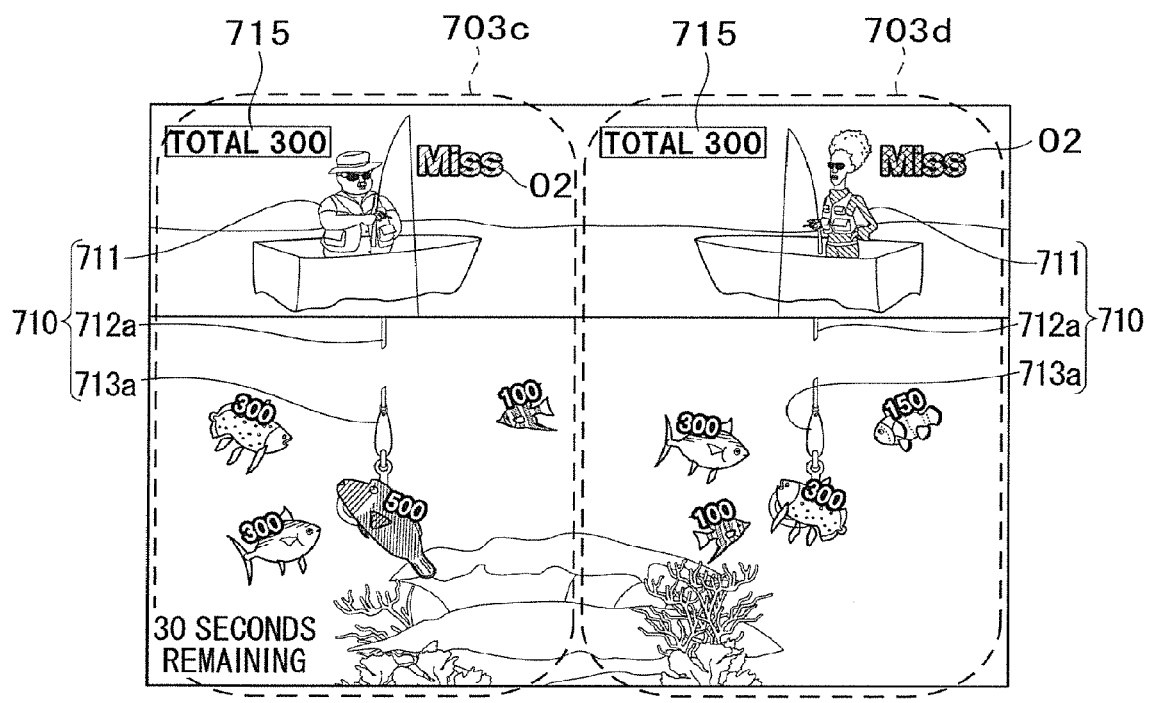
FIG. 38B shows a further example of the failure image.

Now, the failure image will be described with reference to FIG. 37, FIG. 38A, and FIG. 38B. FIG. 37 shows an example of the failure image. As described above, the failure image is an image indicating the failure in fishing. After the fish hooked image is displayed for a gaming terminal 10, when the failure image is displayed for the same gaming terminal 10, the payout amount set for the fish image 714 is not awarded to the player of that gaming terminal 10. The failure image shown in FIG. 37 is an image in which a failure object image O1 indicating the failure in fishing is superposed on the fishline image 712*a*. A non-limiting example of the shape of the failure object image O1 in the present embodiment is a flat cloud shape.

The display state of the failure object image O1 is selected from a plurality of display states based on the number of rotation of the reel handle 6043 (equivalent to the "control lever" in the present invention) during a fish hooking time, i.e., a time from the display of the fish hooked image to the display of the failure image. In the present embodiment, the display state is the color of the failure object image O1. Based on the level of the number of rotation of the reel handle 6043 during the fish hooking time, the image data is selected from the image data of "blue" failure object image O1 (equivalent to the "display state data" in the present invention), the image data of "yellow" failure object image O1 (equivalent to the "display state data" in the present invention), and the image data of "red" failure object image O1 (equivalent to the "display state data" in the present invention), and a game image with which the selected image data is synthesized is displayed as the failure image.

While in the present embodiment the failure object image O1 is cloud-shaped, the image O1 may be differently shaped such as square or circle. Furthermore, the failure object image O1 may be a text image as shown in FIG. 38A. The failure object image O1 may not be displayed on the fishline image 712*a*. For example, as shown in FIG. 38B, the failure object images O1 and O2 may be displayed at positions such as to the next to the fisherman image 711. While the display state in the present embodiment is the color of the failure object image O1, the display state may be a color, shape, size, or a combination thereof.

The time from the display of the fish hooked image to the display of the failure image corresponds to a time in actual fishing, during which the fisher turns the reel and tries to catch the fish while adjusting the length of the fishline. During this time, the tension of the fishline increases as the fisher turns the reel. According to the arrangement above, by turning the reel handle 6043, the player feels as if he/she is actually turning the reel. With the display state (color) corresponding to the level of the number of rotation of the reel handle 6043 during the time from the display of the fish hooked image to the display of the failure image, the failure image (failure object image O1) is displayed. With this, the failure image (failure object image O1) is displayed with the display state indicating the tension of the fishline or the like as described above, with the result that the player feels as if he/she is actually enjoying fishing. The failure image indicates that the fishline image 712*a* is cut. This further enhances the player's feeling as if he/she is actually enjoying fishing.

In addition to the above, in the present embodiment, the failure image is an image in which the failure object image O1 is superposed on the fishline image 712*a*. This suitably expresses that the tension corresponding to the number of rotation of the reel handle 6043 is being applied to the fishline image 712*a*, and hence the player feels as if he/she is actually enjoying fishing.

(Common Game: First Common Game: Determination of Display State of Failure Image)

With reference to FIG. 39A and FIG. 39B, the following will describe an example of a method of selecting the display state of the failure image (failure object image O1) based on the number of rotation of the reel handle 6043 during the time from the display of the fish hooked image to the display of the failure image. FIG. 39A shows an example of the level selection table. In the level selection table Da20, the range of the number of rotation of the reel handle 6043 associated with each of the levels 1 to 4 and the type of fish (type (size)) of the fish image 714) is stored.

As the fish images 714, images with plural colors and types are displayed in the first common game. In this regard, the type of fish in the first common game of the present embodiment indicates not the color, shape, or species of fish but the size of fish. Each fish image 714 belongs to one of the categories "extra large", "large", "middle", and "small". In addition to them, there is a fish image 714 further categorized as "subspecies". That is to say, some fish images 714 are categorized as "subspecies" in addition to the sizes. The range of the number of rotation of the reel handle 6043 is different between the "extra large" and "subspecies", between "middle" and between "large", and "small". The larger the size of the fish image 714 is, the winder the range of the number of rotation is. While in the present embodiment the type of fish indicates the size of fish, the type of fish may be the color, shape, or species of fish. For each type of the fish image 714, a fish hooking time is set. The larger the size of the fish image 714 is, the longer the corresponding fish hooking time is.

When the display state (color) of the failure image (failure object image O1) is determined, to begin with, the level of the number of rotation of the reel handle 6043 during the time from the display of the fish hooked image to the display of the failure image is selected from the levels 1 to 4. For this selection, by using this number of rotation of the reel handle 6043 and the type of the fish image 714 being hooked, the level selection table Da20 is searched. As a result of this search, a range corresponding to the type of the fish image 714 being hooked and including the number of rotation of the reel handle 6043 is specified in the ranges of the respective numbers of rotation of the reel handle 6043. Then the level associated with the specified range of the number of rotation of the reel handle 6043 is selected from the levels 1 to 4.

Now, a method of obtaining the display state corresponding to the selected level will be described. The display state (color) of the failure image (failure object image O1) and the volume of effect sound when the failure image is displayed, which corresponds to the level selected based on the level selection table Da20, are determined based on a failure effect determination table Da30 shown in FIG. 39B. FIG. 39B shows an example of the failure effect determination table. In the failure effect determination table Da30, the color of the failure object image O1 and the volume of the effect sound are associated with each of the levels 1 to 4 and stored. The effect sound is sound which is output when the failure image is displayed. The effect sound is, for example, sound of cutting the fishline image 712a. In the level 1, the color of the failure object image O1 is "blue" and the volume of the effect sound is "minimum". In the level 2, the color of the failure object image O1 is "blue" and the volume of the effect sound is "small". In the level 3, the color of the failure object image O1 is "yellow" and the volume of the effect sound is "middle". In the level 1, the color of the failure object image O1 is "red" and the volume of the effect sound is "large".

The failure effect determination table Da30 is searched with the selected level, and the display state (color) of the failure image (failure object image O1) and the volume of the effect sound corresponding to the level are determined. The image data of the failure object image O1 with the determined color is obtained from the ROM 242 (image storage unit 6212), and this image data is synthesized with the game image and displayed. The image data of the "blue" failure object image O1, the image data of the "yellow" failure object image O1, and the image data of the "blue" failure object image O1 are stored in, for example, the ROM 242, and a set of image data corresponding to the determined color is selected from the sets of image data and read out, and is used for displaying the failure object image O1. Furthermore, the effect sound is output with the determined volume.

(Common Game: First Common Game: Determination of Game Progress in First Common Game in Each Gaming Terminal 10)

Now, referring to FIG. 40 and FIG. 41A to FIG. 41C, the following will describe a method of determining the game progress of the first common game of each gaming terminal 10 participating in the first common game. A plurality of patterns of game progress are available in advance, and which one of these patterns of game progress is used is randomly determined with reference to the game progress determination table Da10 shown in FIG. 40. Furthermore, as shown in FIG. 41A to FIG. 41C, sets of fishing game progress data Da100 (Da101a, Da101b, Da101c, Da102a, Da102b, Da102c, Da103a, Da103b, and Da103c) indicating different types of game progress patterns are stored in the center controller 200.

FIG. 40 shows an example of the game progress determination table. The game progress determination table Da10 stores identification information of the fishing game progress data Da100 corresponding to the total payout amount. At the start of the first common game, the center controller 200 randomly determines the total payout amount for each gaming terminal 10 participating in the first common game. There are three types of payout amounts, namely, 1000 credits, 600 credits, and 300 credits, and one of them is selected. In the game progress determination table Da10, the total payout amounts, namely 1000 credits, 600 credits, and 300 credits are registered. With the 1000 credits, sets of fishing game progress data Da101a, Da101b, and Da101c are associated. Each of the sets of fishing game progress data Da101a, Da101b, and Da101c indicates a game progress pattern with which 1000 credits are paid out. With the 600 credits, sets of fishing game progress data Da102a, Da102b, and Da102c are associated. Each of the sets of fishing game progress data Da102a, Da102b, and Da102c indicates a game progress pattern with which 600 credits are paid out. With the 300 credits, sets of fishing game progress data Da103a, Da103b, and Da103c are associated. Each of the sets of fishing game progress data Da103a, Da103b, and Da103c indicates a game progress pattern with which 300 credits are paid out.

For each gaming terminal 10 participating in the first common game, the center controller 200 randomly selects one of the sets of fishing game progress data Da100, which corresponds to the total payout amount which has been randomly determined. For example, when the total payout amount for the gaming terminal 10c is 1000 credits, one of the sets of fishing game progress data Da101a, Da101b, and Da101c is randomly read out. Thereafter, using the fishing game progress data Da100 having been read out, the progress of the first common game at the gaming terminal 10c is controlled. When the total payout amount of the gaming terminal 10d is 600 credits, one of the sets of fishing game progress data Da102a, Da102b, and Da102c is read out. Thereafter, using the fishing game progress data Da100 having been read out, the progress of the first common game at the gaming terminal 10d is controlled. With this arrangement, each gaming terminal 10 receives the payout of the total payout amount having been determined for that terminal, in the first common game.

Now, referring to FIG. 41A to FIG. 41C, the fishing game progress data Da100, Da200, and Da300 will be detailed. FIG. 41A to FIG. 41C illustrate an example of the fishing game progress data. The fishing game progress data Da100 indicates how many times the fishing is performed in the first common game, the type of fish image 714 hooked in each fishing, a result of each fishing (success or failure), a payout amount of each fishing, a timing to start each fishing, a timing of fish hooking in each fishing, and the fish hooking time of each fishing.

The timing to start fishing indicates a timing at which the fishing starts as, for example, a time elapsed from the start of the first common game. For example, according to the fishing game progress data Da101a, the timing to start fishing is s1 (sec) in the first fishing. Therefore, the first fishing starts when s1 (sec) elapses from the start of the first common game. The fish hook timing indicates a timing at which the fish image 714 is hooked by the fishline image 712a as a time elapsed from the start of the first common game, for example. For example, according to the fishing game progress data Da101a, the fish hook timing is s11 (sec) in the first fishing. Therefore, when s11 (sec) elapses from the start of the first common game, the fish image 714 (large) indicated by the type of fish is hooked by the fishline image 712a. The fish hooking time is identical with the fish hooking time in the level selection table Da20 shown in FIG. 39A, and indicates a time from the hooking of the fish image 714 (large) by the fishline image 712a (fish hook timing) to the display of the failure image or the success image. This fish hooking time is different among the types of fish (types of fish images 714) as described above. As discussed above, the larger the type of the fish image 714 is, the longer the corresponding fish hooking time is.

As described above, because the game progress of the first common game is determined in advance in the fishing game progress data Da100, the time to end the first common game is identical among the gaming terminals 10. Furthermore, because highly-entertaining game progress is set in advance, the first common game is arranged to be enjoyable for the player.

(Common Game: First Common Game: Light Emission Control of LED 6050 Based on Rotation of Reel Handle 6043)

In the present embodiment, the light emission mode of the LED 6050 is controlled so that the light emission mode varies in accordance with the rotation of the reel handle 6043 and the state of the first common game. For example, while the LED 6050 is always on in the base game, the LED 6050 basically blinks in the first common game. When one rotation of the reel handle 6043 is detected, the gaming terminal 10 changes the blinking state of the LED 6050 for a short time (several seconds). Even when one rotation is detected, the gaming terminal 10 may not change the light emission mode of the LED 6050 if the rotational speed of the reel handle 6043 is lower than a predetermined value. For example, when the time from the previous detection of one rotation of the reel handle 6043 to the current detection of one rotation is shorter than a predetermined time, the gaming terminal 10 may not change the light emission mode of the LED 6050. Furthermore, the color of the light emitted from the LED 6050 and the blinking interval may be changed in accordance with the rotational speed of the reel handle 6043.

In addition to the above, in the first common game, the blinking state of the LED 6050 is changed for a predetermined time and returns to the original blinking state when the player fails in fishing (i.e., the failure image is displayed) and when the player succeed in fishing (i.e., the success image is displayed). While in the present embodiment the light emission mode of the LED 6050 is controlled so that the light emission mode varies in accordance with the rotation of the reel handle 6043 and the state of the first common game, the light emission mode of the LED 6050 may be controlled so that the light emission mode varies in accordance with either the rotation of the reel handle 6043 or the state of the first common game.

(Common Game: First Common Game: Vibration of Vibration Motor 6049 Based on Rotation of Reel Handle 6043)

In the present embodiment, the vibration motor 6049 is controlled to vibrate in accordance with the rotation of the reel handle 6043 and the state of the first common game. For example, during a time from the hooking of the fish image 714 (large) by the fishline image 712a (fish hook timing) to the display of the failure image or the success image, the vibration motor 6049 is controlled to vibrate and an effect of vibrating the control lever 603 is conducted.

(Cooperation of Vibration of Vibration Motor 6049, Individual Image 710, and Light Emission of LED 6050)

In the bonus game and common game above, the vibration of the vibration motor 6049, the individual image 710, and the light emission of the LED 6050 are synchronized. Vibration patterns of the vibration of the vibration motor 6049 are stored in a vibration pattern table which is stored in the RAM 43 of the gaming terminal 10. Display patterns of the individual image 710 are stored in a display pattern table which is stored in the RAM 243 of the center controller 200. Light emission patterns (light emission modes) of the LED 6050 are stored in an illumination pattern table stored in the RAM 43 of the gaming terminal 10. As shown in FIG. 42, FIG. 43A, and FIG. 43B, a vibration pattern and a display pattern are associated with one set of identification information. A set of identification information is selected according to the situation, and the vibration motor 6049 is controlled to vibrate in accordance with the vibration pattern associated with the identification information, the individual image 710 is displayed with the display pattern associated with the identification information, and the light emission of the LED 6050 is controlled in accordance with the light emission pattern in accordance with the identification information.

(Operation of Gaming Machine 300: Boot Process)

The following describes a boot process routine which takes place in the gaming machine 300. Upon powering on the gaming machine 300, a boot process routine illustrated in FIG. 44 starts in: the motherboard 240 and gaming board 260 in the center controller 200, and in the motherboard 40 and the gaming board 50 in the terminal controller 630. The memory cards 53 and 263 are assumed to be inserted into the card slots 53S and 263S of the gaming boards 50 and 260, respectively. Further, the GAL 54 and 264 are assumed to be attached to the IC socket 54S and 264S, respectively.

First, turning on the power switch of (powering on) the power supply units 45 and 245 boots the motherboards 40 and 240, and the gaming boards 50 and 260. Booting the motherboards 40 and 240 and the gaming boards 50 and 260 starts separate processes in parallel. Specifically, in the gaming boards 50 and 260, the CPUs 51 and 261 read out preliminary authentication programs stored in the boot ROMs 52 and 262, respectively. Then, preliminary authentication is performed according to the read out programs so as to confirm and verify that no falsification is made to authentication programs, before reading them in the motherboards 40 and 240, respectively (S21). Meanwhile, the main CPUs 41 and 241 of the motherboards 40 and 240 run BIOS stored in the ROMs 42 and 242 to load into the RAMs 43 and 243 compressed data built in the BIOS, respectively (S22). Then, the main CPUs 41 and 241 run a procedure of the BIOS according to the data loaded into the RAMs 43 and 243 so as to diagnose and initialize various peripheral devices (S23).

The main CPUs 41 and 241, which are respectively connected to the ROMs 55 and 265 of the gaming boards 50 and 260 via PCI buses, read out authentication programs stored in the ROMs 55 and 265 and stores them in the RAMs 43 and 243 (S24). During this step, the main CPUs 41 and 241 each derives a checksum through ADDSUM method (a standard check function) which is adopted in a standard BIOS, and store the authentication programs into RAMs 43 and 243 while confirming if the operation of storing is carried out without an error.

Next, the main CPUs 41 and 241 each checks what connects to the IDE bus. Then, the main CPUs 41 and 241 access, via the IDE buses, to the memory cards 53 and 263 inserted into the card slots 53S and 263S, and read out game programs and game system programs from the memory cards 53 and 263, respectively. In this case, the main CPUs 41 and 241 each reads out four bytes of data constituting the game program and the game system program at one time. Next, the main CPUs 41 and 241 authenticate the game program and the game system program read out to confirm and verify that these programs are not falsified, using the authentication program stored in RAMs 43 and 243 (S25).

When the authentication properly ends, the main CPUs 41 and 241 write and store the authenticated game programs and game system programs in RAMs 43 and 243 (S26).

Next, the main CPUs 41 and 241 access, via the PCI buses, to the GALs 54 and 264 attached to the IC sockets 54S and 264S, and read out payout ratio setting data from the GALs 54 and 264, respectively. The payout ratio setting data read out is then written and stored in the RAMs 43 and 243 (S27).

Next, the main CPUs 41 and 241 read out, via the PCI buses, country identification information stored in the ROMs 55 and 265 of the gaming boards 50 and 260, respectively. The country identification information read out is then stored in the RAMs 43 and 243 (S28).

Figure 45:
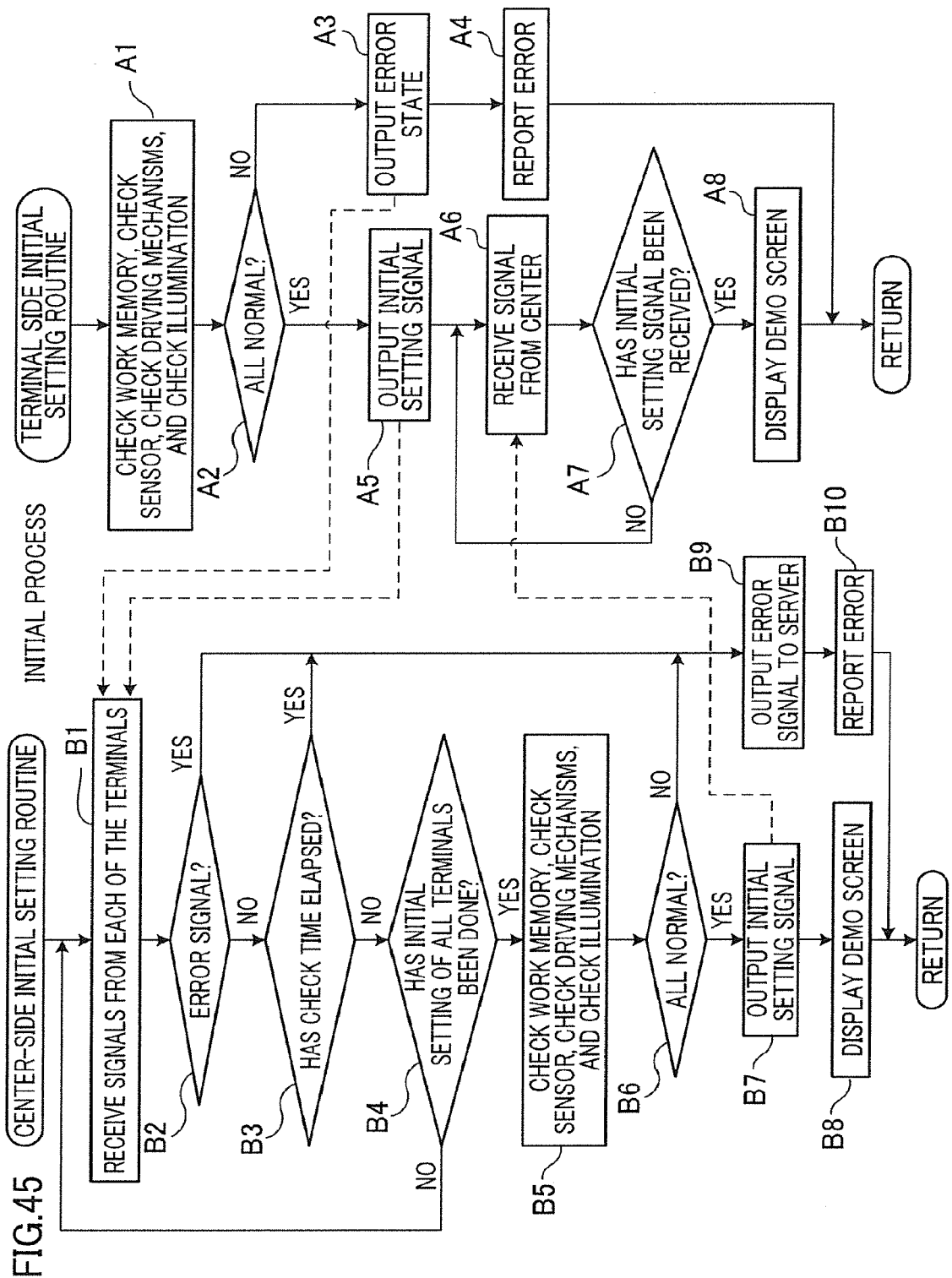
FIG. 45 is a flowchart of an initial process.

After this, the main CPUs 41 and 241 each perform an initial process of FIG. 45.

(Operation of Gaming Machine 300: Initial Process)

Figure 44:
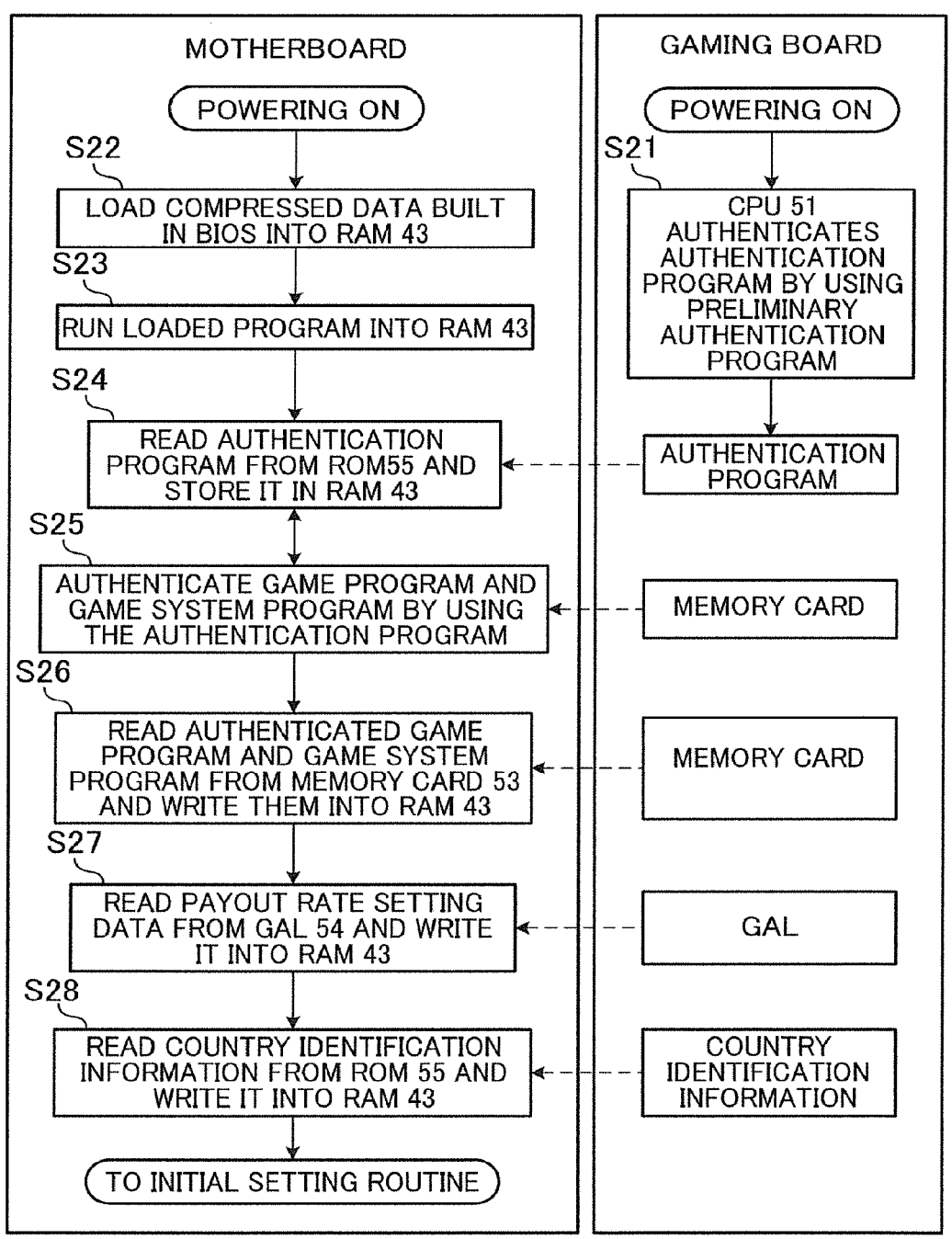
FIG. 44 is a flowchart of a boot process.

The following describes an initial process which takes place in the gaming machine 300. When the boot process of FIG. 44 is completed, the center controller 200 reads out from the RAM 243 a center-side initial setting routine shown in FIG. 45 and executes the routine. Meanwhile, when the boot process of FIG. 44 is completed, the gaming terminal 10 reads out from the RAM 43 a terminal side initial setting routine shown in FIG. 45 and executes the routine. The center-side and terminal side initial setting routines are executed in parallel.

First, the main CPU 41 of each of the gaming terminals 10 checks operations of work memories such as the RAM 43, various sensors, various driving mechanisms, and various decorative illuminations (A1). For example, to check the operation of the driving mechanism, a process is executed such that the control lever 603 is rotated from the start position to the end position while the magnetic force values at the respective positions are detected, and then the inclination angle table in the RAM 43 is initialized. Then, the main CPU 41 determines whether all the check results are normal (A2). If the main CPU 41 determines that the check results contains an error (A2: NO), the main CPU 41 outputs a signal notifying the error (hereinafter, error signal) to the center controller 200 (A3). Further, the main CPU 41 reports the error in the form of illuminating the lamp 30 or the like (A4), and then ends the routine.

On the other hand in A2, if the main CPU 41 determines that all the check results are normal (A2: YES), an initial setting signal is output to the center controller 200 (A5).

Then, the supply of an initial setting signal from the center controller 200 is waited for (A6, A7: NO).

The main CPU 241 of the center controller 200 receives signals from each of the terminals (B1). Then, the main CPU 241 determines whether a signal received is an error signal (B2). If the main CPU 241 determines that the signal is an error signal (B2: YES), the main CPU 241 outputs the error signal to a server of an unillustrated host computer or the like (B9) to report the error (B10), and ends the routine.

On the other hand in B2, if the main CPU 241 determines that the signal is not an error signal (B2: NO), the main CPU 241 determines whether a predetermined time (check time) has elapsed from the time of powering on (B3). If the main CPU 241 determines that the check time has elapsed (B3: YES), B9 is executed. On the other hand, if the main CPU 241 determines that the check time has not yet elapsed (B3: NO), it is determined whether an initial setting signal is received from each of the gaming terminals 10 (B4). If the main CPU 241 determines that an initial setting signal from any one of the gaming terminals 10 is not received (B4: NO), the process returns to B1. On the other hand, if it is determined that initial setting signals from all the gaming terminals 10 are received (B4: YES), the main CPU 241 checks operations of work memories such as RAM 243 or the like, various sensors, various driving mechanisms, and various decorative illuminations (B5). Then, the main CPU 41 determines whether all the check results are normal (B6). If the main CPU 241 determines the check results contain an error (B6: NO), the main CPU 241 executes B9.

On the other hand in B6, if the main CPU 241 determines that all the check results are normal (B6: YES), the main CPU 241 outputs an initial setting signal to all the gaming terminals 10 (B7), and causes the shared display 102 to display a demo-screen (B8). Then, the main CPU 241 ends the routine.

In A7, the main CPU 41 of each of the gaming terminals 10 determines that an initial setting signal is received from the center controller 200 (A7: YES), and causes the terminal image display panel 16 to display a demo-screen (A7). The main CPU 41 then ends the routine.

(Operation of Gaming Terminal 10: Terminal-Side Basic Game Process Routine)

Figure 46:
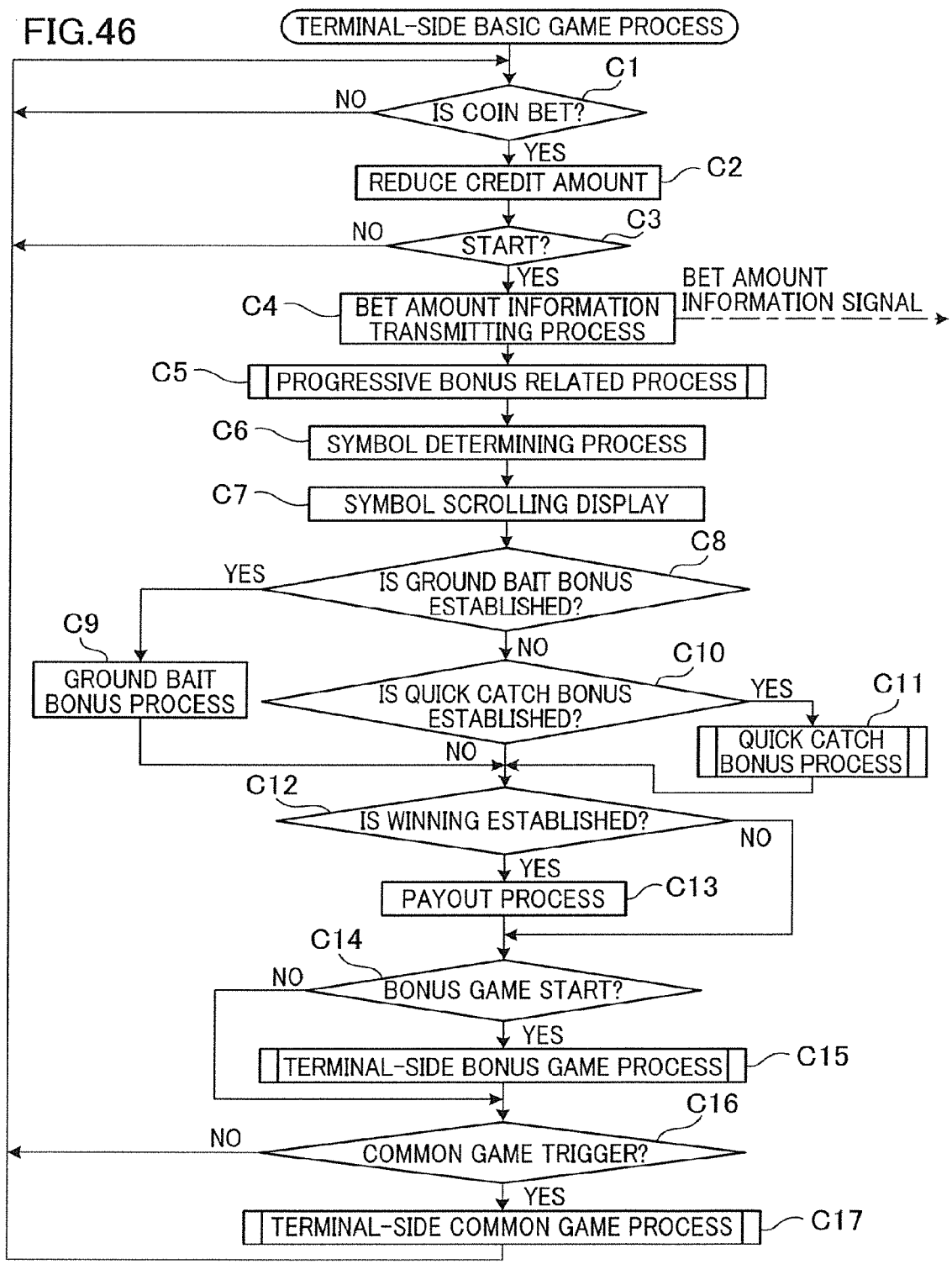
FIG. 46 is a flowchart of a terminal-side base game process.

After the terminal side initial setting routine of FIG. 45, the main CPU 41 of the gaming terminal 10 performs a terminal-side base game process routine of FIG. 46. Through this terminal-side base game process routine executed by the main CPU 41, a base game is run.

As shown in FIG. 46, to begin with, whether a coin has been bet is determined (C1). In this step, it is determined whether a signal from the 1-bet switch 26S entered by pressing of the 1-bet button 26 is received. Meanwhile, it is determined whether a signal from the maximum bet switch 27S entered by pressing of the maximum bet button 27 is received. If no coin is bet (C1: NO), C1 is repeated until a coin is bet.

On the other hand, if a coin is bet (C1: YES), the credit amount stored in the RAM 43 is reduced according to the number of coins bet (C2). When the number of coins betted is larger than the credit amount stored in the RAM 43, the process proceeds to C3 described below without conducting the step of reducing the credit amount. When the number of coins bet exceeds the upper limit of coins bettable for one base game (50 pieces in this embodiment), the process goes to the later-described step C3 without the reduction of the credit amount.

Then, it is determined whether the spin button 23 is pressed or the control lever 600 is operated for the start (C3). If not started (C3: NO), the process returns to C1. Here, if not started (for example, a command to end the game is input before the start), the reduction of the credit amount in C2 is canceled.

On the other hand, if started (C3: YES), a bet amount information transmitting process is executed (C4). That is to say, a bet amount information signal indicating the bet amount is sent to the center controller 200. Note that, although the present embodiment is arranged so that the information of the number of paylines L activated in response to betting is transmitted, the disclosure is not limited to this.

Figure 52:
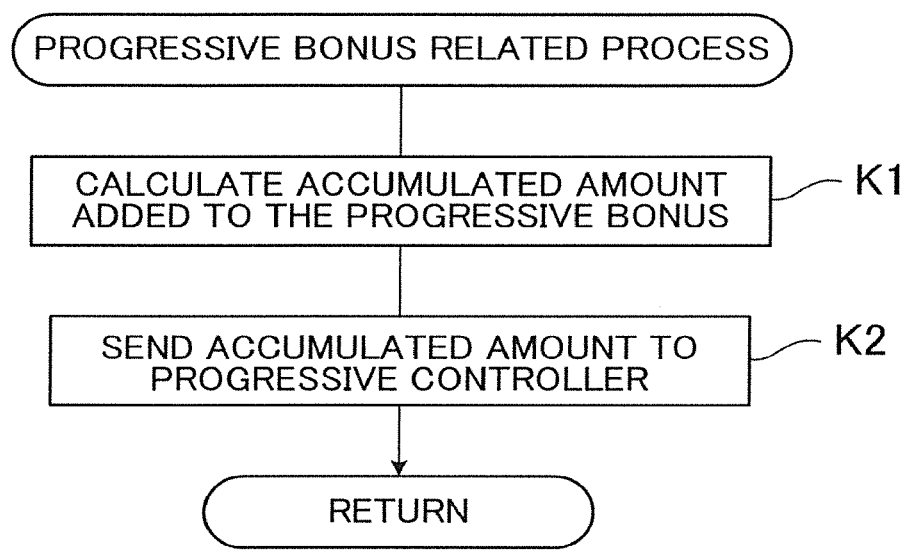
FIG. 52 is a flowchart of a progressive bonus related process.

Subsequently, a progressive bonus related process which will be described with reference to FIG. 52 is executed (C5). In this process, an amount to be added to a progressive bonus amount to be paid out at the time of winning of the progressive bonus game is calculated, and the amount is sent to the progressive controller 340.

Next executed is a symbol determining process (C6). That is, the stop symbol determining program stored in the RAM 43 is run to determine symbols 501 to be arranged in the display window 150. Through this, a symbol combination to be formed along the payline L is determined.

Then, the symbol scrolling display process is executed to scroll-display symbols 501 on the terminal image display panel 16 (C7). The scrolling display process is a process in which the symbols 501 determined in C6 are stopped (rear-ranged) in the display window 150 after scrolling of symbols 501 in a direction indicated by an arrow.

Subsequently, whether the winning of a ground bait bonus has been achieved is determined (C8). More specifically, after the scroll process, individual internal random determination is conducted to determine the winning of the ground bait bonus at the winning probability of 1/80. When the winning of the ground bait bonus is achieved (C8: YES), a ground bait bonus process is executed to award a fixed payout (20 coins) (C9).

On the other hand, when the winning of the ground bait bonus is not achieved (C8: NO), whether a quick catch bonus has been achieved is determined (C10). More specifically, when the ground bait bonus is not achieved and the specific symbol 510 does not stop at the display block 28 where the video reel 153 stops as a result of the scroll process in C7, internal random determination is executed to determine whether the quick catch bonus game is awarded at a probability of 1/80. When the quick catch bonus is achieved (C10: YES), a later-described quick catch bonus process is executed (C11).

On the other hand, when the quick catch bonus is not achieved (C10: NO), after the ground bait bonus process or after the quick catch bonus process, whether winning has been established by a combination of symbols 501 rearranged on the display window 150 is determined (C12). When it is determined that a winning is resulted (C12: YES), a payout process is executed (C13). More specifically, when a winning is resulted, the number of coins according to the combination is calculated.

When no winning is resulted (C12: NO) or after the payout process, the main CPU 41 determines whether to start the bonus game (C14). More specifically, the main CPU 41 starts a bonus game when a predetermined number or more specific symbols 510 are rearranged on a payline L or no specific symbol 510 is rearranged at the video reel 153 of the third column but a mystery bonus is won as a result of random selection.

When the bonus game is started (C14: YES), a terminal-side bonus game process is executed (C15). This terminal-side bonus game process will be described later with reference to FIG. 49.

On the other hand, when the bonus game is not started (C14: NO) or after the terminal-side bonus game process, whether a common game trigger is established is determined (C16). More specifically, the main CPU 41 determines whether a common game start effect image display command has been received from the center controller 200. If the common game trigger is not established (C16: NO), the process of C1 is executed.

On the other hand, when the common game trigger is established (C16: YES), a terminal-side common game process is executed (C17). The terminal-side common game process will be described later with reference to FIG. 50A. Then the process of C1 is executed.

Alternatively, the process (C10) in which whether the quick catch bonus has been achieved is determined may be executed if the result of the determination of whether to start the bonus game (C14) indicates not to start the bonus game (C14: NO) and the result of the determination of whether the ground bait bonus is achieved (C8) indicates that the ground bait bonus has not been achieved (C8: NO).

(Operation of Center Controller 200: Center-Controller-Side Process)

Figure 47:
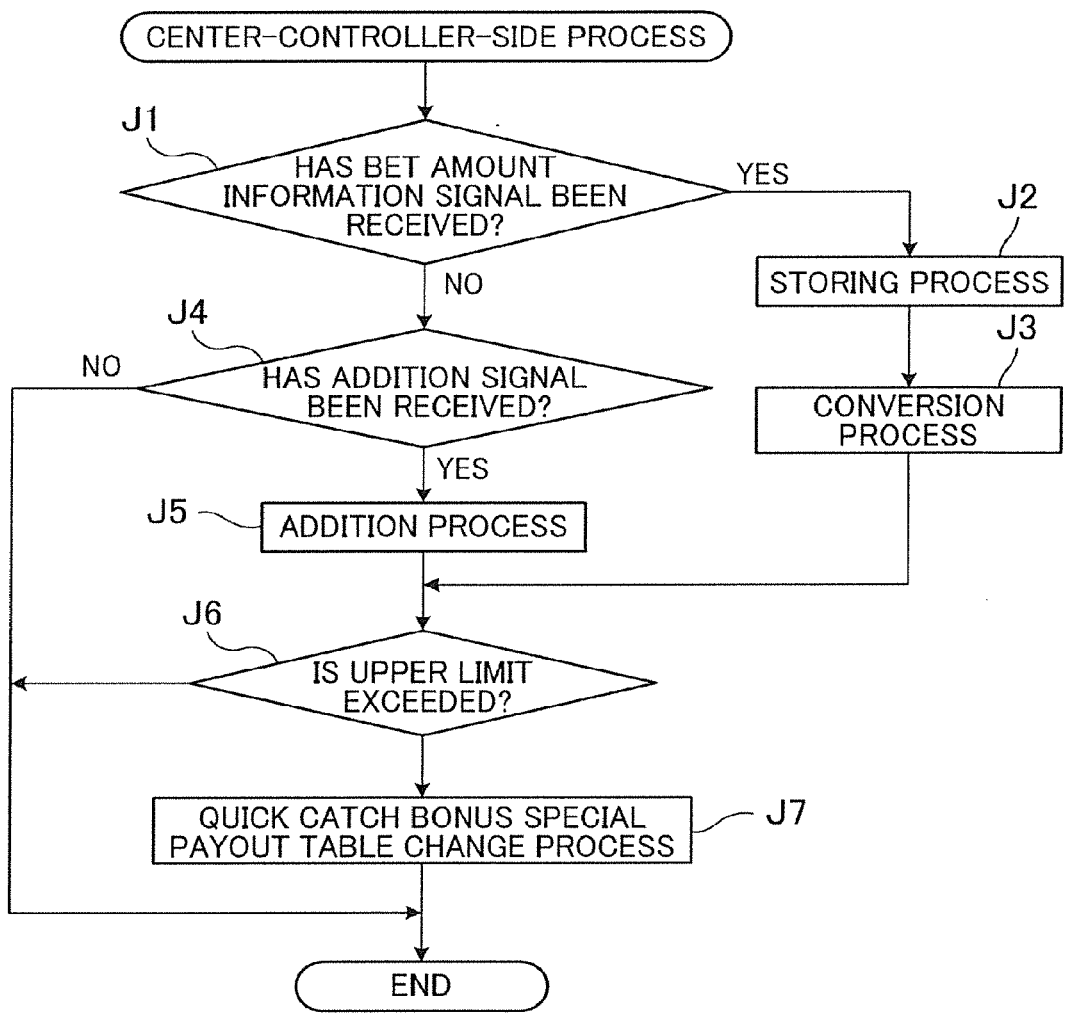
FIG. 47 is a flowchart of a center-controller-side process.

The main CPU 241 of the center controller 200 executes, after the execution of the center-side initial setting routine is completed, a center-controller-side process shown in FIG. 47.

To begin with, whether a bet amount information signal sent in the bet amount information transmitting process in C4 of the terminal-side base game process in each gaming terminal 10 has been received is determined (J1). When the bet amount information signal has been received (J1: YES), a storing process is executed (J2). More specifically, the sender gaming terminal 10 is specified and information of the number of paylines L activated in accordance with the bet amount is stored in the RAM 243 for each gaming terminal 10.

After the storing process in J2, a conversion process is executed (J3). In this process, with reference to the normal game qualification time awarding table stored in the RAM 243 (FIG. 16), a game qualification time corresponding to the number of paylines L activated in accordance with the bet amount and the payout rate is awarded. Thereafter, in the above-described game qualification time management table (see FIG. 17), the awarded game qualification time and the payout rate are accumulatively stored for each gaming terminal 10. That is to say, based on the number of paylines L activated in accordance with the bet amount stored in the RAM 243, a game qualification time to be awarded and a payout rate in each unit time of the game qualification time are determined, and the game qualification time at each payout rate is associated with the payout rate and accumulatively stored in the game qualification time management table for each gaming terminal 10.

On the other hand, when the bet amount information signal has not been received (J1: NO), whether an addition signal has been received is determined (J4). When the addition signal has not been received (J4: NO), the process is terminated. On the other hand, when the addition signal has been received (J4: YES), an addition process is executed (J5). In this process, the sender gaming terminal 10 is specified and a game qualification time which is included in the received addition signal and associated with a payout rate is accumulatively stored in the game qualification time management table for each gaming terminal 10.

Thereafter, after the conversion process in J3 or after the addition process in J5, whether the game qualification time accumulatively stored in the game qualification time management table for each gaming terminal 10 exceeds the upper limit of the accumulation of the game qualification time defined in the maximum qualification time table is determined (J6). More specifically, with reference to the above-described accumulation calculation table, whether the "value exceeding the accumulation upper limit of qualification times" corresponding to the payout rate has been updated to be more than 0. When the value does not exceed the upper limit (J6: NO), the process is terminated.

When the value exceeds the upper limit (J6: YES), a quick catch bonus special payout table change process is executed (J7). In this process, a payout table which will be referred to in a later-described quick catch bonus process is changed from the quick catch bonus normal payout table or the like to a quick catch bonus special payout table. The winning probability in this quick catch bonus special payout table is calculated by adding, to the winning probability in the quick catch bonus normal payout table, a value calculated by multiplying the above-described "value exceeding the accumulation upper limit of qualification times" by a predetermined value (which is "80/18038" in the present embodiment but is a changeable matter of design choice). This winning probability is updated from time to time. Then the process is terminated.

(Quick Catch Bonus Process)

Figure 48:
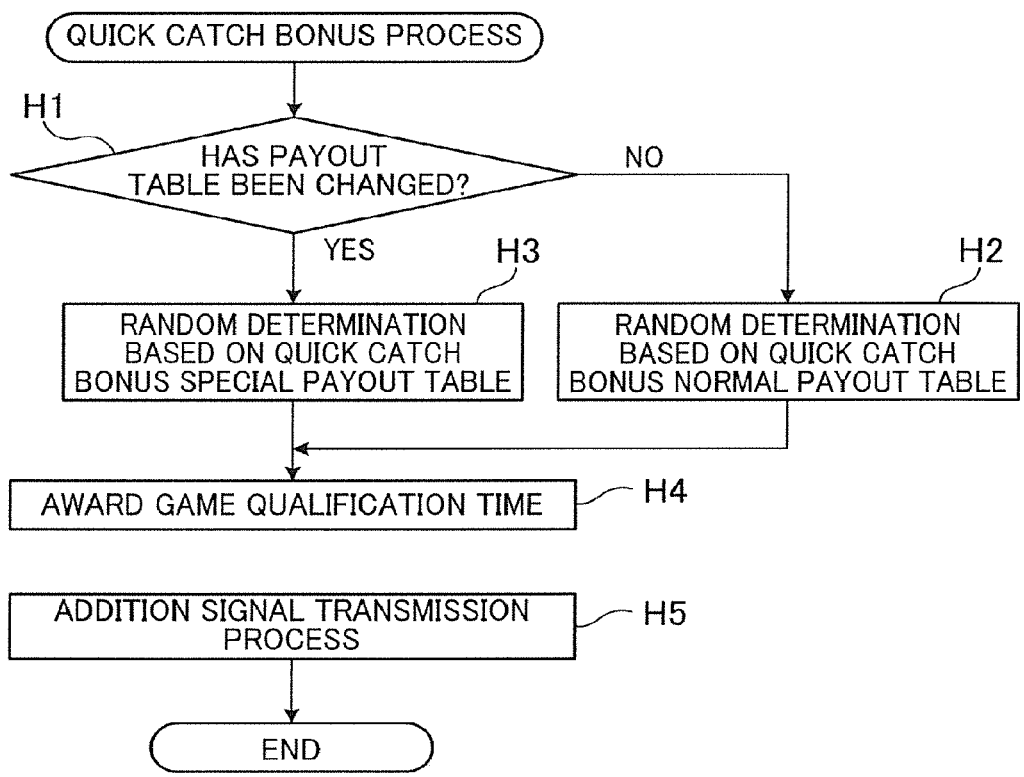
FIG. 48 is a flowchart of a quick catch bonus process.

The main CPU 41 of the gaming terminal 10 executes a quick catch bonus process shown in FIG. 48, in the process in C11 of the terminal-side base game process shown in FIG. 46.

To begin with, in a quick catch bonus special payout table change process in J7 of the center-controller-side process, whether the payout table has been changed is determined (H1). When the payout table has not been changed (H1: NO), internal random determination is executed with reference to the above-described quick catch bonus normal payout table (H2). On the other hand, when the payout table has been changed (H1: YES), internal random determination is executed with reference to the above-described quick catch bonus special payout table (H3).

When winning is achieved in the internal random determination in H2 or H3, a game qualification time is awarded (H4). If in H2 internal random determination is executed with reference to the quick catch bonus normal payout table, when, for example, the number of paylines activated in response to one bet is one, the game qualification time corresponding to one bet is awarded at the winning probability of 311/18038. More specifically, with reference to the normal game qualification time awarding table shown in FIG. 16, the game qualification time of five seconds is awarded for the payout rate of one corresponding to one activated payline. In the meanwhile, when the number of paylines activated in response to five bets is five, a game qualification time corresponding to five bets is awarded at the winning probability of 311/18038. More specifically, with reference to the normal game qualification time awarding table shown in FIG. 16, the game qualification time of five seconds is awarded for the payout rate of five corresponding to five activated paylines.

Thereafter, an addition signal transmission process is executed (H5). In this process, a game qualification time corresponding to the awarded payout rate is transmitted to the center controller 200 as an addition signal.

(Operation of Gaming Terminal 10: Terminal-Side Bonus Game Process Routine)

Figure 49:
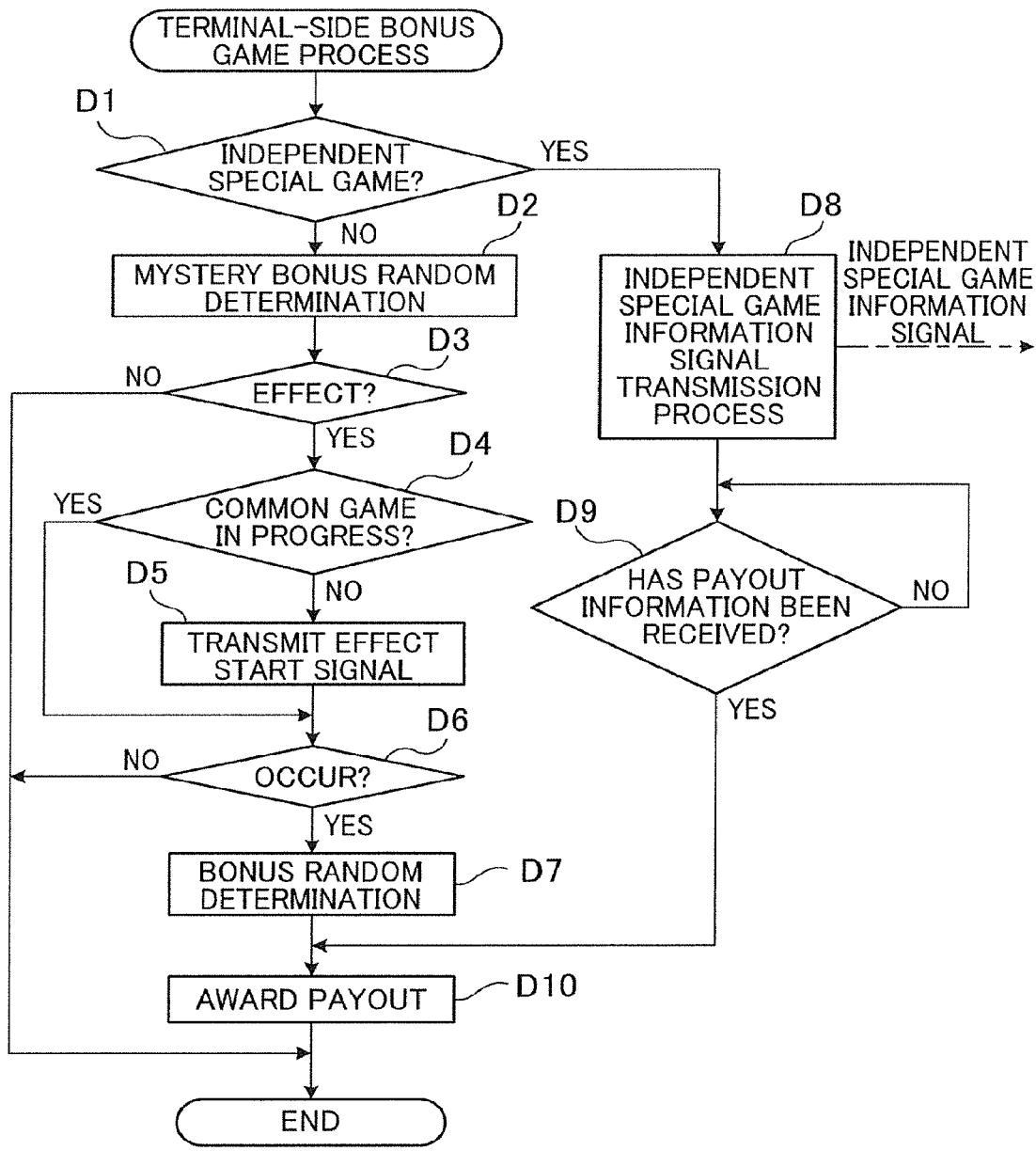
FIG. 49 is a flowchart of a terminal-side bonus game process.

The main CPU 41 of the gaming terminal 10 executes, in C15 of the terminal-side base game process shown in FIG. 46, a terminal-side bonus game process routine shown in FIG. 49.

As shown in FIG. 49, the main CPU 41 determines whether the bonus game is an independent special game (D1). If the bonus game is not the independent special game (D1: NO), i.e., when the bonus game is a mystery bonus, the main CPU 41 executes a mystery bonus random determination (D2). More specifically, the main CPU 41 determines, with reference to the mystery bonus start random determination table shown in FIG. 29, to which one of the ranges, "occurrence", "effect only", and "non-occurrence", the determined random number corresponds.

Subsequently, the main CPU 41 determines whether to conduct an effect (D3). More specifically, the main CPU 41 conducts an effect when the result of the mystery bonus random determination is "occurrence" or "effect only". If no effect is conducted (D3: NO), i.e., when the result of the mystery bonus random determination is "non-occurrence", the routine is terminated.

On the other hand, if an effect is conducted (D3: YES), the main CPU 41 determines whether a common game is being run (D4). If no common game is being run, an effect start signal is transmitted to the center controller 200 (D5). Note that, when receiving the effect start signal transmitted in the step D5, the center controller 200 conducts the effect shown in FIG. 31. When it is determined in D4 that the common game is being run (D4: Yes) or after the effect start signal is transmitted, whether to generate a mystery bonus is determined (D6). More specifically, a mystery bonus is generated based on mystery bonus random determination.

If no mystery bonus is generated (D6: NO), the routine is terminated. On the other hand, if the mystery bonus is generated (D6: YES), the main CPU 41 conducts a bonus random determination (D7). More specifically, with reference to the mystery bonus probability table shown in FIG. 30, to which of the winning bonus types the determined random number corresponds is determined. Thereafter, a payout according to the bonus that has been won is awarded (D10), and the routine is terminated.

On the other hand, if it is determined in the step D1 that the bonus game is an independent special game (D1: Yes), the main CPU 41 transmits an independent special game information signal indicating the start of an independent special game to the center controller 200 (D8). In response to this, a lookup display unit 404 shown in FIG. 23 is displayed on the terminal image display panel 16. Though not illustrated, when the center controller 200 receives the independent special game information signal, whether a common game is being run is determined. If it is determined that no common game is being run, the center controller 200 conducts the effect shown in FIG. 25 and FIG. 28, turns on the LED unit 801 corresponding to the gaming terminal 10 that has transmitted the independent special game information signal, carries out a random determination to determine a payout based on the independent special game probability table shown in FIG. 27, and transmits payout information. On the other hand, when a common game is being run, the center controller 200 conducts only a random determination and transmits payout information.

Thereafter, whether payout information has been received from the center controller 200 is determined (D9). If no payout information has been received (D9: NO), the process is on standby and the step D9 is repeated. When the payout information has been received from the center controller 200 (D9: YES), a payout is awarded based on the payout information (D10) and the routine is terminated.

(Operation of Gaming Terminal 10: Terminal-Side Common Game Process Routine)

Figure 50A:
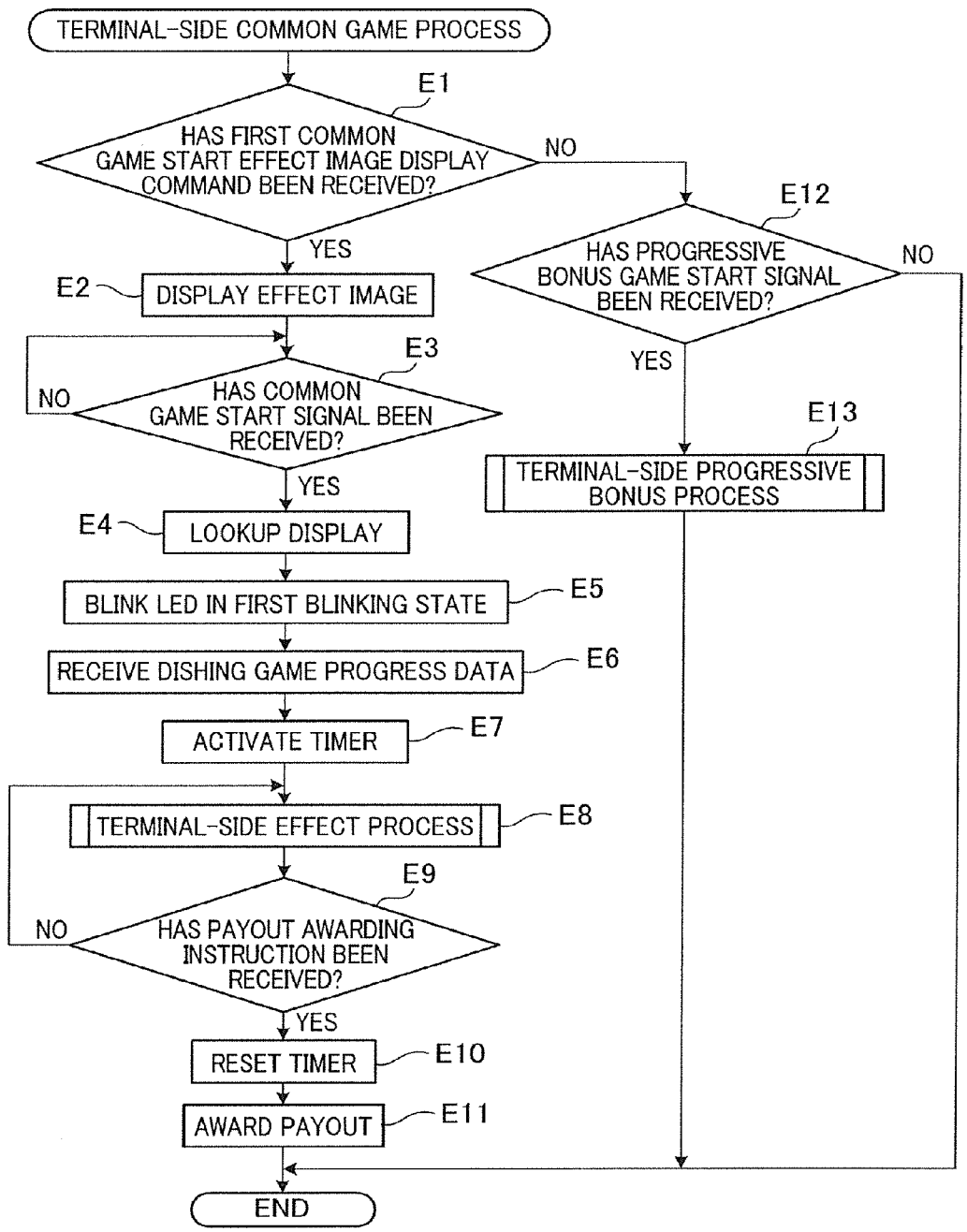
FIG. 50A is a flowchart of a terminal-side common game process.

The main CPU 41 of the gaming terminal 10 executes, in C17 of the terminal-side base game process shown in FIG. 46, a terminal-side common game process routine shown in FIG. 50A.

As shown in FIG. 50A, the main CPU 41 determines whether a common game start effect image display instruction (first common game start effect image display instruction) of the first common game has been supplied from the center controller 200 (E1). When the first common game start effect image display instruction has been received (E1: YES), the main CPU 41 displays a common game start effect image shown in FIG. 34A in accordance with the received first common game start effect image display instruction (E2). Then the main CPU 41 determines whether a first common game start signal has been received (E3). When the first common game start signal has not been received (E3: NO), the main CPU 41 becomes on standby until it is determined that the first common game start signal has been received.

On the other hand, if the common game start signal has been received (E3: YES), the main CPU 41 carries out the lookup display shown in FIG. 23 (E4). Thereafter, the main CPU 41 controls the light emission of the LED 6050 so that the LED 6050 which is always on in the base game starts to blink in the first blinking state (E5). Then the main CPU 41 receives the fishing game progress data D100 from the center controller 200 (E6). The fishing game progress data Da100 is sent from the center controller 200 in the later-described step F7 shown in FIG. 51A. Subsequently, the main CPU 41 activates a timer (E7) and then executes a terminal-side effect process (E8).

In the terminal-side effect process, the main CPU 41 detects the number of rotation of the reel handle 6043 and executes a process of displaying a failure image corresponding to the detected number of rotation on the upper display 700. Furthermore, in the terminal-side effect process, the main CPU 41 controls the light emission mode of the LED 6050 and the vibration of the vibration motor 6049 in accordance with the detected number of rotation and the state of the first common game. Details of the terminal-side effect process will be given later with reference to FIG. 50B and FIG. 50C.

Subsequently, the main CPU 41 determines whether a payout awarding instruction has been received from the center controller 200 (E9). When the payout awarding instruction has not been received (E9: NO), the main CPU 41 goes back to the step E8. When the payout information has been received (E9: YES), the main CPU 41 resets the timer (E10), and then awards the total payout amount corresponding to the fishing game progress data D100 received in the step E6 (E11). Then the main CPU 41 terminates the routine.

The following will describe a process executed when it is determined that the first common game start effect image display instruction has not been received (E1: NO). In this case, the main CPU 41 determines whether a progressive bonus game start instruction has been received (E12). When the progressive bonus game start instruction has not been received (E12: NO), the main CPU 41 terminates the routine. In other words, no common game is run. On the other hand, when the progressive bonus game start instruction has been received (E12: YES), the main CPU 41 executes a terminal-side progressive bonus process (E13), and then terminates the routine. The details of the terminal-side progressive bonus process will be given later.

(Operation of Gaming Terminal 10: Terminal-Side Common Game Process Routine: Terminal-Side Effect Process)

Figure 50B:
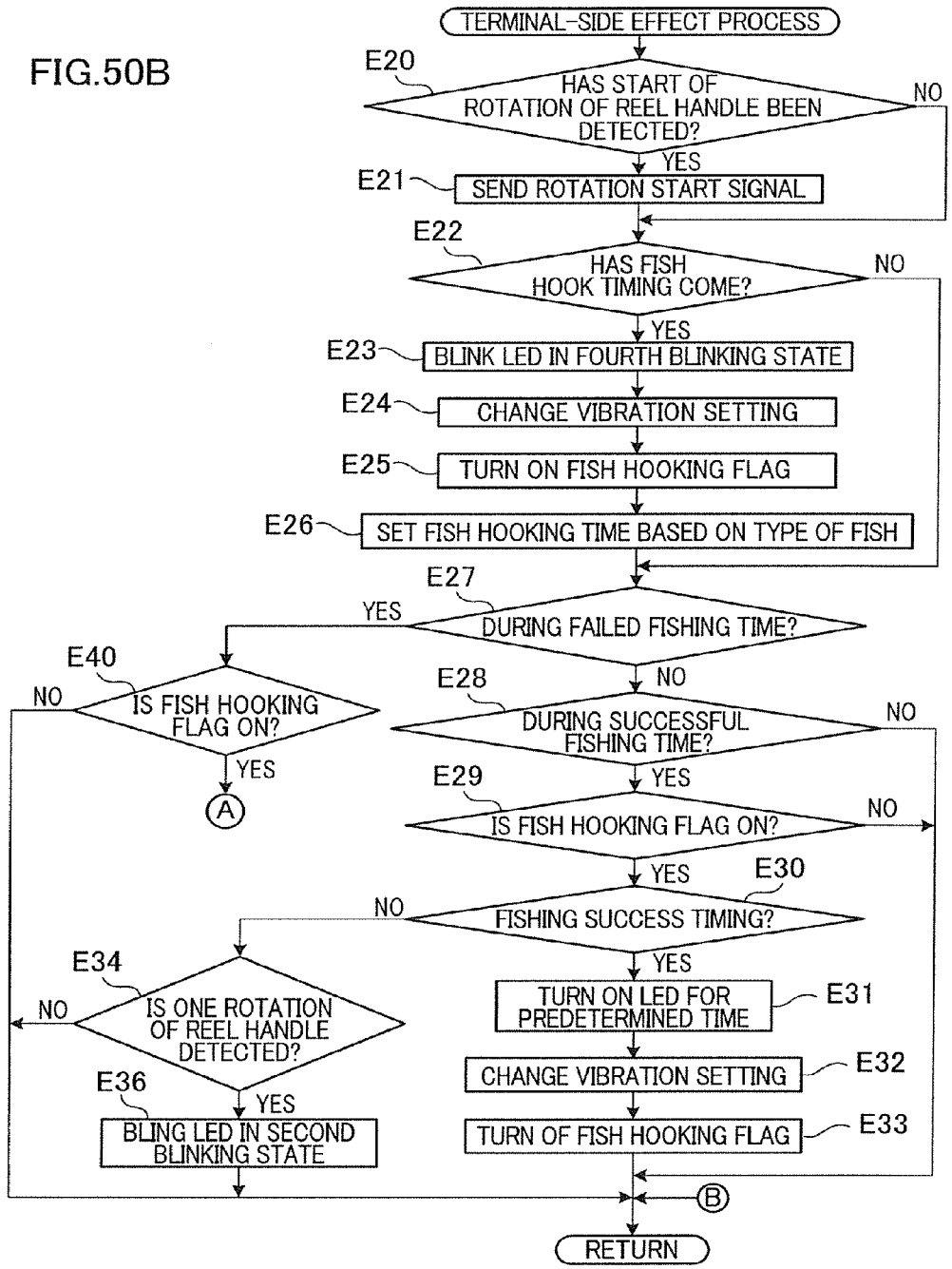
FIG. 50B is the first flowchart of a terminal-side effect process.
Figure 50C:
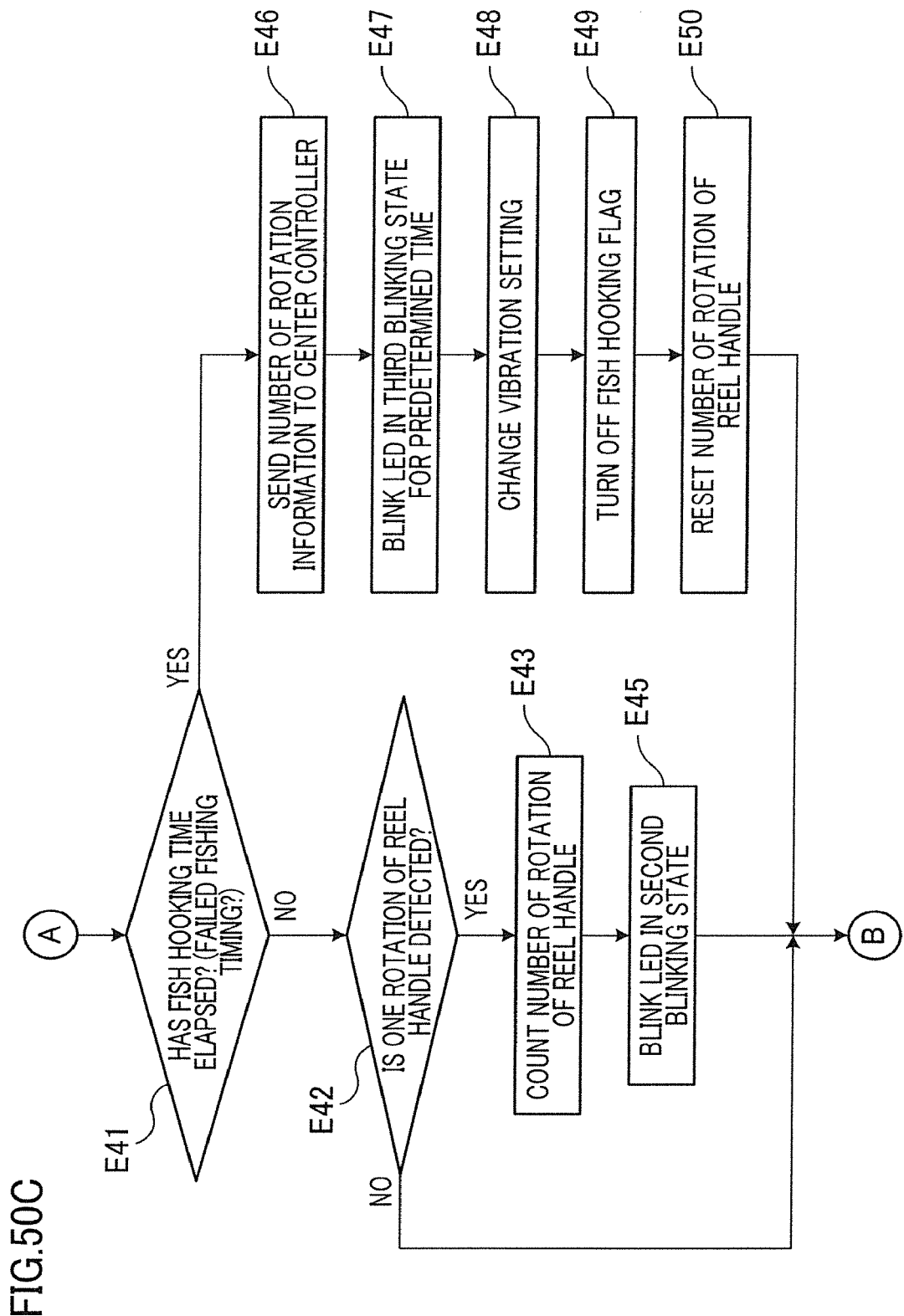
FIG. 50C is the second flowchart of the terminal-side effect process.

Now, referring to FIG. 50B and FIG. 50C, the terminal-side effect process in the step E8 will be described.

To begin with, the main CPU 41 determines whether the start of the rotation of the reel handle 6043 has been detected (E20). It is noted that this determination is conducted based on the criterion that, for example, while the rotation of the reel handle 6043 was not detected in previously-executed terminal-side effect processes, the rotation of the reel handle 6043 is detected in the current terminal-side effect process. When the start of the rotation of the reel handle 6043 has not been detected (E20: NO), the main CPU 41 proceeds to the later-described step E22. When the start of the rotation of the reel handle 6043 has been detected (E20: YES), the main CPU 41 sends a rotation start signal to the center controller 200 (E21). As detailed later, the rotation start signal is received in the step F21 shown in FIG. 51B.

Thereafter, the main CPU 41 determines whether a fish hook timing has come (E22). This determination as to whether the fish hook timing has come is executed based on the fishing game progress data D100 received in the step E6 above. When the fish hook timing has not come (E22: NO), the main CPU 41 proceeds to the step E27. On the other hand, when the fish hook timing has come (E22: YES), the main CPU 41 changes the light emission mode of the LED 6050 which has been set at the first blinking state to a fourth blinking state only for a predetermined time (e.g., several seconds) (E23). This control of the light emission mode is conducted based on the illumination pattern table shown in FIG. 43B.

Then the main CPU 41 reads out a pattern of vibration corresponding to the hooked fish (fish image G714) from the RAM 243. The main CPU 41 then changes the setting so that the vibration motor 6049 is vibrated with the vibration pattern having been read out (E24). The vibration of the vibration motor 6049 is controlled based on a vibration pattern table shown in FIG. 42. The vibration of the vibration motor 6049 is therefore set at "large". Alternatively, the larger the type of the fish image G714 is, the greater the vibration is. Then the main CPU 41 turns on a fish hooking flag (E25). The fish hooking flag is a flag indicating that the fish hook timing has already come but the fish hooking time has not finished.

Thereafter, the main CPU 41 obtains a fish hooking time corresponding to the type of the hooked fish (fish image 714) from the fishing game progress data D100 received in the step E6 above. The main CPU 41 then sets the obtained fish hooking time as the fish hooking time of the current fishing (E26). Then the main CPU 41 proceeds to the later-described step E27.

Now, the step E27 will be described. In the step E27, the main CPU 41 determines whether the gaming terminal 10 is currently in a failed fishing time. This determination is conducted based on, for example, the fishing game progress data D100 received in the step E6, and is used as the criterion of the determination as to whether a result of current (currently-executed) fishing is a failure.

When the gaming terminal 10 is not currently in the failed fishing time (E27: NO), the main CPU 41 determines whether the gaming terminal 10 is currently in a succeeded fishing time (E28). This determination is conducted based on, for example, the fishing game progress data D100 received in the step E6, and is used as the criterion of the determination as to whether a result of current (currently-executed) fishing is a success. When it is determined that the gaming terminal 10 is not currently in the fish hooking time of successful fishing (E28: NO), the main CPU 41 terminates the routine and proceeds to the step E9 shown in FIG. 50A.

On the other hand, when the gaming terminal 10 is currently in the fishing time of successful fishing (E28: YES), the main CPU 41 determines whether the fish hooking flag has been turned on (E29). When the fish hooking flag has been turned off (E29: NO), the routine is terminated and the main CPU 41 proceeds to the step E9 shown in FIG. 50A. In the meanwhile, when the fish hooking flag has been turned on (E29: YES), the main CPU 41 determines whether the fish hooking time set in the step E26 has elapsed from the fish hook timing (i.e., whether the fishing success timing has come) (E30).

When the fishing success timing has come (E30: YES), the main CPU 41 controls the light emission of the LED 6050 so that the LED 6050 continuously emit light for a predetermined time (E31). This control of the light emission mode is conducted based on the illumination pattern table shown in FIG. 43B. The main CPU 41 then changes the setting of the vibration of the vibration motor 6049 to "middle" for a predetermined time (E32). This control of the vibration of the vibration motor 6049 is conducted based on the vibration pattern table shown in FIG. 42. Thereafter, the setting of the vibration of the vibration motor 6049 is returned to the default setting (e.g., no vibration). The main CPU 41 then turns off the fish hooking flag (E33), terminates the routine, and proceeds to the step E9 shown in FIG. 50A.

On the other hand, when the fishing success timing has not come (E30: NO), the main CPU 41 determines whether one rotation of the reel handle 6043 is detected (E34). When one rotation of the reel handle 6043 has not been detected (E34: NO), the main CPU 41 terminates the routine and proceeds to the step E9 shown in FIG. 50A. In the meanwhile, when one rotation of the reel handle 6043 has been detected (E34: YES), the main CPU 41 changes the light emission mode of the LED 6050, which has been in the fourth blinking state, to the second blinking state for a predetermined time (e.g., several seconds) (E36). It is noted that, while in the present embodiment the light emission mode of the LED 6050 is always changed each time one rotation of the reel handle 6043 is detected, the light emission mode of the LED 6050 may be changed only when the time from the previous detection of one rotation of the reel handle 6043 to the current detection of one rotation exceeds a predetermined value (changed in accordance with the rotational speed of the reel handle 6043). Then the main CPU 41 terminates the routine and proceeds to the step E9 shown in FIG. 50A.

Subsequently, a process executed when it is determined that the gaming terminal 10 is currently in the failed fishing time (E27: YES) will be described. When the result of the step S27 is YES, the main CPU 41 determines whether the fish hooking flag has been turned on (E40). When the fish hooking flag has been turned off (E40: NO), the main CPU 41 terminates the routine and proceeds to the step E9 shown in FIG. 50A. Referring to FIG. 50C, when the fish hooking flag has been turned on (E40: YES), the main CPU 41 determines whether the fish hooking time set in the step E26 above has elapsed from the fish hook timing (i.e., a fishing failure timing has come) (E41).

When the fish hooking time set in the step E26 above has not elapsed from the fish hook timing (E41: NO), the main CPU 41 determines whether one rotation of the reel handle 6043 is detected (E42). When one rotation of the reel handle has not been detected (E42: NO), the main CPU terminates the routine and proceeds to the step E9 shown in FIG. 50A. On the other hand, when one rotation of the reel handle has been detected (E42: YES), the main CPU 41 counts the number of rotation of the reel handle 6043 (i.e., increments the number of rotation by one) (E43). Thereafter, the main CPU 41 executes a step similar to the step E36 (E45). In the present embodiment, only when the fish hooking flag has been turned on, the light emission mode of the LED 6050 is changed when one rotation of the reel handle 6043 is detected. Alternatively, the light emission mode of the LED 6050 may be changed when one rotation of the reel handle 6043 is detected, at any time when the first common game is being executed. Thereafter, the main CPU 41 terminates the routine and proceeds to the step E9 shown in FIG. 50A.

Now, a process executed when the fishing failure timing has come (E41: YES) will be described. The main CPU 41 sends, to the center controller 200, information (number of rotation information) indicating the counted number of rotation of the reel handle 6043 (E46). This number of rotation information is received in the later-described step F31 shown in FIG. 51B. Thereafter, the main CPU 41 controls the light emission of the LED 6050 so that the LED 6050 emits light in the third blinking state for a predetermined time (several seconds) (E47). This control of the light emission mode is conducted based on the illumination pattern table shown in FIG. 43B. The main CPU 41 then changes the setting of the vibration of the vibration motor 6049 to "small" for a predetermined time (E48). This control of the vibration of the vibration motor 6049 is conducted based on the vibration pattern table shown in FIG. 42. Thereafter, the setting of the vibration of the vibration motor 6049 is changed to the default setting (e.g., no vibration). Then the main CPU 41 executes a step similar to the step E33 (E49). Then the main CPU 41 resets the number of rotation of the reel handle 6043 (E50). Then the main CPU 41 terminates the routine and proceeds to the step E9 shown in FIG. 50A.

(Operation of Center Controller 200: Center-Controller-Side Common Game Process)

Figure 51A:
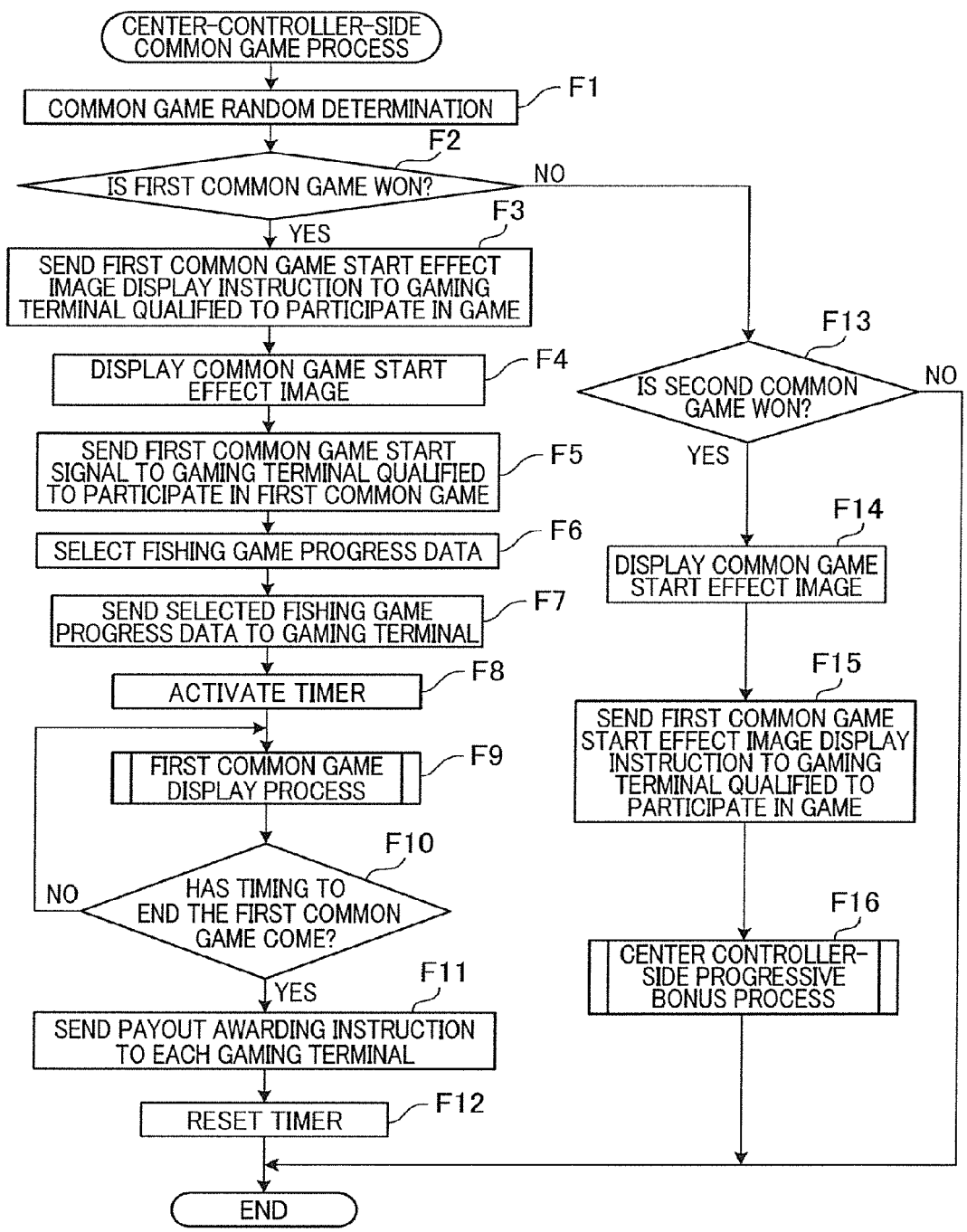
FIG. 51A is a flowchart of a center-controller-side common game process.
Figure 51B:
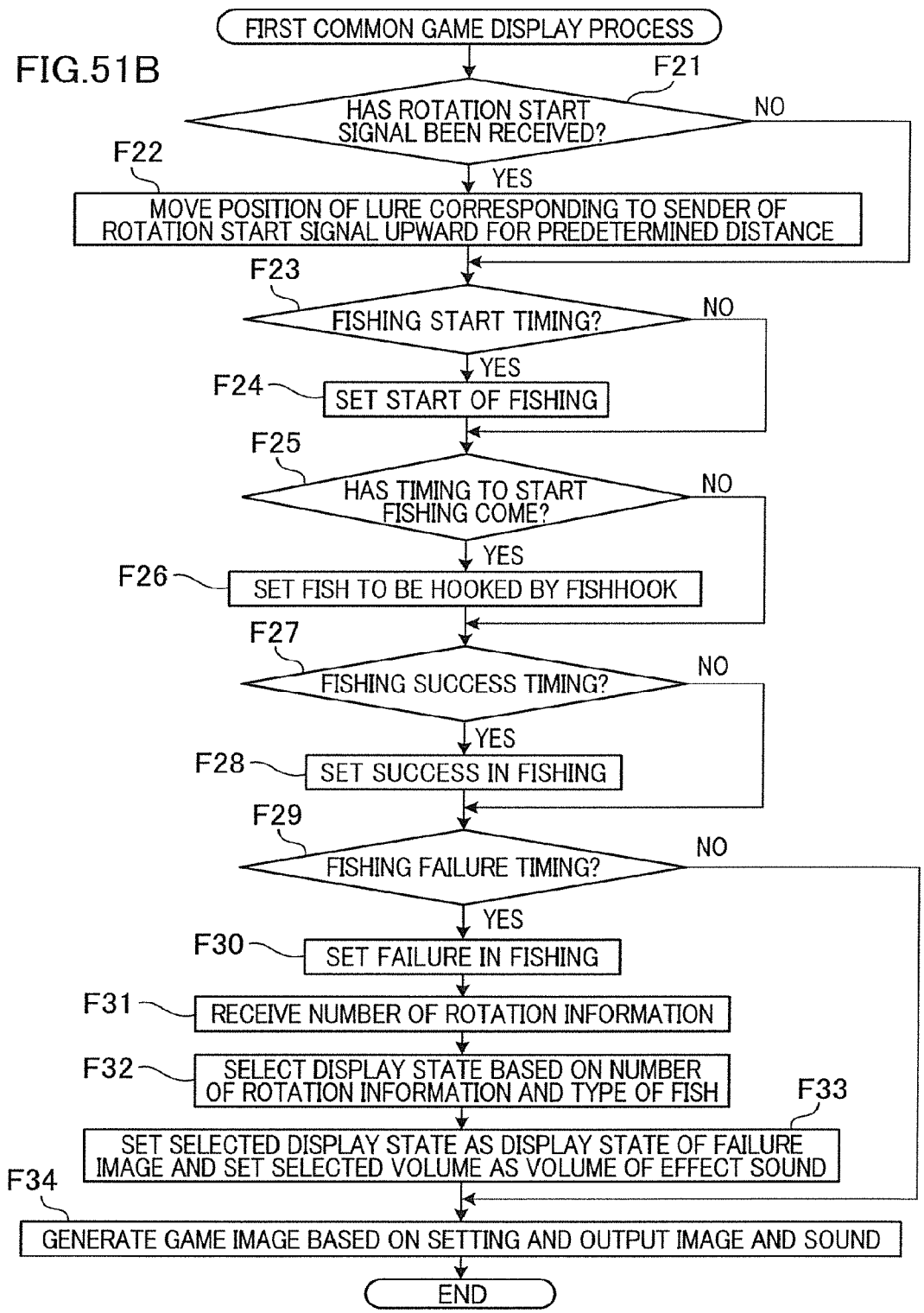
FIG. 51B is a flowchart of a first common game display process.

The main CPU 241 of the center controller 200 executes, after the execution of the center-side initial setting routine shown in FIG. 45 is completed, a center-controller-side common game process shown in FIG. 51A. Though not illustrated, the center-controller-side common game process is arranged to be executed at predetermined intervals (one second in the present embodiment).

To begin with, the main CPU 241 carries out a random determination of whether to start a common game (F1). The random determination to start the common game is done by the method described above, based on the common game start random determination table shown in FIG. 32. When winning of the common game is achieved, which one of the common games, the first common game and the second common game (progressive bonus game), is generated (won) is determined with reference to the common game type random determination table shown in FIG. 33.

Thereafter, the main CPU 241 determines whether the first common game is won (F2). When the first common game is won (F2: YES), a first common game start effect image display instruction is sent to a gaming terminal 10 which is qualified to participate in the first common game (F3). Whether a gaming terminal 10 is qualified or not is, for example, randomly determined. The first common game start effect image display instruction is received by the gaming terminal 10 in the step E1 above shown in FIG. 50A. Thereafter, the main CPU 241 causes the upper display 700 to display a common game start effect image shown in FIG. 34A (F4). Then the main CPU 241 sends a first common game start signal to a gaming terminal 10 qualified to participate in the first common game (F5). This first common game start signal is received by the gaming terminal 10 in the step E3 above shown in FIG. 50A.

Subsequently, the main CPU 241 selects one of the sets of fishing game progress data Da100 for each of all gaming terminals 10 qualified to participate in the first common game (F6). More specifically, to begin with, the main CPU 241 randomly selects one of total payout amounts of 1000 credits, 600 credits, and 300 credits. Thereafter, the main CPU 241 selects one of the sets of fishing game progress data Da100 corresponding to the selected total payout amount, with reference to the game progress determination table shown in FIG. 40. Then the main CPU 241 sends the selected set of fishing game progress data Da100 to the corresponding gaming terminal 10 (F7). In this case, the fishing game progress data Da100 is sent to each of the gaming terminals 10 qualified to participate in the game.

Subsequently, the main CPU 241 starts the timer (F8). Then the main CPU 241 executes a process (first common game display process) for causing the upper display 700 to display a game image of the first common game (F9). Thereafter, the main CPU 241 determines whether a timing to end the first common game has come (F10).

When the timing to end the first common game has not come (F10: NO), the main CPU 241 goes back to the step F9. On the other hand, when the timing to end the first common game has come (F10: YES), the main CPU 241 sends a payout awarding instruction to all gaming terminals 10 participating in the first common game (F11). Then the main CPU 241 resets the timer (F12) and terminates the center-controller-side common game process.

Now, a process executed when it is determined that the first common game has not been won (F2: NO) will be described. In this case, the main CPU 241 determines whether the second common game (progressive bonus game) has been won (F13). When the second common game (progressive bonus game) has not been won (F13: NO), the main CPU 241 terminates the center-controller-side common game process. On the other hand, when the second common game (progressive bonus game) has been won (F13: YES), the main CPU 241 causes the upper display 700 to display a common game start effect image of the second common game (F14).

Thereafter, the main CPU 241 sends a progressive bonus game start signal to a gaming terminal 10 qualified to participate in the second common game (F15). A gaming terminal 10 qualified to participate in the second common game is a gaming terminal 10 which has already been awarded a game qualification time at the start of the second common game. The progressive bonus game start signal is received by the gaming terminal 10 in the later-described step L1 shown in FIG. 53. Thereafter, the main CPU 241 executes a center controller-side progressive bonus process (F16) and terminates the center-controller-side common game process. Details of the center controller-side progressive bonus process will be given later with reference to FIG. 54.

(Operation of Center Controller 200: Center-Controller-Side Common Game Process: First Common Game Display Process)

To begin with, the main CPU 241 determines whether a rotation start signal has been supplied from any gaming terminal 10 participating in the first common game (F21). The rotation start signal is sent in the step E21 shown in FIG. 50B. When the rotation start signal has not been supplied from the gaming terminal 10 participating in the first common game (F21: NO), the main CPU 241 proceeds to the below-described step F23. On the other hand, when the rotation start signal has been supplied from any gaming terminal 10 participating in the first common game (F21: YES), the main CPU 241 changes the position of the lure image 713a corresponding to the gaming terminal 10 which is the sender of the supplied rotation start signal in such a way that the lure image 713 moves up for a predetermined distance (F22). Based on this setting, a game image shown in FIG. 35A will be shown in the later-described step F34. The lure image 713a having been moved up for the predetermined distance returns to the position before the moving over a predetermined time, as shown in FIG. 35B and FIG. 35C.

Thereafter, the main CPU 241 determines whether there is a gaming terminal 10 at which the timing to start the fishing has come, among the gaming terminals 10 participating in the first common game (F23). For this determination, the fishing game progress data Da100 having been obtained in the step F6 above is referred to. When there is no gaming terminal 10 at which the timing to start the fishing has come, (F23: NO), the main CPU 241 proceeds to the later-described step F25. On the other hand, when there is a gaming terminal 10 at which the timing to start the fishing has come (F23: YES), the main CPU 241 sets the start of the fishing for the gaming terminal 10 at which the timing to start the fishing has come (F24). Based on this setting a game image indicating the start of the fishing in the gaming terminal 10 having been set as above will be displayed in the later-described step F34.

Thereafter, the main CPU 241 determines whether there is a gaming terminal 10 at which the fish hook timing has come, among the gaming terminals 10 participating in the first common game (F25). For this determination, the fishing game progress data Da100 having been obtained in the step F6 above is referred to. When there is no gaming terminal 10 at which the fish hook timing has come (F25: NO), the main CPU 241 proceeds to the later-described step F27. On the other hand, when there is a gaming terminal 10 at which the fish hook timing has come (F25: YES), the main CPU 241 sets the fish image 714 to be hooked by the fishline 712a for the gaming terminal 10 at which the fish hook timing has come (F26). Based on this setting, a fish hooked image shown in FIG. 36 will be described for the gaming terminal 10 having been set as above, in the later-described step F34.

Thereafter, the main CPU 241 determines whether there is a gaming terminal 10 at which the fishing success timing has come, among the gaming terminals 10 participating in the first common game. For this determination, the fishing game progress data Da100 having been obtained in the step F6 above is referred to. When there is no gaming terminal 10 at which the fishing success timing has come (F27: NO), the main CPU 241 proceeds to the later-described step F29. On the other hand, when there is a gaming terminal 10 at which the fishing success timing has come (F27: YES), the main CPU 241 sets the success in fishing for the gaming terminal 10 at which the fishing success timing ha come (F28). Based on this setting, a success image will be displayed for the gaming terminal 10 having been set as above, in the later-described step F34.

Thereafter, the main CPU 241 determines whether there is a gaming terminal 10 at which the fishing failure timing has come, among the gaming terminals 10 participating in the first common game (F29). For this determination, the fishing game progress data Da100 having been obtained in the step F6 above is referred to. When there is no gaming terminal 10 at which the fishing failure timing has come (F29: NO), the main CPU 241 proceeds to the later-described step F34. On the other hand, when there is a gaming terminal 10 at which the fishing failure timing has come (F29: YES), the main CPU 241 sets the failure in fishing for the gaming terminal 10 at which the fishing failure timing has come (F30). Based on this setting, a failure image shown in FIG. 37, FIG. 38A, and FIG. 38B is displayed for the gaming terminal 10 having been set as above, in the later-described step F34.

Thereafter, the main CPU 241 receives the number of rotation information from the gaming terminal 10 at which the fishing failure timing has come (F31). The main CPU 241 then selects the display state of the failure image (failure object image O1) (F32). More specifically, the main CPU 241 searches the level selection table Da20 shown in FIG. 39A with the number of rotation of the reel handle 6043 indicated by the number of rotation information received in F31 and the type of the fish hooked in the gaming terminal 10 at which the fishing failure timing has come. With this search, the main CPU 241 selects one of the levels 1 to 4. Then the main CPU 241 obtains, from the failure effect determination table Da30 shown in FIG. 39B, the color of the failure object image O1 and the volume of the effect sound corresponding to the selected one level.

Then the main CPU 241 sets the display state (color of the failure object image O1) selected in the step F32 as the display state (color of the failure object image O1) of the failure image F34 displayed in the subsequent step F34, and sets the volume selected in the step F32 as the volume of the effect sound (F33). Based on this setting, in the subsequent step F34, the image data of the failure object image O1 in the selected display state (color) is obtained and a failure image synthesized with the image based on the image data is displayed. The effect sound is output with the volume based on the setting. Subsequently, the main CPU 241 proceeds to the later-described step F34.

In the step F34, the main CPU 241 causes the upper display 700 to display a game image of the fishing game and output the effect sound with predetermined volume, based on the settings done in the steps F21 to F33 (F34). Thereafter, the main CPU 241 terminates the first common game display process.

(Progressive Bonus Related Process)

Now, referring to FIG. 52, a progressive bonus related process will be described. The main CPU 41 of the gaming terminal 10 executes a progressive bonus related process shown in FIG. 52 in the step C5 in the terminal-side base game process shown in FIG. 46.

To begin with, the main CPU 41 calculates the accumulated amount added to the progressive bonus (K1). More specifically, when bet is placed in C1, the main CPU 41 multiplies the bet amount by a predetermined accumulation rate (for example, 10%) to calculate the accumulated amount added to the progressive bonus.

Subsequently, the main CPU 41 sends the calculated accumulated amount added to the progressive bonus to the progressive controller 340 (K2). The process is then terminated.

(Terminal-Side Progressive Bonus Process)

Now, referring to FIG. 53, the terminal-side progressive bonus process will be described. To begin with, the main CPU 41 of the gaming terminal 10 determines whether a progressive bonus start instruction has been received (L1). When the progressive bonus start instruction has not been received (L1: NO), the process is terminated.

On the other hand, when the progressive bonus start instruction has been received (L1: YES), a progressive bonus start effect process is executed (L2). In this process, a lookup display unit 404 shown in FIG. 23 is displayed on the terminal image display panel 16.

Subsequently, the main CPU 41 executes a progressive bonus random determination process (L3). In this process, one of grande progressive bonus, major progressive bonus, minor progressive bonus, mini progressive bonus and losing is selected by internal random determination.

Thereafter, the main CPU 41 determines which one of the grande progressive bonus, the major progressive bonus, the minor progressive bonus, the progressive bonus, and the mini progressive bonus is achieved, as a result of the random determination (L4).

When one of the grande progressive bonus, the major progressive bonus, the minor progressive bonus, and the mini progressive bonus is achieved (L4: YES), information indicating which one of the bonuses, the grande progressive bonus, the major progressive bonus, the minor progressive bonus, and the mini progressive bonus, has been won and information with which the winning gaming terminal 10 is specified are sent to the progressive controller 340 as a winning signal (L5).

Subsequently, the main CPU 41 determines whether a progressive prize amount signal has been supplied from the progressive controller 340 (L6). When the progressive prize amount signal has not been supplied (L6: NO), the main CPU 41 waits for the progressive prize amount signal.

On the other hand, either when the progressive prize amount signal has been supplied (L6: YES) or the winning is not achieved in L4 (L4: NO), the main CPU 41 sends a progressive bonus random determination effect signal to the center controller 200 (L7).

Thereafter, the main CPU 41 executes a payout process (L8). More specifically, a progressive prize amount is awarded as a payout in accordance with the progressive prize amount signal received in L6. It is noted that each gaming terminal 10 is able to participate in the second common game (progressive bonus game) only during the game qualification time corresponding to that gaming terminal, and a progressive prize amount calculated based on the payout rate corresponding to that gaming terminal is awarded.

(Progressive Controller-Side Progressive Bonus Process)

Figure 54:
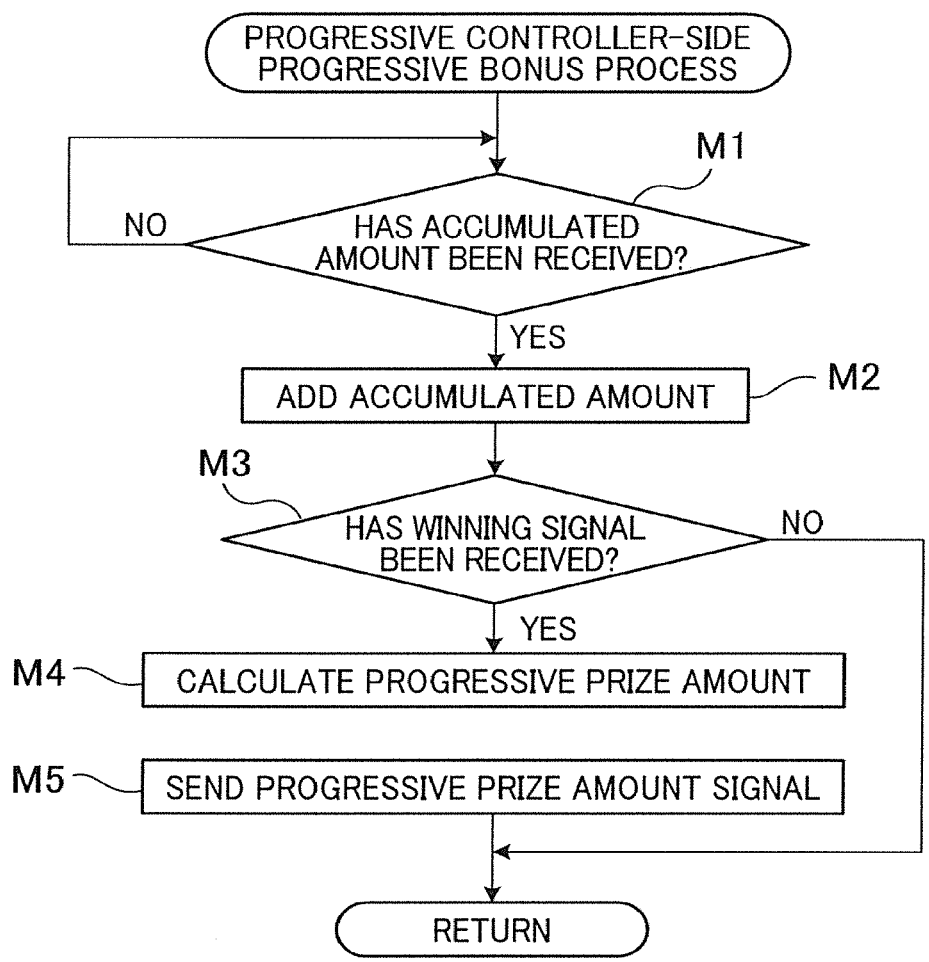
FIG. 54 is a flowchart of a progressive controller-side progressive bonus process.

Although not shown in figures, a CPU of the progressive controller 340 executes a progressive controller-side progressive bonus process shown in FIG. 54.

To begin with, the CPU determines whether the accumulated amount added to progressive bonus, which is sent from the gaming terminal 10 in the step K2 of the progressive bonus related process above, has been received (M1). When the accumulated amount added to the progressive bonus has not received (M1: NO), the CPU waits for the accumulated amount to the progressive bonus.

On the other hand, when the accumulated amount added to the progressive bonus has been received (M1: YES), the progressive bonus amount accumulatively stored in the RAM 343 is updated such that the accumulated amount added to the progressive bonus, which has been supplied, is added to the accumulatively-stored progressive bonus amount (M2). In this connection, there are four types of progressive bonus amounts accumulatively stored in the RAM 343, namely, a grande progressive bonus amount, a major progressive bonus amount, a minor progressive bonus amount, and a mini progressive bonus amount. The accumulated amount added to the progressive bonus having been supplied is added to the grande progressive bonus amount, the major progressive bonus amount, the minor progressive bonus amount, and the mini progressive bonus amount at the ratio of 4:3:2:1, and the amounts after the addition are accumulatively stored. For example, when the accumulated amount added to the progressive bonus having been supplied is "1", "0.4" is added to the grande progressive bonus amount, "0.3" is added to the major progressive bonus amount, "0.2" is added to the minor progressive bonus amount, and "0.1" is added to the mini progressive bonus amount.

Subsequently, the CPU determines whether the winning signal which is sent from the gaming terminal 10 in the step L5 of the terminal-side progressive bonus process described above has been received (M3). When the winning signal has not been received (M3: NO), the process is terminated.

On the other hand, when the winning signal has been received (M3: YES), a progressive prize amount is calculated (M4). More specifically, the type of the achieved progressive bonus (one of the grande progressive bonus, the major progressive bonus, the minor progressive bonus, and the mini progressive bonus) is specified based on the winning signal, and the progressive bonus amount corresponding to the specified type of the progressive bonus is set as the progressive prize amount. For this calculation, the payout rate corresponding to the gaming terminal 10 from which the winning signal has been supplied is used. The payout rate is obtained from the center controller 200 for the calculation of the progressive prize amount.

Thereafter, to the gaming terminal 10 having sent the winning signal, the progressive prize amount calculated in M4 is sent as a progressive prize amount signal (M5). After this step, the process is terminated. When plural gaming terminals 10 achieve the winning in the progressive bonus game, the CPU receives the winning signals from those gaming terminals 10 and sends the progressive prize amount signal to those gaming terminal 10.

(Center Controller-Side Progressive Bonus Process)

Figure 55:
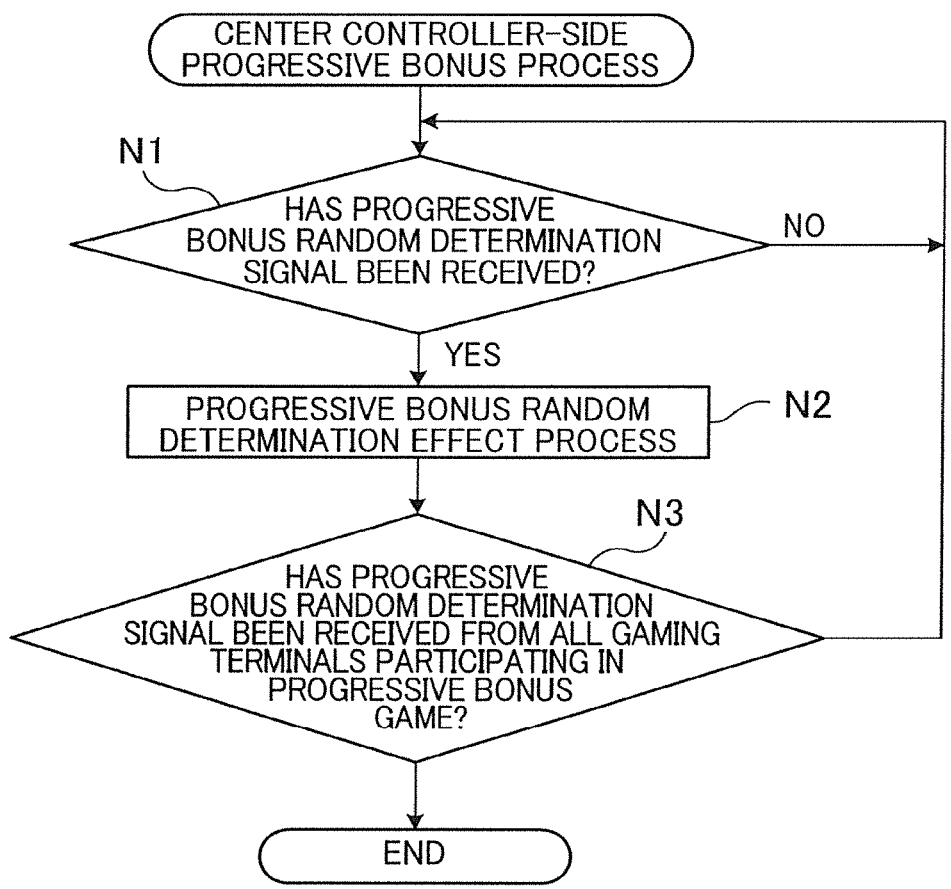
FIG. 55 is a flowchart of a center controller-side progressive bonus process.

After the execution of the center-side initial setting routine, the main CPU 241 of the center controller 200 executes a center controller-side progressive bonus process shown in FIG. 55.

To begin with, the main CPU 241 determines whether the progressive bonus random determination effect signal which is sent from the gaming terminal 10 in the step L7 in the terminal-side progressive bonus process above has been received (N1). When the progressive bonus random determination effect signal has not been received (N1: NO), the CPU 241 waits for the progressive bonus random determination effect signal.

On the other hand, when the progressive bonus random determination effect signal has been received (N1: YES), a progressive bonus random determination effect process is executed (N2). In this process, in a later-described progressive bonus effect image shown in FIG. 56, an effect image is displayed. In the effect image, a fish school image 720 (grande fish 901, major fish 902, minor fish 903, or mini fish 904) corresponding to the type (the grande progressive bonus, the major progressive bonus, the minor progressive bonus, or the mini progressive bonus) of the progressive bonus won in the progressive bonus random determination process (L3) is caught by the fisherman image 711 corresponding to the winning gaming terminal 10. As a result of this process, the main CPU 241 determines whether a progressive bonus random determination signal has been supplied from all gaming terminals 10 participating in the progressive bonus game (N3). When the progressive bonus random determination signal has been supplied from all gaming terminals 10 (N3: YES), the main CPU 241 terminates the process. When the progressive bonus random determination signal has not been supplied from all gaming terminals 10 (N3: NO), the main CPU 241 goes back to the step N1.

(Progressive Bonus Effect Image)

Figure 56:
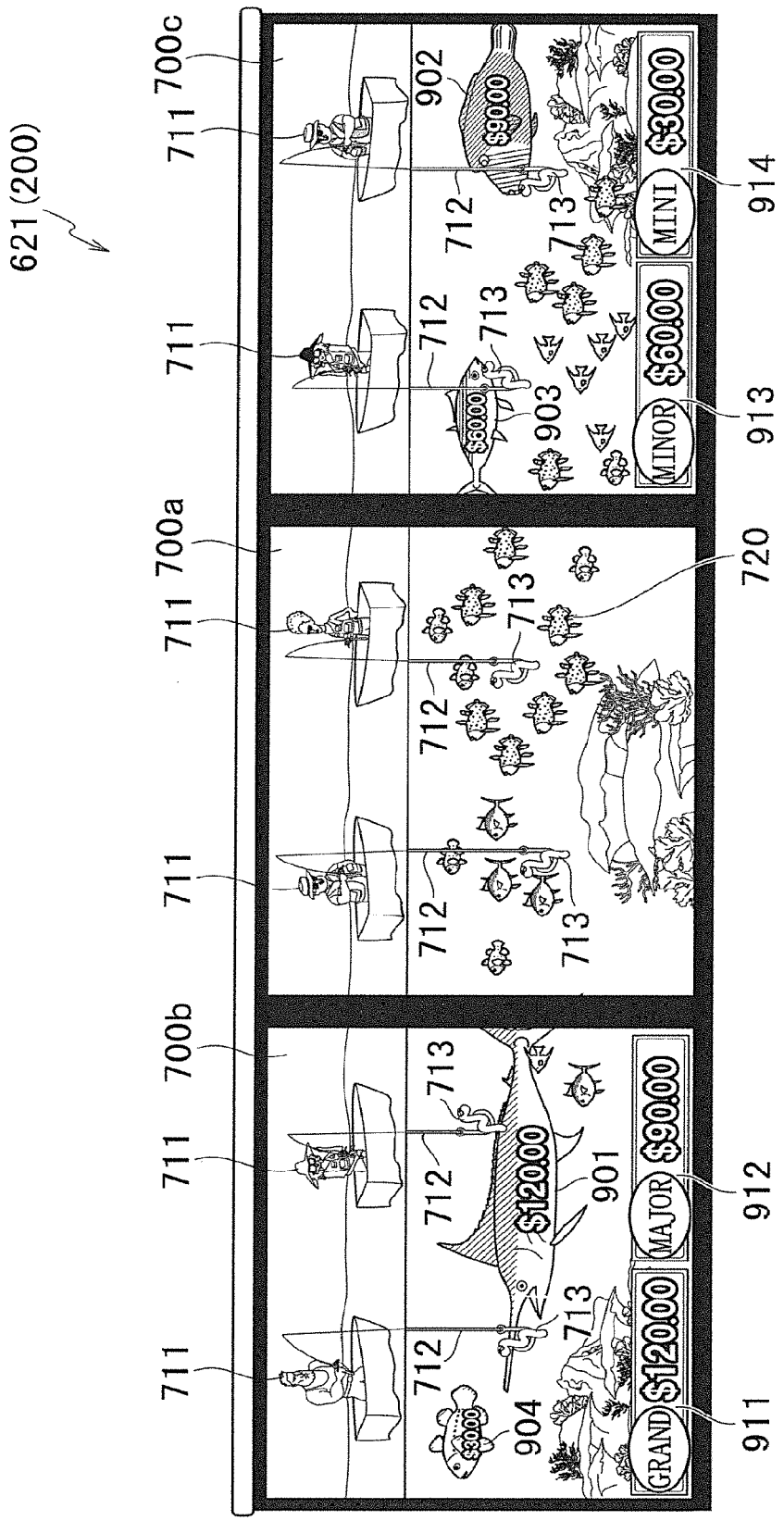
FIG. 56 shows an example of a progressive bonus effect image.

When no common game occurs, a progressive bonus effect image shown in FIG. 56 is displayed. The progressive bonus effect image is stored in the RAM 243 of the center controller 200.

FIG. 56 shows the display states of the upper displays 700a, 700b, and 700c. More specifically, on the upper displays 700a, 700b, and 700c, a passing game start effect image in which many and plural types of fish school images 720 are displayed from right to left is displayed. These many fish school images 720 include images indicating grande fish 901, major fish 902, minor fish 903, and mini fish 904. Furthermore, on the grande fish 901, the major fish 902, the minor fish 903, and the mini fish 904, a grande progressive bonus amount, a major progressive bonus amount, a minor progressive bonus amount, and a mini progressive bonus amount, which are accumulatively stored in the RAM 343, are displayed, respectively.

Furthermore, at the bottom parts of the upper displays 700a, 700b, and 700c, a grande display frame 911 configured to display a grande progressive bonus amount, a major display frame 912 configured to display a major progressive bonus amount, a minor display frame 913 configured to display a minor progressive bonus amount, and a mini display frame 914 configured to display a mini progressive bonus amount are displayed, respectively. In addition to the above, at the upper parts of the upper displays 700a, 700b, and 700c, a fisherman image 711, a fishhook image 712, and a fishing bait image 713 are displayed, respectively. The fisherman image 711 is different in each gaming terminal 10, to make it possible to understand how the gaming terminals 10 correspond the respective images.

As described above, on the upper displays 700a, 700b, and 700c, the grande fish 901, the major fish 902, the minor fish 903, and the mini fish 904 indicating the grande progressive bonus, the major progressive bonus, minor progressive bonus, and the mini progressive bonus are displayed in situations including the time during the base game. As the current grande progressive bonus amount, major progressive bonus amount, minor progressive bonus amount, and mini progressive bonus amount are displayed on the grande fish 901, the major fish 902, the minor fish 903, and the mini fish 904, the player is able to visually grasp the progressive prize amount which is to be paid out if a fish is caught at the current stage.

When the progressive bonus random determination effect process is executed in the center controller-side progressive bonus process, an effect image is displayed. In the effect image, the fish school image 720 (the grande fish 901, the major fish 902, the minor fish 903, or the mini fish 904) corresponding to the type of the progressive bonus (the grande progressive bonus, the major progressive bonus, the minor progressive bonus, or the mini progressive bonus) achieved in the progressive bonus random determination process (L3) is caught by the fisherman image 711 corresponding to the winning gaming terminal 10.

(Symbol Scrolling Display Process)

Figure 66:
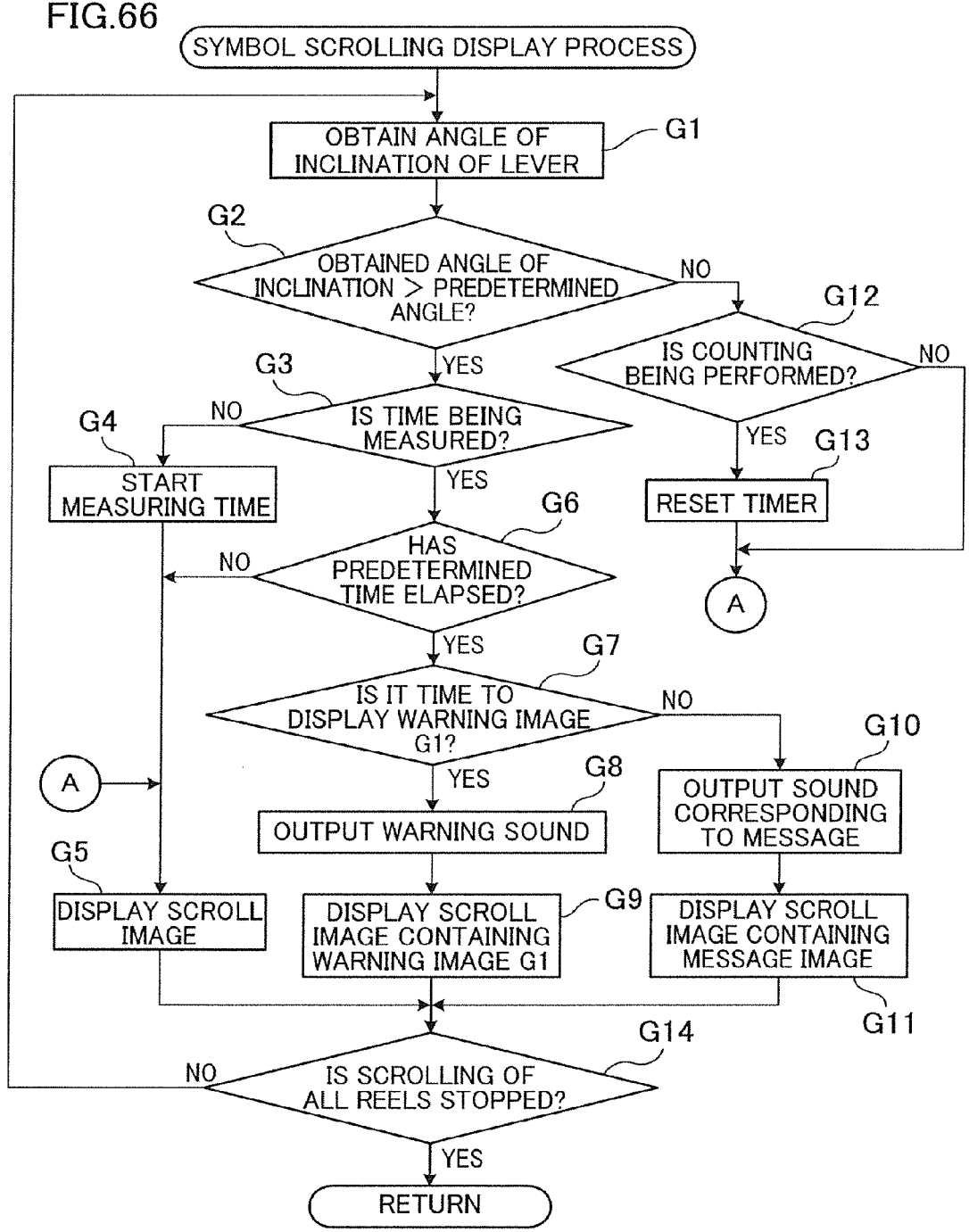
FIG. 66 is a flowchart of a symbol scrolling display process.

In addition to the above, in the present embodiment, as shown in FIG. 66, the symbol scrolling display process in the step C7 of the terminal-side base game process shown in FIG. 46 is executed. To begin with, the main CPU 41 obtains the degree of inclination (lever position) from the reference position of the control lever 603 (G1). More specifically, the main CPU 41 obtains the lever position by comparing the detected magnetic force indicated by the magnetic force detection data input from the main body PCB 60 with the lever position determining table.

Subsequently, the main CPU 41 determines whether the degree of inclination of the control lever 603 obtained in the step G1 exceeds a warning notification angle (G2). For example, when the degrees of inclination (lever positions) of the control lever 603 are at the seventh position and the end position, it may be determined that the degrees of inclination of the control lever 603 exceed the warning notification angles. Furthermore, when the control lever 603 is inclined forward and the degree of inclination from the reference position exceeds the warning notification angle and when the control lever 603 is inclined backward and the degree of inclination from the reference position exceeds the warning notification angle, the result of the determination in the step G2 is YES.

When it is determined that the degree of inclination of the control lever 603 exceeds the warning notification angle (YES in G2), the main CPU 41 determines whether the counting is under way (G3). When the counting is not under way (NO in G3), the main CPU 41 starts the counting (G4). Thereafter, the main CPU 41 generates a display image (scroll display image) by using the graphic board 68 and causes the terminal image display panel 16 to display the scroll display image (G5).

When displayed for the first time, the scroll display image is generated such that the symbols 501 on all (five) video reels 151 to 155 are scroll-displayed over plural frames. When a timing to stop predetermined one of the video reels 151 to 155 has come, the symbols 501 stopped on that reel are determined based on the data in the symbol storage area, and the scroll display image is generated so that these symbols 501 are stopped and displayed. The timings to stop the respective video reels 151 to 155 are different from one another. For this reason, the scroll display image is generated such that symbols 501 on a reel of which the stop timing has not come are scrolled over plural frames until the stop timing comes. Thereafter, the main CPU 41 executes a later-described step G14.

On the other hand, when the counting is under way (YES in G3), the main CPU 41 determines whether a predetermined time has elapsed from the start of the counting (e.g., 0.5 second has elapsed) based on the counted value (G6). In this regard, when the predetermined time has not elapsed from the start of the counting (NO in G6), the main CPU 41 generates a display image (scroll image) by using the graphic board 68 and causes the terminal image display panel 16 to display the scroll display image (G5). Thereafter, the main CPU 41 executes the later-described step G14.

When the predetermined time has elapsed from the start of the counting (YES in G6), the main CPU 41 determines whether a timing to display a warning image has come (G7). The timing is, for example, determined based on the counted value. For example, a warning image "WARNING!" is displayed on the terminal image display panel 16.

When the timing to display the warning image ("WARNING!") has come (YES in G7), the main CPU 41 executes a process of outputting sound corresponding to the warning image ("WARNING!") from the speaker 29 (S8). Then the main CPU 41 synthesizes the warning image ("WARNING!") onto the scroll display image generated by using the graphic board 68, in the same manner as in the step G5. Then the main CPU 41 displays, on the terminal image display panel 16, the scroll display image synthesized with the warning image ("WARNING!"), by using the graphic board 68 (G9). Thereafter, the main CPU 41 executes the later-described step G14. When the timing to display the warning image ("WARNING!") has not come (NO in G7), the main CPU 41 executes a process of outputting sound corresponding to another warning image ("Do not touch the controller!") from the speaker 29, because it is a timing to display the another warning image ("Do not touch the controller !") (S10). Thereafter, the main CPU 41 synthesizes the another warning image ("Do not touch the controller !") onto the scroll display image generated by using the graphic board 68, in the same manner as in the step G5 above. The graphic board 68 then causes the terminal image display panel 16 to display the scroll display image synthesized with the another warning image ("Do not touch the controller !") (G11). Then the main CPU 41 executes the later-described step G14.

Now, a process when the degree of inclination of the control lever 603 obtained in the step G1 does not exceed the warning notification angle (NO in G2) will be described. In this process, the main CPU 41 determines whether the counting is under way (G12). When the counting is under way (YES in G12), the main CPU 41 terminates the counting (resets the counter) (G13), and executes the step G5 above. On the other hand, when the counting is not under way (NO in G12), the main CPU 41 executes the step G5 above without executing the step G13. In the step G5, the scroll display image not synthesized with the warning image is displayed on the terminal image display panel 16. As such, when the degree of inclination of the control lever 603 does not exceed the warning notification angle, the warning image is not displayed.

As described above, when the result of the determination in the step G3 is NO, the step G5 is executed instead of the steps G9 and G11 even if the result of the step G6 is NO. For this reason, the warning image is not displayed, and the warning image is not displayed even if the degree of inclination of the control lever 603 exceeds the warning notification angle, when a predetermined time (for example, 0.5 sec) has not elapsed from the timing at which the degree of inclination exceeds the warning notification angle. As such, the warning image is not displayed when the player swiftly notices that the inclination of the control lever 603 is excessive and immediately correct the way of operating the control lever 603.

To execute the step G5, the main CPU 41 executes the later-described step G14.

In the step G14, the main CPU 41 determines whether all video reels 151 to 155 have stopped scrolling (G14). When all video reels 151 to 155 have stopped scrolling (YES in G14), the main CPU 41 terminates the sub routine of the scroll display process and goes back to the terminal-side base game process. On the other hand, when at least one of all video reels 151 to 155 has not stopped scrolling (NO in G14), the main CPU 41 goes back to the step G1 and repeatedly executes the steps G1 to G13 in each predetermined drawing cycle, until the result of the step G14 becomes YES.

According to the arrangement above, as the player rotates the reel handle 6043 attached to the control lever 603 in accordance with the game situation, the number of rotation of the rotation axis 6042 is detected by the rotation sensor 6044, and the effect content represented by effect images displayed on the terminal image display panel 16 and the upper display 700 is changed in accordance with the detected number of rotation. In a fishing game which is a common game, the player can therefore imitate the action of rotating a reel by rotating the reel handle 6043 with the assumption that the control lever 603 is a fishing rod, and can change the game content and effect images by rotating the handle. This provides the player with a new effect of as if he/she is actually playing fishing. Furthermore, the control lever 603 is provided with the rotary dumper 6045 that imparts resistance to the rotation axis 6042 such that the torque on the rotation axis 6042 increases in accordance with the increase in the rotational speed and the torque on the rotation axis 6042 becomes constant after the speed becomes equal to or higher than a predetermined rotational speed. As such, rotation resistance imparted to a reel of an actual fishing rod is reproduced.

In addition to the above, because the effect sound generator 6048 is provided in the control lever 603 as described above, the teeth of the gear 6046 slap the flexible blade 6047 fixed to the control lever 603 as the reel handle 6043 is rotated by the player, with the result that ticking sound is generated as if a real fishing reel is rotating. This provides the player with an effect of as if he/she is actually playing fishing.

In addition to the above, because the vibration motor 6049 is provided in the control lever 603 as described above, the control lever 603 is vibrated as the vibration motor 6049 is vibrated in accordance with the game status of the fishing game in the common game. This provides the player with an effect of as if he/she is actually playing fishing.

Furthermore, according to the arrangement above, as the player rotates the reel handle 6043 provided on the control lever 603 in accordance with the state of the game, the number of rotation of the rotation axis 6042 is detected by the rotation sensor 6044 and the effect content represented by effect images displayed on the terminal image display panel 16 and the upper display 700 is changed in accordance with the detected number of rotation. When, for example, the common game in which a plurality of gaming terminals 10 are synchronized is a fishing game, the player can therefore imitate the action of rotating a reel by rotating the reel handle 6043 with the assumption that the control lever 603 is a fishing rod, and can change the game content and effect images by rotating the handle. This provides the player with an effect of as if he/she is actually playing fishing.

In addition to the above, the control lever 603 above is provided with the grip 6030 which is gripped by one hand of the player to fix the control lever 603 or to rotate the control lever 603 forward and backward, and the reel unit 6040 is provided on a side face of the grip 6030 to allow the player to fix the control lever 603 by gripping the grip 6030 by one hand and to rotate the reel handle 6043 by the other hand. With this, because the player can firmly fix the control lever 603 by one hand and rotate the reel handle 6043 by the other hand, an excessively strong power is not required to operate the control lever 603. This prevents the player from concentrating on the operation too much and physically damaging the control lever 603.

According to the arrangement above, in a fishing game which is a common game in which a benefit is awarded in accordance with the type and size of fish caught, a common effect image in which the fishline 712a displayed on the upper display 700 (common display) is moved up or down in accordance with the number of rotation detected by the rotation sensor 6044 is displayed (see FIG. 35A, FIG. 35B, and FIG. 35C). This provides the player with an effect of as if he/she is actually playing fishing.

Furthermore, according to the arrangement above, the control lever 603 is provided with the grip 6030 which is gripped by one hand of the player and rotatable about the rotation axis 6030a, and the reel handle 6043 of the reel unit 6040 is arranged to be rotatable about the axis (rotation axis 6042) with respect to the rotation axis 6030a of the grip 6030. With this, the control lever 603 is operated by both hands of the player such that the player grips the grip 6030 by one hand and rotates the reel handle 6043 by the other hand. In this regard, because the rotation axis 6030a of the grip 6030 and the rotation axis 6042 of the reel handle 6043 are arranged to be in parallel to each other, the fluctuation occurring when the grip 6030 and the reel handle 6043 are operated is restrained as compared to a case where the rotation axis 6030a of the grip 6030 and the rotation axis 6042 of the reel handle are not arranged to be in parallel to each other. This prevents the player from concentrating on the operation too much and physically damaging the control lever 603.

The above embodiment thus described solely serves as a specific example of the present invention, and the present invention is not limited to such an example. Specific structures of various means may be suitably designed or modified. The above embodiment thus described solely serves as a specific example of the present invention, and the present invention is not limited to such an example. Specific structures of various means may be suitably designed or modified.

For example, the aspects, values, or the like concerning the effects are not limited to those described in the embodiment above. Furthermore, the data or the like exchanged between the gaming terminals 10 and the center controller is not limited to the above. For example, the information of the number of paylines L activated in response to betting is transmitted in the present embodiment. Not limited to this, information indicating the bet amount may be transmitted. In this case, a table associated with the number of paylines may be associated with the bet amount or the range of the bet amount.

In addition to the above, while in the embodiment above resistance is imparted to the rotation axis 6042 by using the rotary dumper 6045 which is included in the reel unit 6040 and includes a one-way clutch as a rotation resistance imparting unit, resistance may be imparted to the rotation axis 6042 by electric control. For example, an electromagnetic-clutch rotation resistance imparting unit is used and resistance is imparted to the rotation axis 6042 based on an instruction from the CPU 41 (electric control). In this case, the CPU 41 (controller) calculates the rotational speed of the reel handle 6043 based on the rotation of the reel handle 6043 (rotation axis 6042) detected by the rotation sensor 6044. Referring to a resistance change table stored in the RAM 43, the CPU 41 then gives an instruction to the electromagnetic-clutch rotation resistance imparting unit to impart resistance in accordance with the calculated rotational speed. The resistance change table is a table in which resistance corresponding to the rotational speed is set in such a way that, for example, the rotational speeds of the reel handle 6043 are classified into three ranges, i.e., 0 to A, A the B, and B and higher, and resistance D is set for the range of 0 to A, resistance E is set for the range of A to B, and resistance F (D<E<F) is set for the range of B and higher. As described above, the rotational speed of the rotation axis 6042 (reel handle 6043) is calculated by dividing the (predetermined) distance for one rotation of the rotation axis 6042 by the time required for one rotation of the rotation axis 6042 (the interval of rotations of the rotation axis 6042 detected by the sensor 6044b).

According to the arrangement above, the rotational speed of the reel handle 6043 is calculated based on the rotation of the reel handle 6043 detected by the rotation sensor 6044, and the resistance corresponding to the calculated rotational speed is applied to the reel handle 6043 under the electric control by the electromagnetic-clutch rotation resistance imparting unit. This makes it possible to imitate the rotational resistance applied to the reel of an actual fishing rod.

In addition to the above, while the rotation axis 6042 is provided in the present embodiment, the reel handle 6043 may be attached such that a drum is provided in place of the rotation axis 6042 and the drum is directly rotated (direct drive). In this case, because the reel handle 6043 is rotated at a position distant from the rotational axis of the drum (i.e., the rotational center of the drum is deviated from the rotational center of the reel handle 6043), the force required for the player to rotate the reel handle 6043 is small.

In addition to the above, while in the present embodiment an effect is executed after a payout in a base game, a bonus game, or a common game is randomly determined, the random determination may be conducted while an effect is being executed. For example, while in the embodiment above an effect indicating the payout amount by the fish image 714 and the fishing bait image 713 is executed as an effect in the bonus game and the common game, the following effect may be executed by using the fishing bait image 713.

More specifically, an effect in which the fish image 714 approaches the fishing bait image 713 is conducted. When the probability of winning the bonus corresponding to the fish image 714 is high (for example, 73% or higher), the fishing bait image 713 is displayed in red, when the probability of the winning the bonus corresponding to the fish image 714 is intermediate (for example, 54% or higher), the fishing bait image 713 is displayed in orange, and when the probability of winning the bonus corresponding to the fish image 714 is low (for example, 53% or lower), the color of the fishing bait image 713 is maintained to be green. Alternatively, the fish image 714 may open the mouth and attack the fishing bait image 713 when the fishing bait image 713 is displayed in red, and the fishing bait image 713 may be pecked by the mouth of the fish image 714 when the fishing bait image 713 is displayed in orange.

In addition to the above, while the game qualification time awarding table shown in FIG. 16 indicates that a plurality of payout rates are set for each number of activated paylines, the disclosure is not limited to this arrangement. For example, as shown in FIG. 57, a payout rate may be set for each number of activated paylines.

In the present embodiment, when any one of the gaming terminals 10 wins the independent special game or the mystery bonus and an effect associated with the game having been won is being executed at any one of the gaming terminal areas 703 of the upper display 700, a common game starts after the end of the effect even if the start of the common game has been determined. The disclosure, however, is not limited to this arrangement. For example, when the start of the common game is determined, the effect associated with the independent special game or the mystery bonus may be canceled and the common game may be started. This makes it possible to start the common game without keeping the gaming terminal 10 qualified in the common game waiting for the start of the game.

Figure 58:
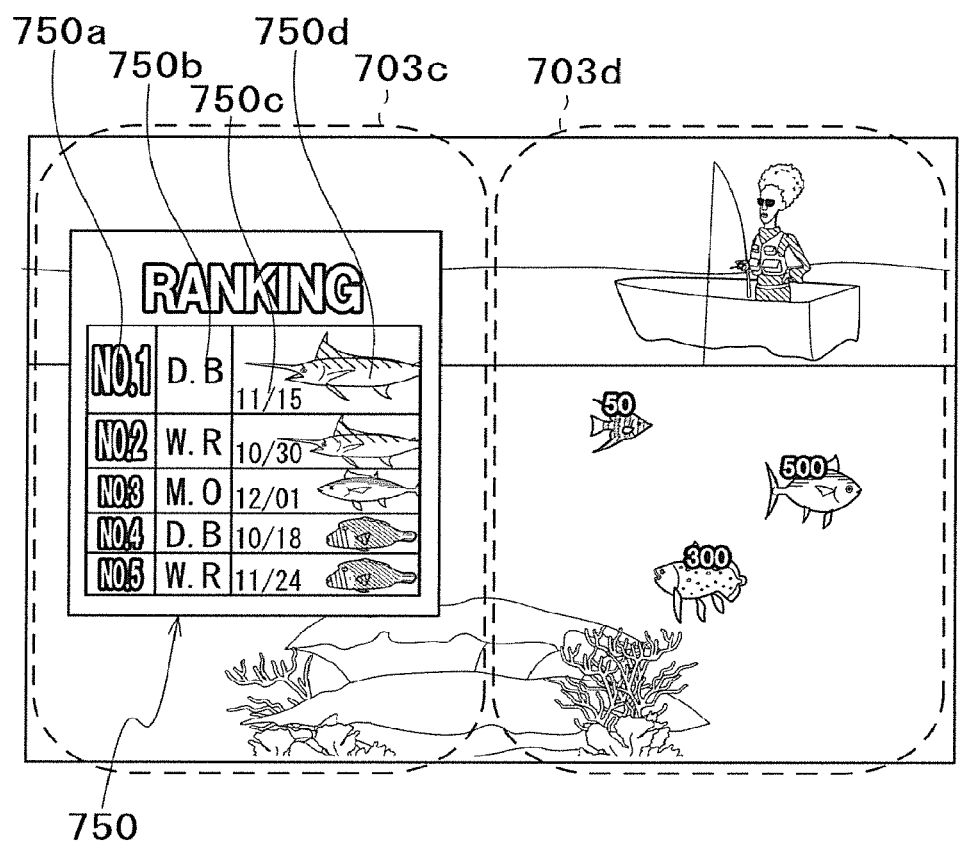
FIG. 58 shows an example of a screen displaying ranking.

When no game is being executed at the gaming machine 300 or no game is being executed at any gaming terminal 10, the ranking of bonus types having been awarded as payouts in the past may be displayed on the upper display 700 as shown in FIG. 58.

In the example shown in FIG. 58, no game is being executed at the gaming terminal 10c. More specifically, at a central part of the gaming terminal area 703c corresponding to the gaming terminal 10c, a ranking image 750 is displayed. The ranking image 750 includes a rank area 750a, a name area 750b, a date area 750c, and a fish area 750d. The rank area 750a displays the ranks indicating the sizes of obtained bonuses. The name area 750b displays the names of the players having obtained bonuses. Note that, when the gaming terminal 10 is able to store a member card or the like in which the name, membership number or the like of the player is stored, the name, membership number or the like stored in the card may be displayed. The date area 750c displays the date of obtaining a bonus. The fish area 750d displays an image of fish corresponding to an obtained bonus. Alternatively, on the fish area 750d, a text string indicating the obtained bonus may be displayed, a unit payout amount of the obtained bonus may be displayed, or at least one of the former two and a fish image may be displayed. The ranking may be determined with reference to the unit payout amount of each obtained bonus or with reference to a value calculated by multiplying a unit payout amount by a payout rate.

In addition to the above, the present embodiment may be arranged such that, as indicated by a count display unit 720 shown in FIG. 33, the time during which the common game is executed, which is determined in advance, is arranged to be variable for each gaming terminal 10, and the time during which the common game is executed is extended in accordance with the average bet amount per unit game in the base game before the start of the common game. In such a case, the average value of the current bet amount is preferably displayed on the terminal image display panel 16. With this, checking the average bet amount displayed on the terminal image display panel 16, the player is able to adjust the amount of bet placed by him/her to set the time during which the common game is run to be a desirable time, in preparation for the common game which starts at an unknown timing.

In addition to the above, the time during which the common game is executed may be elongated in accordance with the accumulative amount of the bet amount until the start of the common game. Also in this case, the current accumulative bet amount is desirably displayed on the terminal image display panel 16. According to this arrangement, checking the current accumulative bet amount displayed on the terminal image display panel 16, the player is able to adjust the amount of bet placed by him/her to set the time during which the common game is run to be a desirable time, in preparation for the common game which starts at an unknown timing. Furthermore, because the accumulative bet amount is displayed, the player adjusts the bet amount more finely as compared to the case where the average bet amount is displayed, and hence strategic enjoyment is enhanced.

In addition to the above, the time during which the common game is run may be determined based on the bet amount in the base game immediately before the start of the common game. According to this arrangement, the player may increase the bet amount to keep the time during which the common game is run to be always a desired time, in preparation for the common game which starts at an unknown timing.

(Game Invalidation Due to Update of Movable Range and Warning Display)

The gaming terminal 10 of the present embodiment may be arranged so that the movable range of the control lever 603 is updated in accordance with an operation by the user. Furthermore, warning display and game invalidation may be executed in accordance with the state of operation of the control lever 603. More specifically, the gaming terminal 10 includes a terminal image display panel 16, a speaker 617 or the like used for giving notification to the player, a control lever 603 for receiving an input from the player, a supporting mechanism 6200 shown in FIG. 10 which rotatably supports the control lever 603 by the rotation motor 6033 at one end portion of the control lever 603, an inclination detecting mechanism 600a for detecting the angle of inclination of the control lever 603, and a storage unit (inclination angle tables shown in FIG. 68 and FIG. 69) for storing the angle of inclination, and a terminal controller 630.

The supporting mechanism 6200 is arranged to be switchable between a mode with which the control lever 603 is automatically rotated by the rotation motor 6033 and a mode with which the control lever 603 receiving a load form the rotation motor 6033 is manually rotated by the player. In the present embodiment, the phrase "the control lever 603 is rotatable" indicates an operation in the mode with which the lever is automatically rotated by the driving force of the rotation motor 6033.

Figure 68:
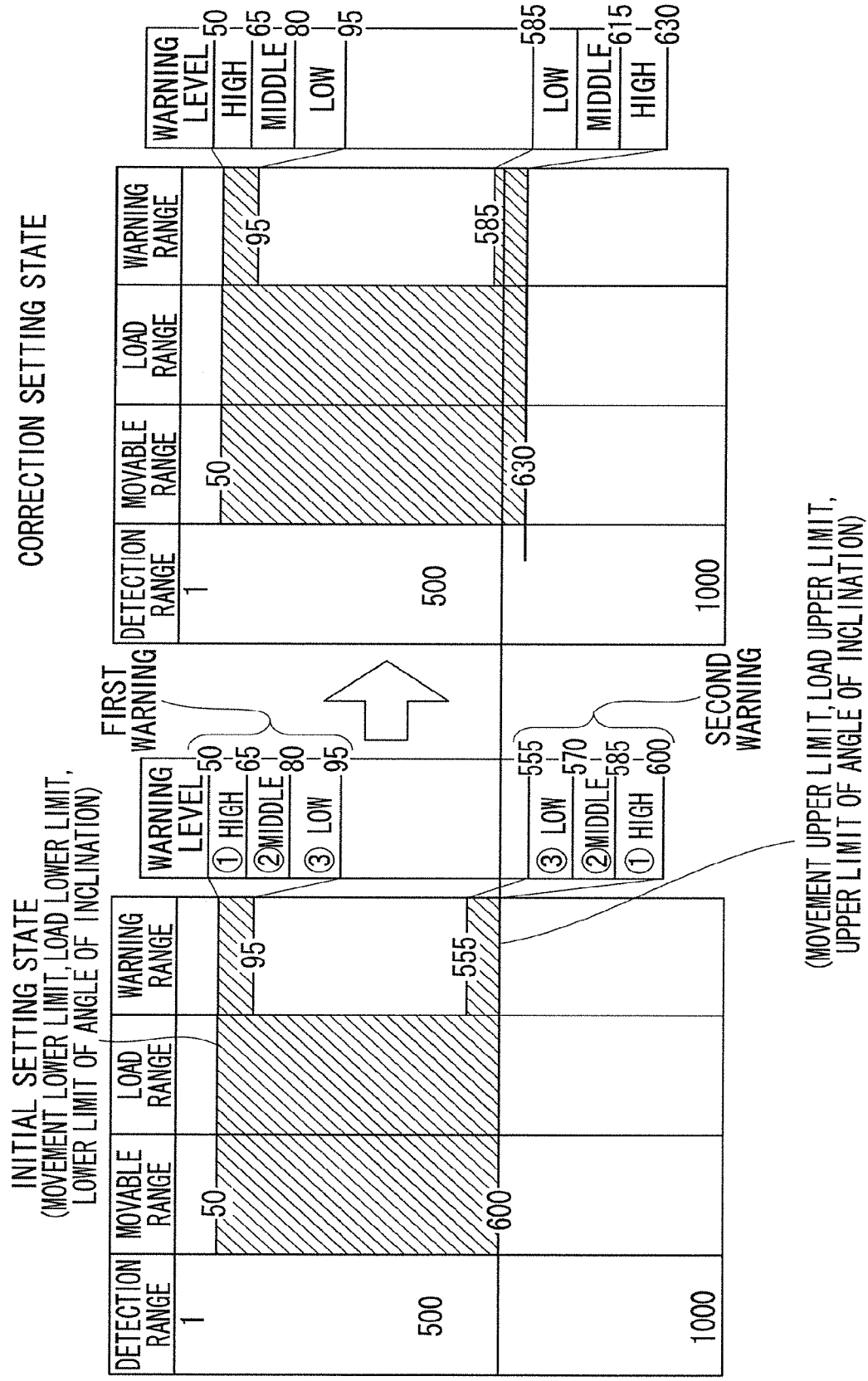
FIG. 68 is a first illustration of an inclination angle table.

The terminal controller 630 is programmed to execute the processes (a1) to (a3). In the process (a1), the control lever 603 is rotated by the supporting mechanism 6200 at a predetermined reset timing, the upper limit of the angle of inclination and the lower limit of the angle of inclination of the movable range are detected by the inclination detection mechanism 600a, and the upper limit of the angle of inclination and the lower limit of the angle of inclination are stored in the storage unit (inclination angle table) as the upper limit and the lower limit of the movable range. With this, as shown in FIG. 68, the process (a1) arranges the inclination angle table in the initial setting state. For example, a movable range field of the inclination angle table is arranged so that the initial movable range is set between the movement lower limit "50" and the movement upper limit "600".

Figure 67:
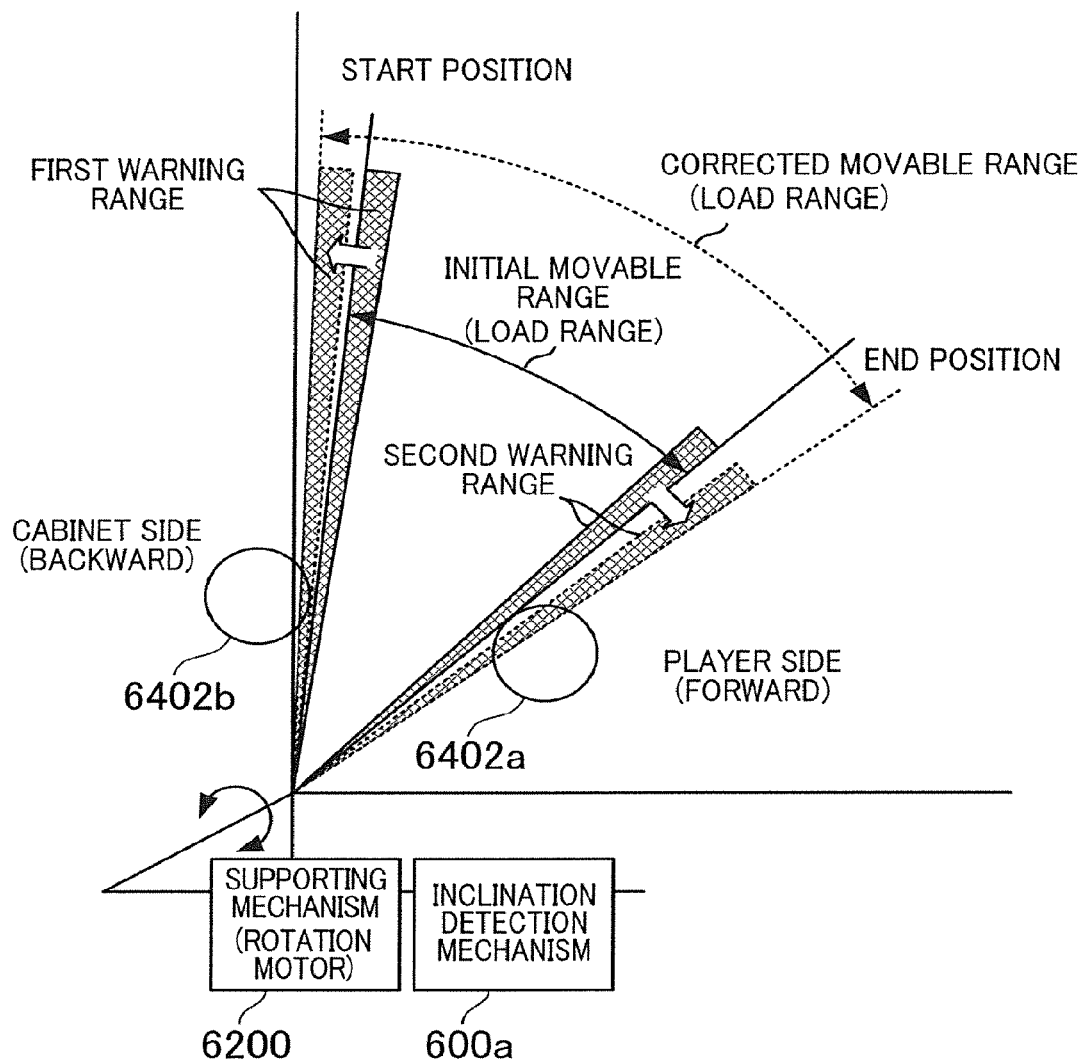
FIG. 67 illustrates the initial setting and the state of update of the control lever.

In this connection, in the present embodiment, the initial setting of the upper limit of the angle of inclination and the lower limit of the angle of inclination of the movable range is performed by causing the control lever 603 to contact restriction members 6402b and 6402a (see FIG. 67). More specifically, the upper limit of the angle of inclination of the movable range is set with the assumption that a lever position of the control lever 603 when the control lever 603 is rotated backward (toward the cabinet) and stops the movement as it contacts the restriction member 6402b provided at the back is the start position. On the other hand, the lower limit of the angle of inclination of the movable range is set with the assumption that a lever position of the control lever 603 when the control lever 603 is rotated forward (toward the player) and stops the movement as it contacts the restriction member 6402a provided at the front is the end position.

In the process (a2), as shown in FIG. 67, the angle of inclination of the control lever 603 is detected when the control lever 603 is rotated by the player while a game is being run. In the process (a3), whether the angle of inclination detected in (a2) falls within the movable range stored in the storage unit is determined. If the angle is larger than the movable range, the upper limit of the angle of inclination is updated with the angle of inclination. If the angle is smaller than the movable range, the lower limit of the angle of inclination is updated with the angle of inclination. It is noted that the "game" includes all kinds of games such as a basic game and a common game.

In this way, as shown in FIG. 68, the process (a2) and the process (a3) set the inclination angle table at a correction setting state. For example, when the angle of inclination of the control lever 603 is "630", the movable range field of the inclination angle table is updated so that the movable range is set at the movement lower limit "50" to the movement upper limit "630". In other words, as shown in FIG. 67, the movable range of the control lever 603 is changed from the initial movable range to an updated movable range.

According to the arrangement above, because the movable range of the control lever 603 is changed in accordance with the player's operation, the gaming terminal 10 is able to optimize, during the game play, the movable range based on the player-side conditions such as the player's play style, physical constitution, and muscle strength and the gaming-terminal-side conditions indicating the individual specificity of each gaming terminal 10 such as the deformation of components over time, dimensional variations of the components, and assembly errors. As a result, various processes based on the movable range of the control lever 603, e.g., issuing a warning against excessive operations at a suitable timing or at a suitable angle of inclination (lever position) of the control lever 603.

In addition to the above, the gaming terminal 10 is arranged to issue a warning when the operation of the control lever 603 is close to the upper limit or the lower limit of the movable range. More specifically, the terminal controller 630 is programmed to execute the process (a4). In the process (a4), as shown in FIG. 68, when the angle of inclination detected in (a2) falls within the first warning range, the upper limit of which is the upper limit of the angle of inclination (movement upper limit) of the movable range stored in the storage unit, or within the second warning range, the lower limit of which is the lower limit of the angle of inclination (movement lower limit) of the movable range stored in the storage unit, a warning is issued to the player by notification by means of the notification unit. This allows the gaming terminal 10 to issue a warning against an excessive operation of the control lever 603 close to the limit of the movable range.

Figure 70:
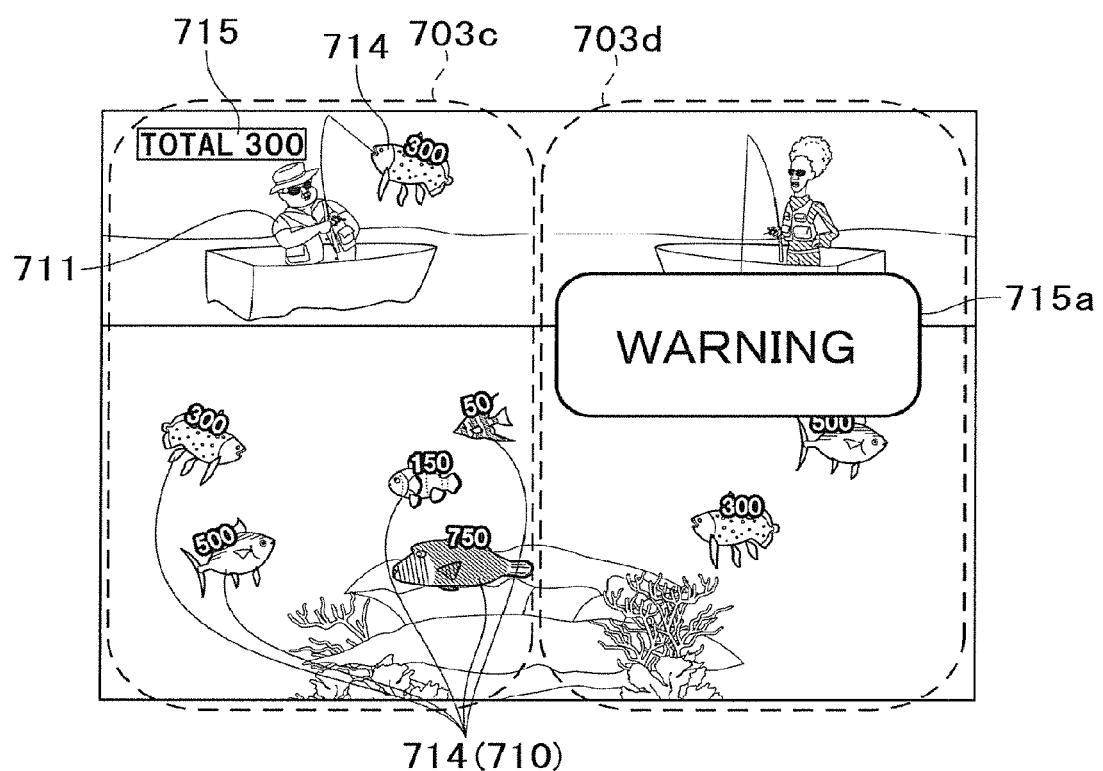
FIG. 70 illustrates a first warning image.
Figure 71:
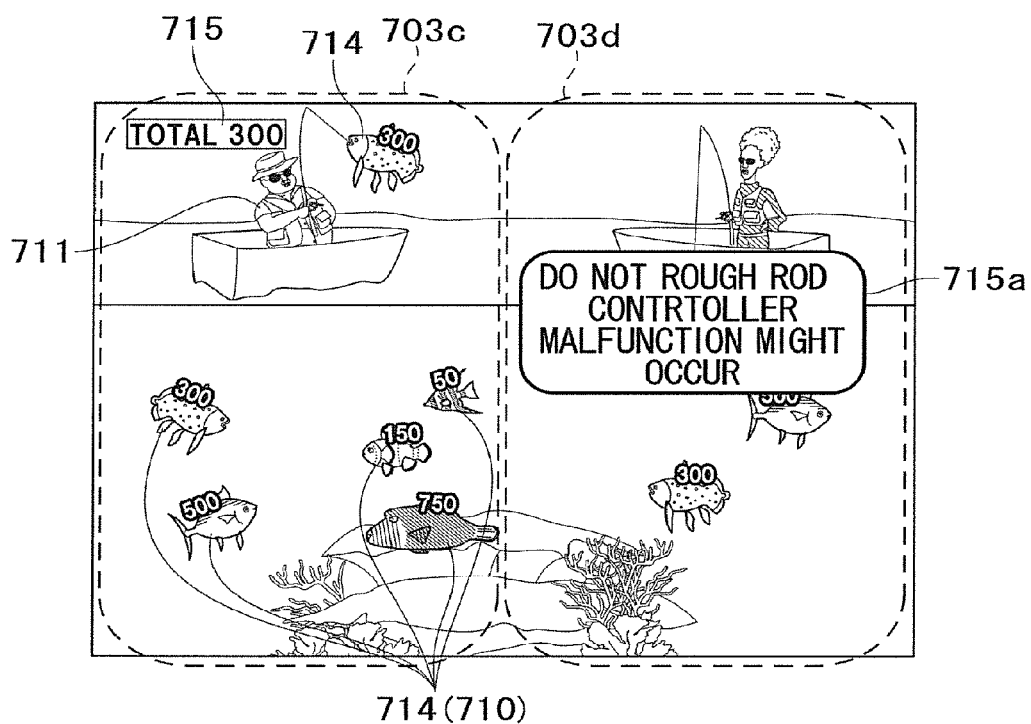
FIG. 71 illustrates a second warning image.

Details of the warning will be given. As shown in FIG. 70, to begin with, a first warning image 715a "WARNING" is displayed on the display screen. Thereafter, as shown in FIG. 71, the first warning image is switched to a second warning image 715b "Do not rough rod controller Malfunction might occur". At the same time as the display of the second warning image 715b, the content of the second warning image 715b is read aloud by sound.

In addition to the above, the gaming terminal 10 is arranged to change the warning level in stages at the time of the operation of the control lever 603. More specifically, in (a4), the terminal controller 630 divides at least one of the first warning range and the second warning range into two or more (e.g., three) areas, and the warning content (sound, audio, text information, or the like) indicating the warning level for the player is changed in accordance with each area. More specifically, the volume of the sound is changed in stages when the content of the second warning image 715b is output as sound. It is noted that a warning may be linearly changed. This allows the player at the gaming terminal 10 to understand to what extent the operation is excessive, through the warning contents notified to the player. It is therefore possible to prevent the control lever 603 from being broken, without taking away the enthusiasms of the player toward the game.

In addition to the above, the gaming terminal 10 is arranged so that the warning level is increased in stages. More specifically, in (a4), the terminal controller 630 increases the warning level (sound volume, musical pitch, light amount, light color, output intervals, etc.) of the warning contents as the plural areas get close to the upper limit of the first warning range or the lower limit of the second warning range. This allows the player at the gaming terminal 10 to instinctively understand to what extent the operation is excessive, through the increase in the warning level notified to the player.

In addition to the above, the gaming terminal 10 is arranged to invalidate the game when the control lever 603 is excessively operated. More specifically, if in (a4) the warning level is at the highest, the terminal controller 630 stops the running of the game when a predetermined operation condition is satisfied. For example, when a fishing game is run, an image showing that the fishline is broken may be displayed and the game may be forcibly terminated thereafter. This allows the gaming terminal 10 to prevent damages to the control lever 603 on account of an excessive operation by the player.

It is noted that the "predetermined operation condition" is cases where, for example, an excessive operation is continued for more than a predetermined time such as 16 seconds while a warning has been issued at the maximum warning level and where an excessive operation is repeated for a predetermined number of times such as twice during a predetermined time such as 20 seconds.

The relationship between the warning level and the warning timing may be arranged as below. That is to say, the terminal controller 630 may be programmed to execute the following process (a6). In the process (a6), a warning is issued against the player by the notification by means of the notification unit when the angle of inclination detected in (a2) remains, for a predetermined time, in either the first warning range, the upper limit of which is the upper limit of the angle of inclination of the movable range, or the second warning range the lower limit of which is the lower limit of the angle of inclination of the movable range, or when the angle of inclination is changed to the first warning range or the second warning range for a predetermined number of times within a predetermined time. In such cases, a warning is issued against an excessive operation of the control lever 603 close to the limit of the movable range.

Furthermore, in (a6), the terminal controller 630 may issue a warning to the player by causing the notification unit to display a warning image and produce a warning sound at low volume when the predetermined time is a first predetermined time or when the predetermined number of times is a first predetermined number of times, the terminal controller 630 may issue a warning to the player by causing the notification unit to display a warning image and produce a warning sound at "middle" volume when the predetermined time is a second predetermined time (second predetermined time>first predetermined time) or when the predetermined number of times is a second predetermined number of times (second predetermined number of times>first predetermined number of times), and the terminal controller 630 may issue a warning to the player by causing the notification unit to display a warning image and produce a warning sound at high volume when the predetermined time is at a third predetermined time (third predetermined time>second predetermined time) or when the predetermined number of times is a third predetermined number of times (third predetermined number of times>second predetermined number of times).

The arrangement above allows the player to understand to what extent the operation is excessive, through the warning contents notified to the player. It is therefore possible to prevent the operation device from being broken, without taking away the enthusiasms of the player toward the game.

More specifically, a first warning image 715a and a second warning image 715b shown in FIG. 3 and FIG. 4 are displayed and a warning sound is produced at low volume, when the lever position (angle of inclination) continuously stays at the first warning range or the second warning range for the first predetermined time such as four seconds or when the lever position (angle of inclination) enters the first warning range or the second warning range for the first predetermined number of times such as five times within the predetermined time such as 15 seconds.

In addition to the above, the first warning image 715a and the second warning image 715b shown in FIG. 3 and FIG. 4 are displayed and a warning sound is produced at "middle" volume, when the lever position (angle of inclination) continuously remains in the first warning range or the second warning range for the second predetermined time (second predetermined time>first predetermined time) such as 10 seconds, or when the lever position (angle of inclination) enters the first warning range or the second warning range for a second predetermined number of times (second predetermined number of times>first predetermined number of times) such as 10 times within the predetermined time such as 15 seconds.

In addition to the above, the first warning image 715a and the second warning image 715b shown in FIG. 3 and FIG. 4 are displayed and a warning sound is produced at high volume, when the lever position (angle of inclination) continuously remains in the first warning range or the second warning range for the third predetermined time (third predetermined time>second predetermined time) such as 16 seconds, or when the lever position (angle of inclination) enters the first warning range or the second warning range for the third predetermined number of times (third predetermined number of times>second predetermined number of times) such as 15 times within the predetermined time such as 15 seconds.

With the above-described relationship between the warning level and the warning timing, a warning is issued when an excessive lever operation has continued for a long time or when an excessive lever operation is repeatedly done. As the warning level is changed in accordance with the time and frequency of the excessive lever operation, a warning to the player to refrain from an excessive lever operation is issued in stages.

(Inclination Angle Table)

Figure 69:
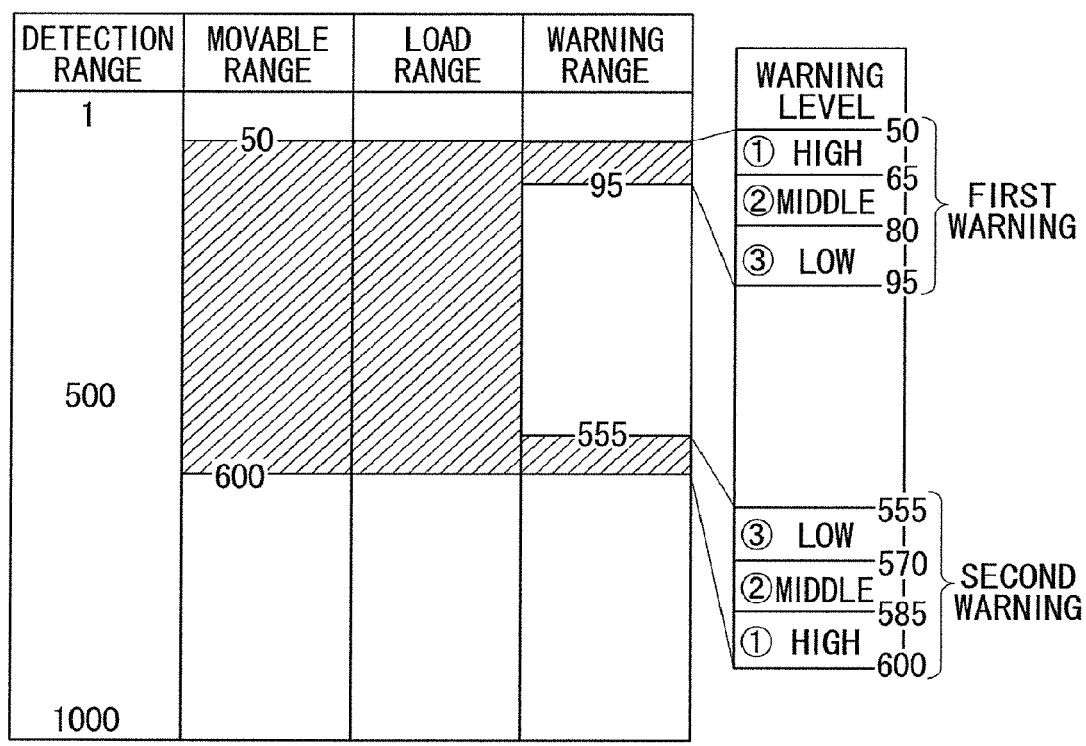
FIG. 69 is a second illustration of an inclination angle table.

As shown in FIG. 69, the inclination angle table has a detection range field, a movable range field, a load range field, and a warning range field. The detection range field stores the maximum range of the angles of inclination detectable by the detecting mechanism 600a. For example, the detection range field stores the angles of inclination from "1" to "1000" in sequence. The angle of inclination is calculated by rounding a detected magnetic force value at each position of the rotated control lever 603 to an integer. The table shown in FIG. 69 indicates that the angle of inclination is detectable with the resolution of "1" to "1000". It is noted that the resolution of the detection of the angle of inclination is easily changed by changing the maximum value in the detection range field. For example, when the maximum value in the detection range field is changed from "1000" to "50", the angle of inclination is detected with the resolution of "1" to "50".

The movable range field specifies the range of the angles of inclination in which the control lever 603 is operable. That is to say, the movable range field specifies, for example, the movable range by assigning "1" to the range corresponding to the angles of inclination from the cabinet-side start position to the player-side end position and assigning "0" to other areas. For example, the table shown in FIG. 69 indicates that the angles of inclination are variable within the range of "50" to "600". When an operation of the control lever 603 exceeds the upper limit or lower limit of the movable range, the movable range is updated so that the exceeded angle of inclination is set as a new upper limit or lower limit of the movable range.

The load range field specifies the range of the angles of inclination in which a load is placed on the control lever 603. That is to say, the load range field specifies, for example, the movable range by assigning "1" to the range of the angles of inclination from the cabinet-side start position to the player-side end position and by assigning "0" to other areas. For example, the table in FIG. 69 indicates that a load is placed when the angle of inclination falls within the range of "50" to "600". While the present embodiment is arranged so that the range of the angles of inclination is identical between the movable range field and the load range field, this arrangement is not prerequisite.

The warning range field specifies the range of the angles of inclination in which a warning is issued to the player and also specifies the range of the angles of inclination for each warning level. That is to say, the warning range field assigns "1" to the low warning level, "2" to the "middle" warning level, "3" to the high warning level, and "0" to the ranges in which no warning is issued.

For example, the table of FIG. 69 assigns the warning level "3" to the range of the angles of inclination "50" to "65", the warning level "2" to the range of the angles of inclination "65" to "80", and the warning level "1" to the range of the angles of inclination "80" to "95". Furthermore, the table assigns the warning level "1" to the range of the angles of inclination "555" to "570", the warning level "2" to the range of the angles of inclination "570" to "585", and the warning level "3" to the range of the angles of inclination "585" to "600". The warning level "0" is assigned to the ranges other than the above.

As such, when the control lever 603 is positioned at the angle of inclination in the start-position-side warning range or the end-position-side warning range, the gaming terminal 10 issues a warning to the player by the warning contents or sound at volume corresponding to each warning level.

(Operation of Gaming Terminal 10: Initial Setting Process Routine)

To update the movable angle of the control lever 603 in accordance with an operation by the player and to execute warning display and game invalidation in accordance with the state of operation of the control lever 603, the gaming terminal 10 of the present embodiment may independently execute a below-described initial setting process routine, correction setting process routine, and warning process routine in parallel. With this, the gaming terminal 10 updates the inclination angle table in response to a player's operation of the control lever 603 and issues a warning to the player. Furthermore, a game is invalidated (terminated) when the control lever 603 is operated in a predetermined operation condition. The following will detail these processes.

Figure 72:
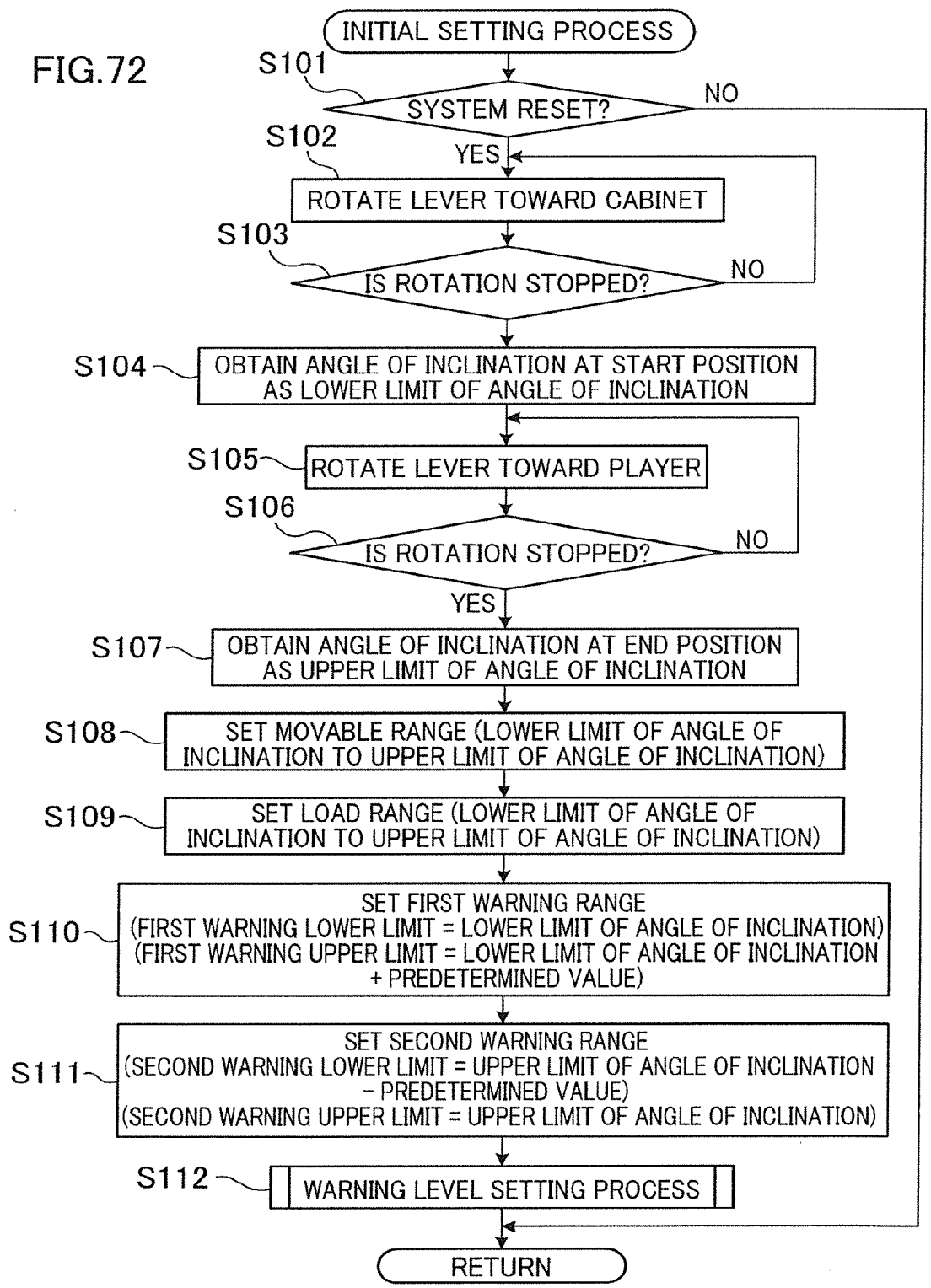
FIG. 72 is a flowchart of an initial setting process.

To begin with, as shown in FIG. 72, whether system reset has been done by powering on the gaming terminal 10 or inputting a system reset signal is determined (S101). If the system reset has not been done (S101: NO), the routine is terminated. On the other hand, when the system reset has been done (S101: YES), as shown in FIG. 1, the control lever 603 is automatically rotated to the cabinet side (S102). As the control lever 603 contacts the restriction member 6402b, whether the control lever 603 has stopped is determined (S103). When the rotation is not stopped (S103: NO), the routine is executed again from S102 and the rotation of the control lever 603 is continued. On the other hand, when the rotation of the control lever 603 is stopped (S103: YES), the angle of inclination at the start position is set as the lower limit of the angle of inclination (S104).

Subsequently, the control lever 603 is automatically rotated to the player side (S105). As the control lever 603 contacts the restriction member 6402a, whether the rotation of the control lever 603 has stopped is determined (S106). When the rotation is not stopped (S103: NO), the routine is executed again from S102 and the rotation of the control lever 603 is continued. On the other hand, when the rotation of the control lever 603 is stopped (S106: YES), the angle of inclination at the start position is set as the upper limit of the angle of inclination (S107).

Thereafter, the movable range area in the inclination angle table of FIG. 68 is arranged so that the lower limit of the angle of inclination and the upper limit of the angle of inclination obtained as above are set as the movement upper limit and the movement lower limit of the movable range (S108). Furthermore, the load range area in the inclination angle table of FIG. 68 is set so that the lower limit of the angle of inclination and the upper limit of the angle of inclination are set as the load upper limit and the load lower limit of the load range (S109). Thereafter, the first warning range is set. More specifically, the lower limit of the angle of inclination is set as the first warning lower limit and the sum of the lower limit of the angle of inclination and a predetermined value is set as the first warning upper limit. By using the first warning upper limit and the first warning lower limit, the first warning range in the inclination angle table of FIG. 68 is set (S110).

Thereafter, the second warning range is set. More specifically, a value calculated by subtracting a predetermined value from the upper limit of the angle of inclination is set as the second warning lower limit and the upper limit of the angle of inclination is set as the second warning upper limit. By using the second warning upper limit and the second warning lower limit, the second warning range in the inclination angle table of FIG. 68 is set (S111). Subsequently, after the execution of the warning level setting process (S112), the routine is terminated.

(Operation of Gaming Terminal 10: Warning Level Setting Process Routine)

Figure 74:
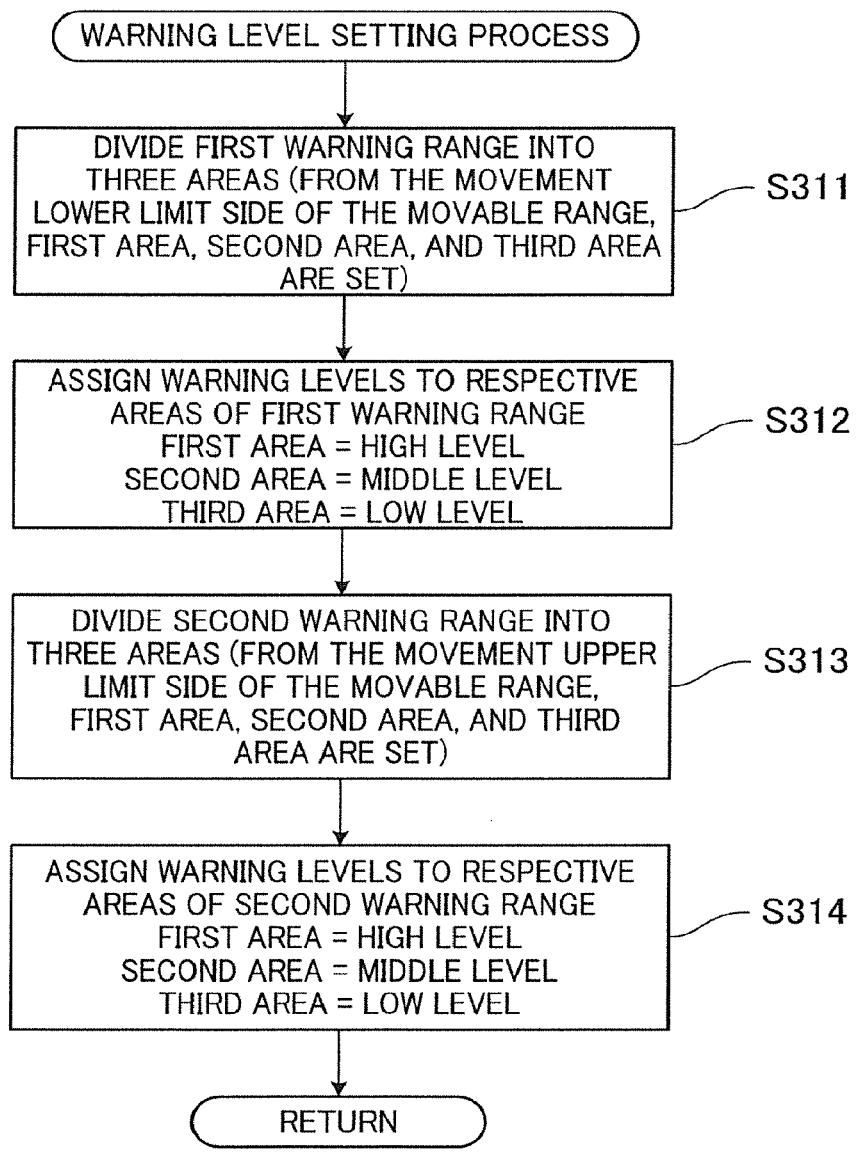
FIG. 74 is a flowchart of a warning level setting process.

In the warning level setting process, each of the first warning range and the second warning range is divided into three areas, and different warning levels are assigned to these areas. More specifically, as shown in FIG. 74, the first warning range is divided into three areas. More specifically, from the movement lower limit side of the movable range, a first area, a second area, and a third area are set (S311). Thereafter, a warning level is assigned to each area of the first warning range. That is to say, a high level is assigned to the first area, a "middle" level is assigned to the second area, and a low level is assigned to the third area (S312).

Thereafter, the second warning range is divided into three areas. More specifically, from the movement upper limit side of the movable range, a first area, a second area, and a third area are set (S313). Thereafter, a warning level is assigned to each area of the first warning range. That is to say, a high level is assigned to the first area, a "middle" level is assigned to the second area, and a low level is assigned to the third area (S314).

(Operation of Gaming Terminal 10: Correction Setting Process Routine)

Figure 73:
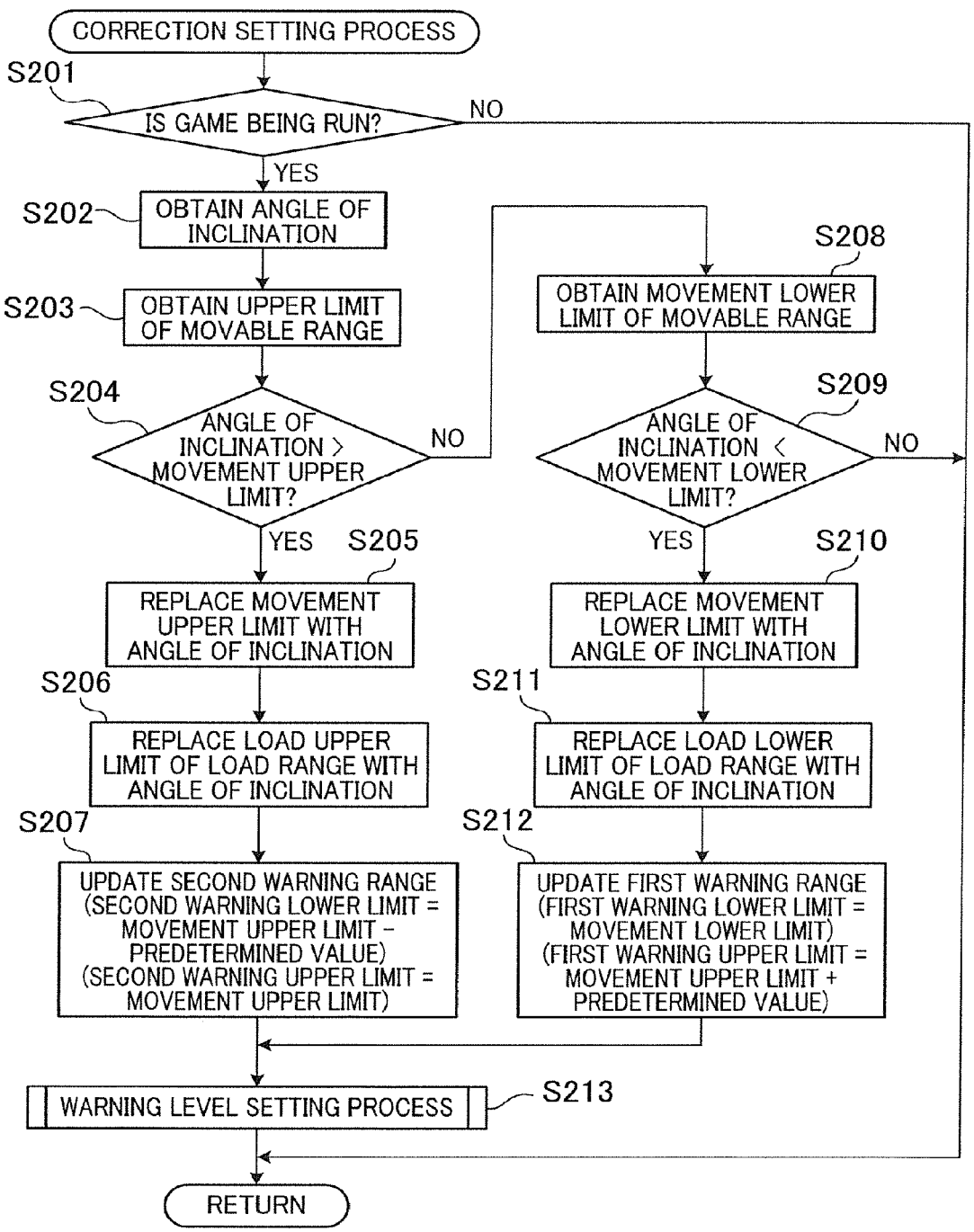
FIG. 73 is a flowchart of a correction setting process.

In the correction setting process, as shown in FIG. 73, whether a game is being run is determined (S201). When no game is being run (S201: NO), the routine is terminated. When a game is being run (S201: YES), the angle of inclination is obtained (S202). Furthermore, the movement upper limit of the movable range is obtained (S203). Furthermore, whether the angle of inclination is larger than the movement upper limit is determined (S204). When the angle of inclination is larger than the movement upper limit (S204: YES), the angle of inclination is set as the movement upper limit (S205). Furthermore, the load upper limit of the load range is replaced with the angle of inclination (S206). Thereafter, the second warning range is updated. That is to say, the second warning lower limit is replaced with a value calculated by subtracting a predetermined value from the movement upper limit and the second warning upper limit is replaced with the movement upper limit (S207). Thereafter, the above-described warning level setting process is executed and a predetermined warning level is assigned to each area (S213), and then the routine is terminated.

On the other hand, when in S204 the angle of inclination is not larger than the movement upper limit (S204: NO), the movement lower limit of the movable range is obtained (S208). Thereafter, whether the angle of inclination is smaller than the movement lower limit is determined (S209). When the angle of inclination is not smaller than the movement lower limit (S209: YES), the routine is terminated. On the other hand, when the angle of inclination is smaller than the movement lower limit (S209: YES), the movement lower limit is replaced with the angle of inclination (S210). Furthermore, the load lower limit of the load range is replaced with the angle of inclination (S211). Furthermore, the first warning range is updated. That is to say, the first warning lower limit is replaced with the movement lower limit and the second warning upper limit is replaced with a value calculated by adding a predetermined value to the movement upper limit (S212). Thereafter, the above-described warning level setting process is executed and a predetermined warning level is assigned to each area (S213), and then the routine is terminated.

(Operation of Gaming Terminal 10: Warning Process Routine)

In the warning process, as shown in FIG. 75, whether a game is being run is determined (S411). When no game is being run (S201: NO), the routine is terminated. When a game is being run (S411: YES), the angle of inclination is obtained (S412). Furthermore, whether the angle of inclination falls within the first warning range is determined (S413). When the angle falls within the first warning range (S413: YES), a warning corresponding to the warning level of each area of the first warning range is issued. That is to say, as shown in FIG. 68 and FIG. 69, in the case of the first area, warning display of the first warning image 715*a* and the second warning image 715*b* and a sound warning at high volume are carried out. In the case of the second area, the warning display and a sound warning at "middle" volume are carried out. In the case of the third area, the warning display and a sound warning at a low volume is carried out (S414).

Thereafter, when the control lever 603 is operated at a predetermined operation condition, the game is invalidated (S417). When the predetermined operation condition is not satisfied, the routine is terminated while the game is continued. It is noted that the "predetermined operation condition" is cases where, for example, an excessive operation is continued for more than a predetermined time such as 16 seconds while a warning has been issued at the maximum warning level and where an excessive operation is repeated for a predetermined number of times such as twice during a predetermined time such as 20 seconds.

If in S413 the angle does not fall within the first warning range (S413: NO), then whether the angle of inclination falls within the second warning range (S415) is determined. When the angle does not fall within the second warning range (S415: NO), the routine is terminated. When the angle falls within the second warning range (S415: YES), a warning corresponding to the warning level of each area of the second warning range is issued. That is to say, in the case of the first area, the warning display and the sound warning at high volume are carried out. In the case of the second area, the warning display and a sound warning at "middle" volume are carried out. In the case of the third area, the warning display and a sound warning at a low volume is carried out (S416). Thereafter, when the control lever 603 is operated at a predetermined operation condition, the game is invalidated (S417). When the predetermined operation condition is not satisfied, the routine is terminated while the game is continued.

(Modifications)

Figure 59:
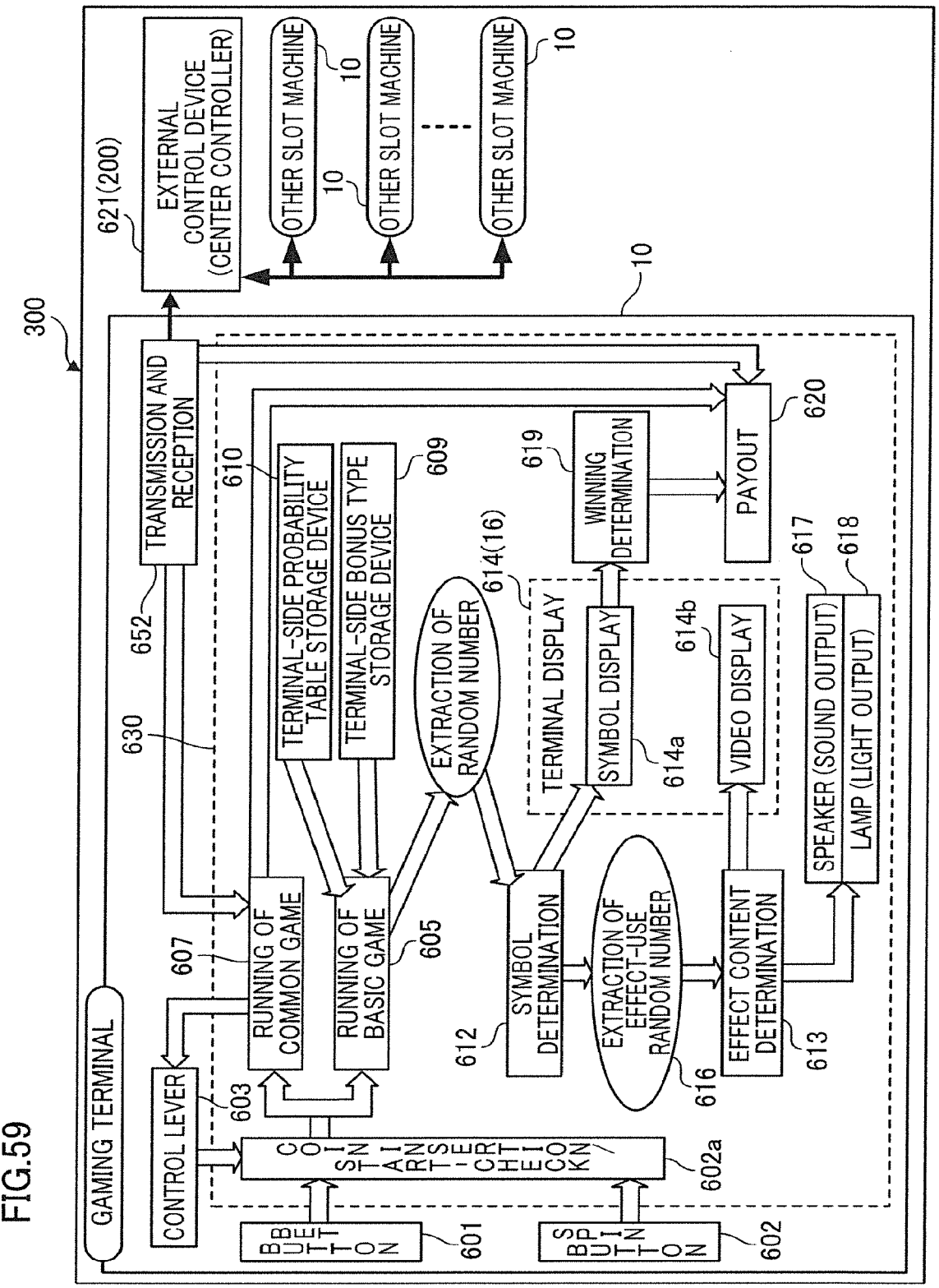
FIG. 59 is a block diagram of a gaming terminal of a modification.

As shown in FIG. 2, the gaming machine 300 of the embodiment above is arranged so that the gaming terminals 10 and the external controller 621 (center controller 200 or the like) connected to be able to exchange data therebetween are able to mutually communicate with each other, as shown in FIG. 59, the external controller 621 (center controller 200 or the like) may not transmit data to the outside and only receive data from the gaming terminals 10 or the like. In this case, the gaming terminals 10 are connected with the external controller 621 (center controller 200 or the like) so that only one-way communication of data from the gaming terminals 10 to the external controller 621 is possible.

In connection with the above, a process in the gaming machine 300 when only one-way communication of data from the gaming terminals 10 to the external controller 621 is possible will be described with reference to the flow of the following modification. In the modification, the matters identical with those of the embodiment above will not be described.

(Terminal-Side Base Game Process Routine According to Modification)

In the embodiment above, the main CPU 41 of the gaming terminal 10 executes the terminal-side base game process routine shown in FIG. 45 when the terminal side initial setting routine shown in FIG. 44 ends. In the modification, a base game proceeds as the main CPU 41 executes a terminal-side base game process routine according to the modification shown in FIG. 60.

The steps C1 to C15 in a terminal-side base game process routine in the modification are identical with the steps C1 to C15 in the terminal-side base game process routine shown in FIG. 45. In the modification, after the terminal-side bonus process in C15, a terminal-side progressive bonus process shown in FIG. 52 is executed. In this case, a process different from the process in the embodiment above is executed in the step L1. More specifically, internal random determination of whether to start the progressive bonus game is conducted, and whether to start the progressive bonus game is determined by this internal random determination (L1). When the progressive bonus game starts (L1: YES), the progressive bonus start effect process is executed as in the step L2 of the embodiment above. When the progressive bonus game does not start (L1: NO), the process is terminated. The other processes are identical with those in the embodiment above.

Figure 53:
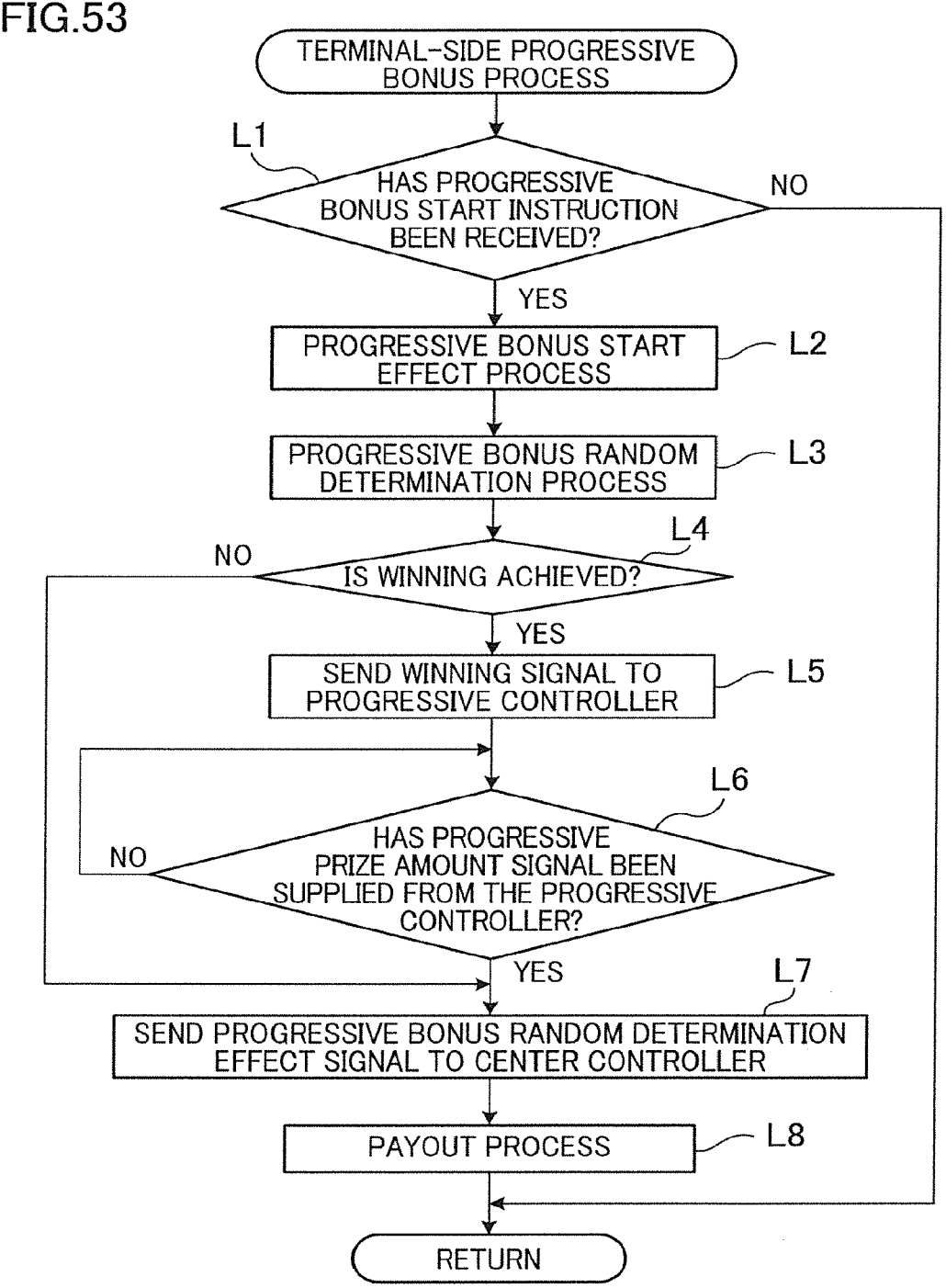
FIG. 53 is a flowchart of a terminal-side progressive bonus process.
Figure 60:
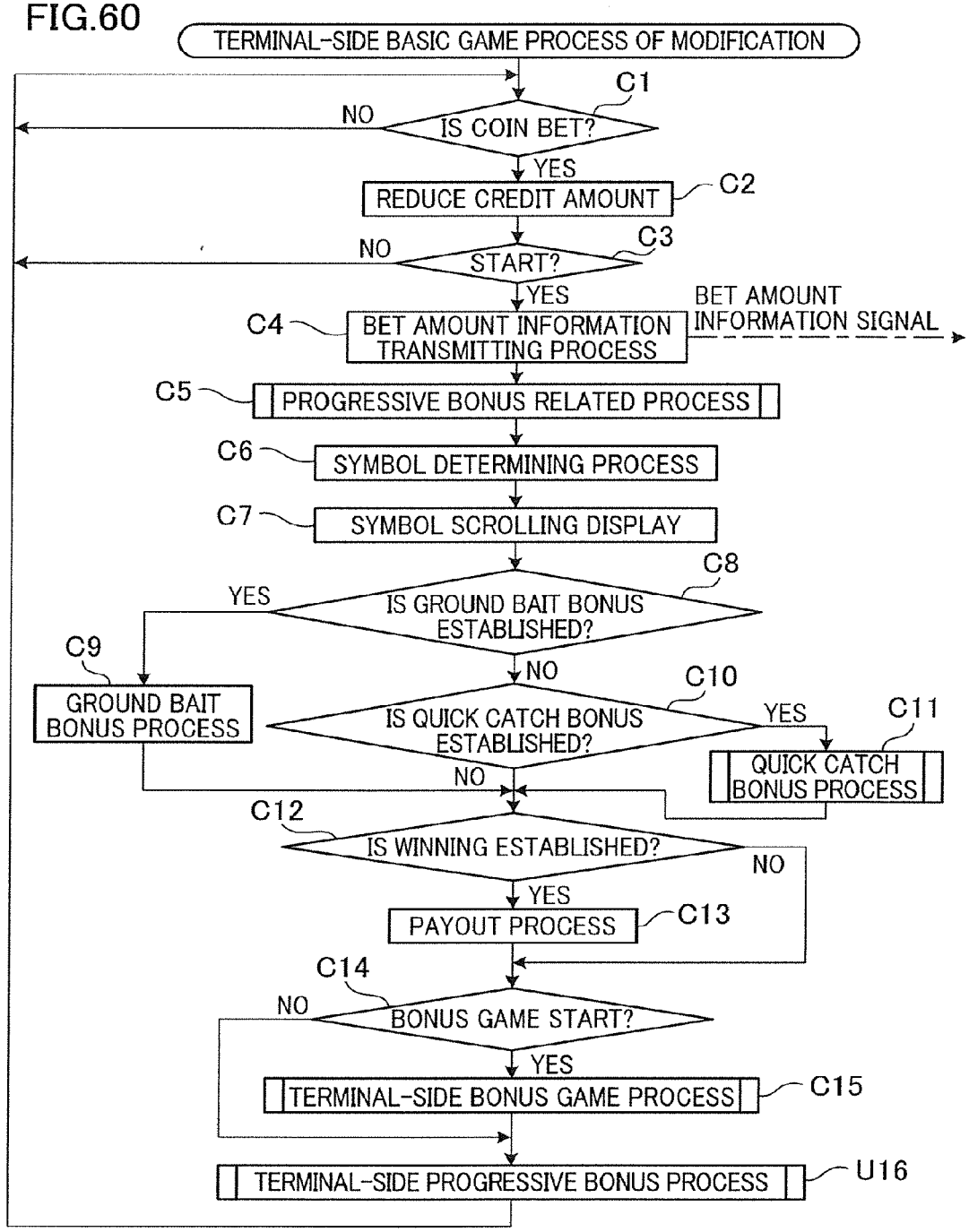
FIG. 60 is a flowchart of a terminal-side base game process of a modification.

Furthermore, as the terminal-side base game process routine of the modification shown in FIG. 60 is executed, the progressive controller 340 executes a progressive controller-side progressive bonus process shown in FIG. 53 whereas the center controller 200 executes a center controller-side progressive bonus process shown in FIG. 54.

As such, in the gaming machine 300 of the modification, as shown in FIG. 54, the center controller 200 only receives a progressive bonus random determination effect signal and executes the above-described effect such as the progressive bonus effect image shown in FIG. 55 on the upper displays 700*a*, 700*b*, and 700*c* of the center controller 200, and does not transmit data to other devices such as the gaming terminal 10.

(Another Embodiment)

Figure 61:
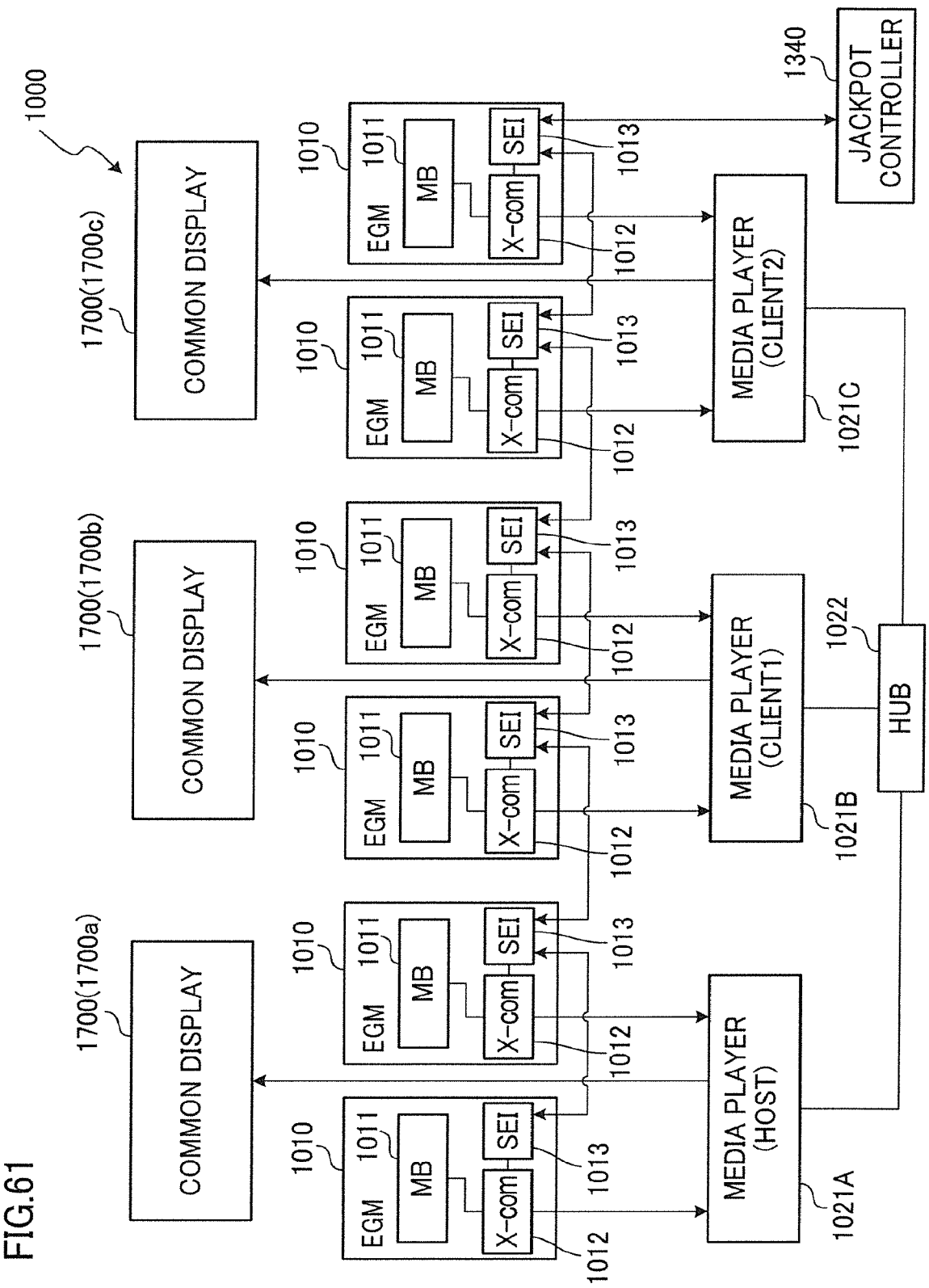
FIG. 61 shows an internal connection layout of a gaming machine of another embodiment.

Now, referring to FIG. 61, the internal connection layout of a gaming machine 1000 of another embodiment, which includes gaming terminals 1010. FIG. 61 shows the gaming machine 1000 including the gaming terminals 1010 according to Another Embodiment of the present invention.

As shown in FIG. 61, the gaming machine 1000 includes six gaming terminals (EGMs (Each Gaming Machines)) 1010, media players 1021A, 1021B, and 1021C (each connected to two gaming terminals 1010), a HUB 1022 connecting the three media players 1021A, 1021B, and 1021C with each other by a LAN cable, a jackpot controller 1340 provided with a RAM, and three common displays 1700 (1700*a*, 1700*b*, and 1700*c*) connected to the respective media players 1021A, 1021B, and 1021C.

The gaming terminal 1010 is identical with the gaming terminal described in the embodiment above, except the inclusion of a motherboard (MB) 1011 on which a CPU is mounted, an X-com board 1012 which is a communication device which allows only one-way communication to the media players 1021A, 1021B, and 1021C corresponding to each gaming terminal 1010, and an SEI (Serial Electric Interface) 1013 which is capable of conducting mutual communication with other gaming terminals 1010 and the jackpot controller 1340. The media player 1021A is able to host the other media players 1021B and 1021C. That is to say, the media players 1021B and 1021C are clients of the media player 1021A. The media players 1021A, 1021B, and 1021C are connected with the respective common displays 1700 (1700*a*, 1700*b*, and 1700*c*) by a monitor cable, and each functions as a center controller for controlling the common display 1700 (1700*a*, 1700*b*, 1700*c*). The jackpot controller 1340 is arranged to be identical with the progressive controller 340 of the embodiment above.

Now, with reference to FIG. 62 to FIG. 65, the following will describe a gaming-terminal-side SEA FISHING BONUS process as the terminal-side bonus game process and a media player process executed at the media players 1021A, 1021B, and 1021C, when the gaming machines 1000 are used and "SEA FISHING BONUS" starts as the bonus game in each gaming terminal 1010 and the media players 1021A, 1021B, and 1021C.

(Gaming-Terminal-Side SEA FISHING BONUS Process)

Figure 62:
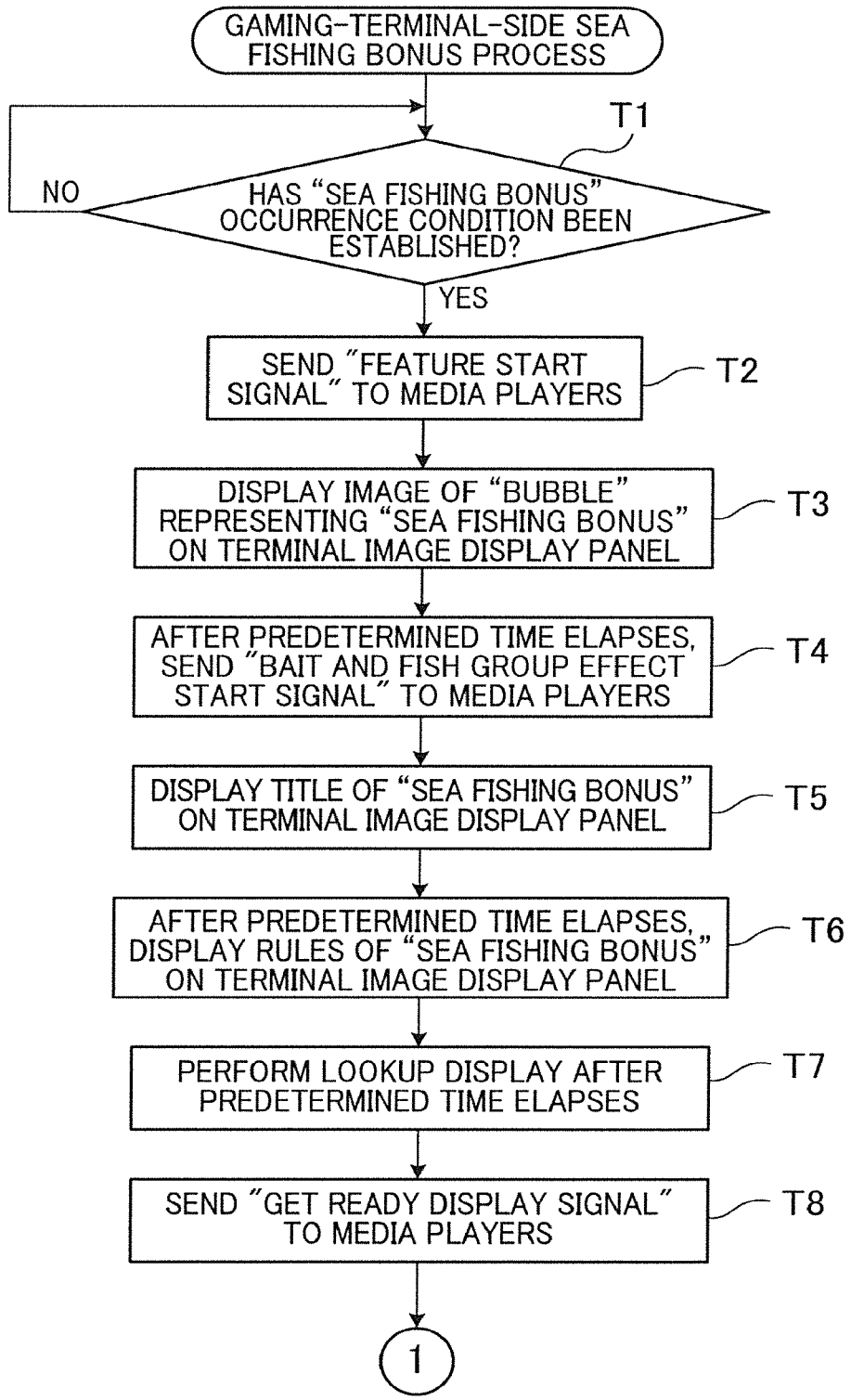
FIG. 62 is a flowchart of a gaming-terminal-side SEA FISHING BONUS process.
Figure 63:
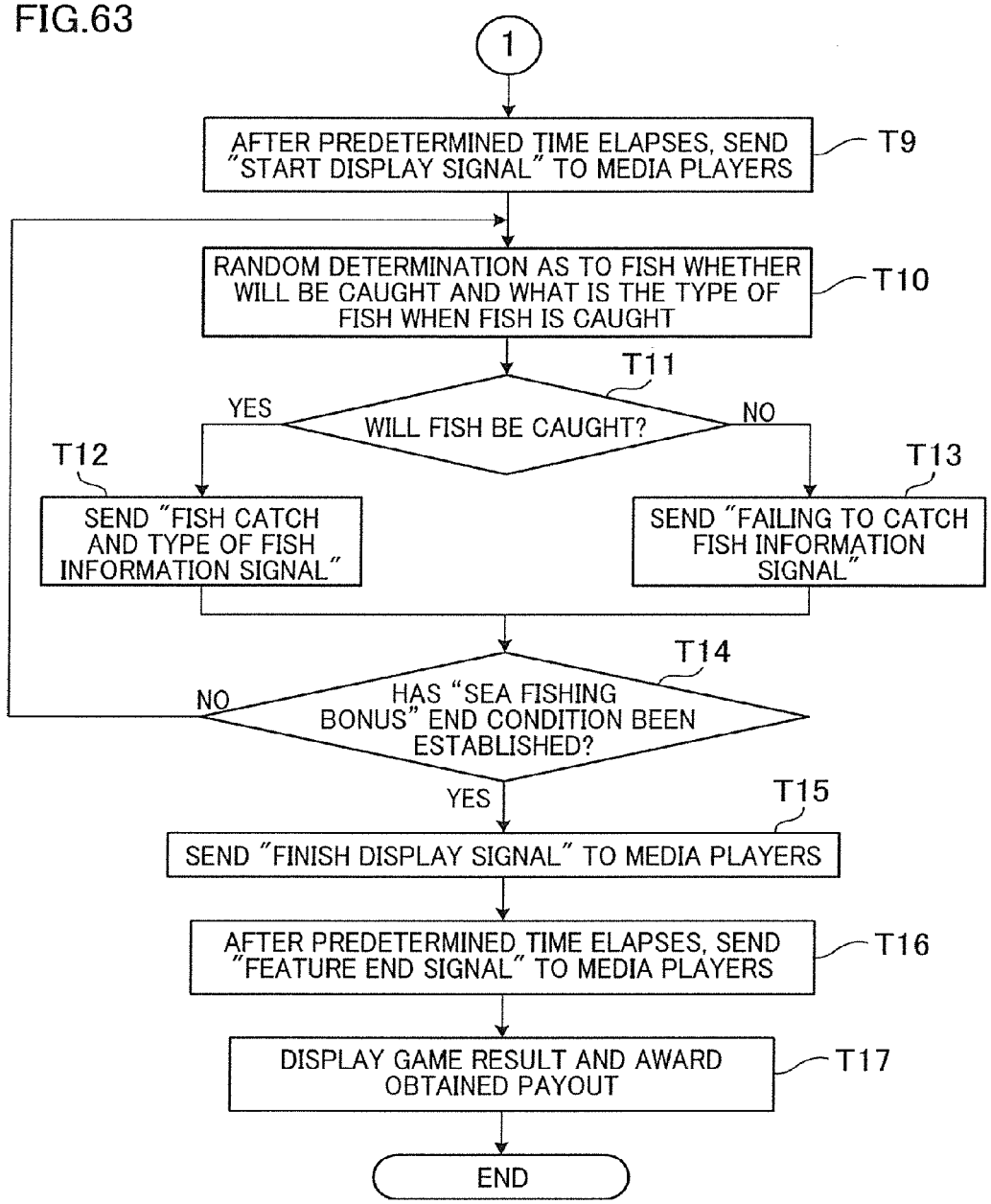
FIG. 63 is a flowchart of the gaming-terminal-side SEA FISHING BONUS process.

When it is determined that the gaming-terminal-side SEA FISHING BONUS process is to be executed as the terminal-side bonus game process, the CPU of the motherboard 1011 executes a gaming-terminal-side SEA FISHING BONUS process routine shown in FIG. 62 and FIG. 63.

As shown in FIG. 62, the CPU of the motherboard 1011 determines whether an occurrence condition of "SEA FISHING BONUS" has been satisfied (T1). More specifically, when three predetermined symbols that trigger the occurrence of "SEA FISHING BONUS" are stopped on the payline L shown in FIG. 20, it is determined that the occurrence condition of the "SEA FISHING BONUS" is satisfied. When the occurrence condition of the "SEA FISHING BONUS" is not satisfied (T1: NO), the motherboard 1011 is on standby.

On the other hand, when the occurrence condition of the "SEA FISHING BONUS" is satisfied (T1: YES), the CPU of the motherboard 1011 sends a "Feature start signal" to the media players 1021A, 1021B, and 1021C of the gaming terminal 1010 which has satisfied the occurrence condition of the "SEA FISHING BONUS" (T2). In so doing, "Feature start signal" is sent by one-way communication from the X-com board 1012 of the gaming terminal 1010 to the corresponding media players 1021A, 1021B, and 1021C.

Subsequently, on the terminal image display panel 16 of the gaming terminal 1010, an image of "Bubble" representing the "SEA FISHING BONUS" is displayed (T3). After a predetermined time elapses, a "bait and fish group effect start signal" is sent to the corresponding media players 1021A, 1021B, and 1021C (T4). In this connection, the "bait and fish group effect start signal" is transmitted in one-way communication from the X-com board 1012 of the gaming terminal 1010 to the corresponding media players 1021A, 1021B, and 1021C.

Thereafter, the title of the "SEA FISHING BONUS" is displayed on the terminal image display panel 16 (T5). After a predetermined time elapses, a signboard describing the rules of the "SEA FISHING BONUS" is displayed on the terminal image display panel 16 (T6). After a predetermined time elapses, the lookup display shown in FIG. 21 is conducted (T7).

Subsequently, a "GET READY display signal" is sent to the corresponding media players 1021A, 1021B, and 1021C (T8). In this regard, the "GET READY display signal" is transmitted in one-way communication from the X-com board 1012 of the gaming terminal 1010 to the corresponding media players 1021A, 1021B, and 1021C.

Subsequently, as shown in FIG. 63, after a predetermined time elapses, a "START display signal" is sent to the corresponding media players 1021A, 1021B, and 1021C (T9). In this regard, the "START display signal" is transmitted in one-way communication from the X-com board 1012 of the gaming terminal 1010 to the corresponding media players 1021A, 1021B, and 1021C.

Thereafter, the CPU of the motherboard 1011 conducts random determination regarding whether in "SEA FISHING BONUS" fish will be caught and what is the type of fish when fish is caught, based on a "SEA FISHING BONUS" random determination table read out from a storage of the gaming terminal 1010 (T10). In the random determination of T10, whether fish is caught is determined (T11).

When fish is caught (T11: YES), a "fish catch and type of fish information signal" is sent to the corresponding media players 1021A, 1021B, and 1021C (T12). In this regard, the "fish catch and type of fish information signal" is transmitted in one-way communication from the X-com board 1012 of the gaming terminal 1010 to the corresponding media players 1021A, 1021B, and 1021C.

On the other hand, when fish is not caught (T11: NO), a "failing to catch fish information signal" is sent to the corresponding media players 1021A, 1021B, and 1021C (T13). In this regard, the "failing to catch fish information signal" is transmitted in one-way communication from the X-com board 1012 of the gaming terminal 1010 to the corresponding media players 1021A, 1021B, and 1021C.

After T12 or T13, the CPU of the motherboard 1011 determines whether a "SEA FISHING BONUS" end condition is satisfied (T14). When the end condition is not satisfied (T14: NO), the process proceeds to the step T10.

On the other hand, when the end condition is satisfied (T14: YES), a "FINISH display signal" is sent to the corresponding media players 1021A, 1021B, and 1021C (T15). In this regard, the "FINISH display signal" is transmitted in one-way communication from the X-com board 1012 of the gaming terminal 1010 to the corresponding media players 1021A, 1021B, and 1021C.

Thereafter, after a predetermined time elapses, a "Feature end signal" is sent to the corresponding media players 1021A, 1021B, and 1021C (T16). In this regard, the "Feature end signal" is transmitted in one-way communication from the X-com board 1012 of the gaming terminal 1010 to the corresponding media players 1021A, 1021B, and 1021C.

Thereafter, the game result of the "SEA FISHING BONUS" is displayed and the obtained payout is awarded to the terminal image display panel 16 (T17). Then the routine is terminated.

(Media Player Process)

Figure 64:
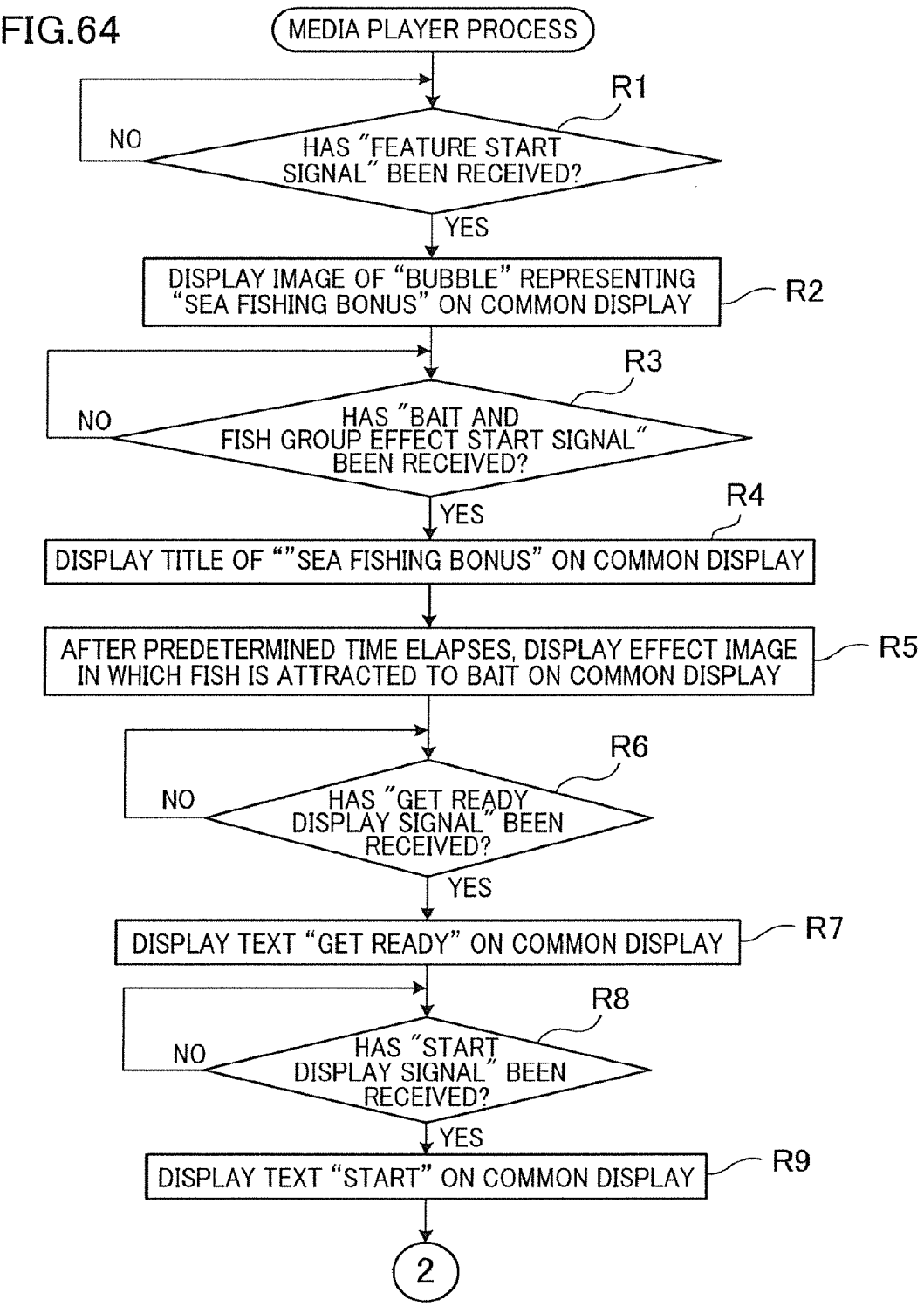
FIG. 64 is a flowchart of a media player process.

To begin with, as shown in FIG. 64, the CPU of each of the media players 1021A, 1021B, and 1021C determines whether the "Feature start signal" has been supplied from the gaming terminal 1010 (R1). When the "Feature start signal" has not been supplied (R1: NO), the "Feature start signal" is waited for.

On the other hand, when the "Feature start signal" has been received (R1: YES), an image of "Bubble" representing the "SEA FISHING BONUS" is displayed on the common display 1700 (R2).

Subsequently, the CPU of each of the media players 1021A, 1021B, and 1021C determines whether the "bait and fish group effect start signal" has been supplied from the gaming terminal 1010 (R3). When the "bait and fish group effect start signal" has not been supplied (R3: NO), the "bait and fish group effect start signal" is waited for.

On the other hand, when the "bait and fish group effect start signal" has been supplied (R3: YES), the title of the "SEA FISHING BONUS" is displayed on the common display 1700 (R4).

Thereafter, after a predetermined time elapses, an effect image in which the fisher scatters ground bait on the sea and the fish is attracted to the bait is displayed on the common display 1700 (R5).

Subsequently, the CPU of each of the media players 1021A, 1021B, and 1021C determines whether the "GET READY display signal" has been supplied from the gaming terminal 1010 (R6). When the "GET READY display signal" has not been supplied (R6: NO), the "GET READY display signal" is waited for.

On the other hand, when the "GET READY display signal" has been supplied (R6: YES), a text "GET READY" is displayed on the common display 1700 (R7).

Subsequently, the CPU of each of the media players 1021A, 1021B, and 1021C determines whether the "START display signal" has been supplied from the gaming terminal 1010 (R8). When the "START display signal" has not been supplied (R8: NO), the "START display signal" is waited for.

On the other hand, when the "START display signal" has been supplied (R8: YES), a text "START" is displayed on the common display 1700 (R9).

Figure 65:
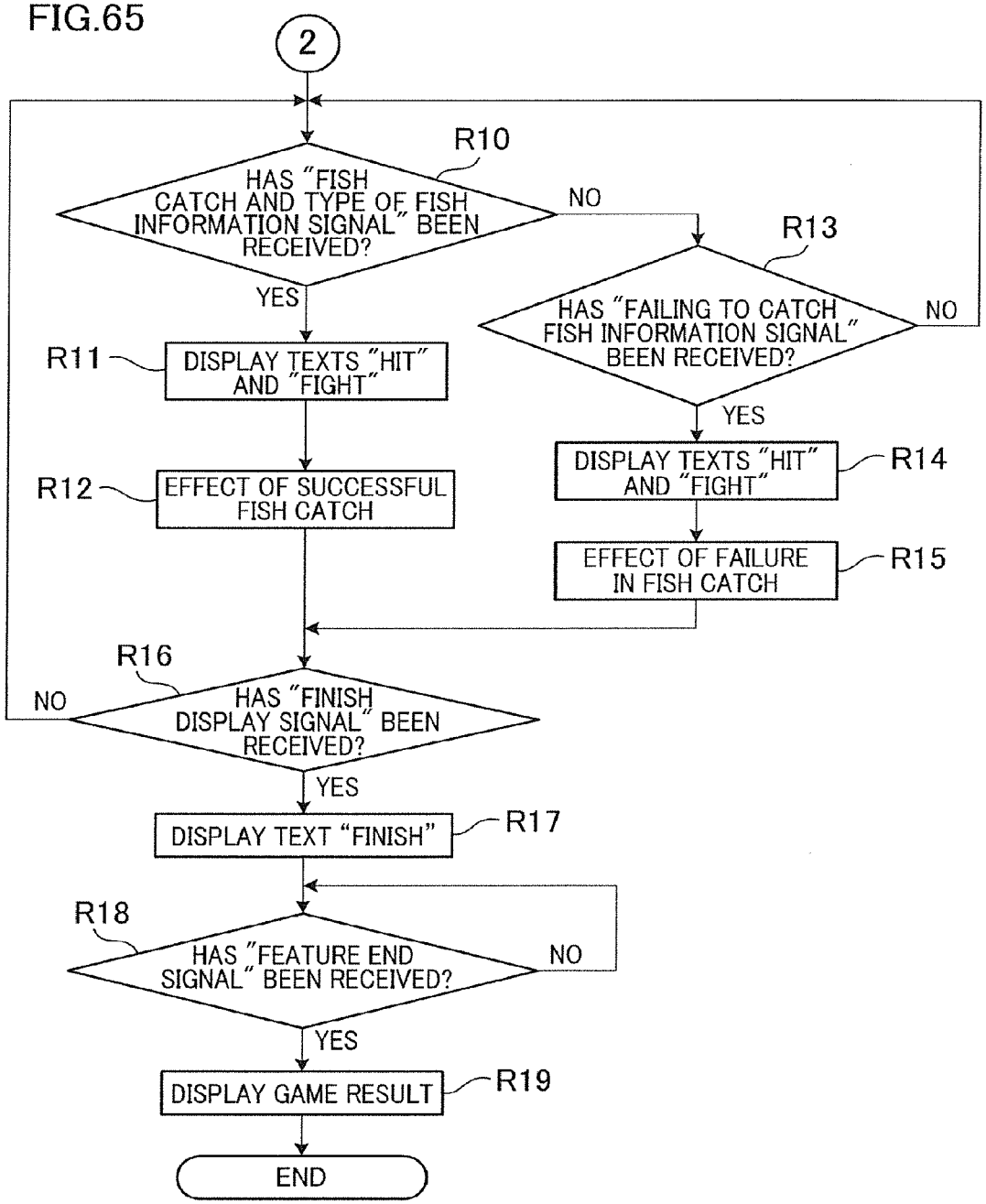
FIG. 65 is a flowchart of the media player process.

Subsequently, as shown in FIG. 65, the CPU of each of the media players 1021A, 1021B, and 1021C determines whether the "fish catch and type of fish information signal" has been supplied from the gaming terminal 1010 (R10). When the "fish catch and type of fish information signal" has been supplied (R10: YES), texts "HIT" and "FIGHT" are displayed on the common display 1700 (R11). Thereafter, an effect image in which fish is caught is displayed on the common display 1700 (R12). Then an effect image in which the fishing rod is cast is displayed on the common display 1700.

In the meanwhile, when the "fish catch and type of fish information signal" has not been supplied (R10: NO), the CPU of each of the media players 1021A, 1021B, and 1021C determines whether the "failing to catch fish information signal" has been supplied from the gaming terminal 1010 (R13). When the "failing to catch fish information signal" has not been supplied (R13: NO), the process goes back to the step R10. On the other hand, when the "failing to catch fish information signal" has been supplied (R13: YES), texts "HIT" and "FIGHT" are displayed on the common display 1700 (R14). The time from the start of "HIT" to the end of "FIGHT" varies in accordance with the type of fish caught. Then, an effect image indicating that no fish is caught is displayed on the common display 1700 (R15). Thereafter, an effect image in which the fishing rod is cast is displayed on the common display 1700.

After R12 or R15, the CPU of each of the media players 1021A, 1021B, and 1021C determines whether the "FINISH display signal" has been supplied from the gaming terminal 1010 (R16). When the "FINISH display signal" has not been supplied (R16: NO), the process goes back to the step R10.

On the other hand, when the "FINISH display signal" has been supplied (R16: YES), a text "FINISH" is displayed on the common display 1700 (R17).

Subsequently, the CPU of each of the media players 1021A, 1021B, and 1021C determines whether the "Feature end signal" has been supplied from the gaming terminal 1010 (R18). When the "Feature end signal" has not been supplied (R18: NO), the "Feature end signal" is waited for.

On the other hand, when the "Feature end signal" has been supplied (R18: YES), a game result of the "SEA FISHING BONUS" is displayed on the common display 1700 (R19). The routine is then terminated.

The gaming machine 1000 of the another embodiment has been described as above. In the gaming machine 1000, while each gaming terminal 1010 is connected with the jackpot controller 1340 via a SEI 1013 to be able to communicate with each other, each gaming terminal 1010 is connected with the corresponding media players 1021A, 1021B, and 1021C via the X-com board 1012 such that only one-way communication from the gaming terminal 1010 to the media players 1021A, 1021B, and 1021C is allowed. It is therefore impossible to send any information signal from the media players 1021A, 1021B, and 1021C to each gaming terminal 1010.

In addition to the above, in the gaming machine 1000, transmitting a signal instructing the media players 1021A, 1021B, and 1021C to start an instructed content at a timing (predetermined timing) of, for example, starting an effect such as an image to be displayed on the terminal image display panel 16 of the gaming terminal 1010, effect sound generated in the gaming terminal 1010, and vibration of the control lever 603 by which the fishing rod is operated, a visual effect at the common display 1700 executed by the media players 1021A, 1021B, and 1021C receiving the signal is synchronized with an effect at the gaming terminal 1010 (e.g., an image to be displayed on the terminal image display panel 16 of the gaming terminal 1010, effect sound generated in the gaming terminal 1010, and vibration of the control lever 603 by which the fishing rod is operated).

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

What is claimed is:

1. A gaming machine configured to allow a normal game to be shifted to a special game, the gaming machine comprising:
a control lever configured and arranged to be gripped by a player;
a display configured to display an effect image; and
a controller,
the control lever including a rotation axis, a reel handle configured to rotate the rotation axis, a rotation sensor configured to detect a number of units of rotation of the rotation axis, and a rotation resistance imparting unit configured to impart rotational resistance to the rotation axis so that a torque is increased in accordance with rotational speed of the rotation axis in one direction,
the controller executing the steps of:
(a1) causing the normal game to be shifted to the special game when a predetermined condition is satisfied;
(a2) in accordance with a game status of the special game, causing the rotation sensor to detect the number of units of rotation of the rotation axis, which is rotated as the reel handle of the control lever is rotated; and
(a3) in accordance with the detected number of units of rotation of the rotation axis, changing an effect content represented by the effect image displayed on the display.

2. The gaming machine according to claim 1, wherein,
the control lever further includes an effect sound generator which is configured to generate sound by causing a gear attached to the rotation axis to contact a flexible plate fixed to the control lever.

3. The gaming machine according to claim 1, wherein,
the control lever further includes a vibration generator configured to vibrate the control lever, and
in accordance with the game status of the special game, the controller executes a step of vibrating the control lever by causing the vibration generator to vibrate.

4. A gaming system in which a normal game is shifted to a common game, the gaming system comprising:
a plurality of gaming terminals each including a control lever configured and arranged to be gripped by a player and a terminal controller;
a common display configured to display a common effect image; and
a center controller,
the control lever including a rotation axis, a reel handle configured to rotate the rotation axis, a rotation sensor configured to detect a number of units of rotation of the rotation axis, and a rotation resistance imparting unit configured to impart rotational resistance to the rotation axis such that torque increases in accordance with rotational speed of the rotation axis in one direction,
the center controller executing the steps of:
(b1) when a predetermined condition is satisfied, executing the common game in which the gaming terminals are synchronized;
(b2) sending a common game start instruction to the gaming terminals at which the common game is executed; and
(b3) when information regarding the number of units of rotation of the rotation axis is supplied, changing an effect content represented by the common effect image displayed on the common display, in accordance with the number of units of rotation of the rotation axis, and
the terminal controller executing the steps of:
(c1) causing the normal game to be shifted to the common game when the common game start instruction is supplied;
(c2) in accordance with a game status of the common game, causing the rotation sensor to detect the number of units of rotation of the rotation axis, which is rotated as the reel handle of the control lever is rotated; and
(c3) sending the information regarding the number of units of rotation of the rotation axis to the center controller.

5. The gaming machine according to claim 2, wherein,
the control lever further includes a vibration generator configured to vibrate the control lever, and
in accordance with the game status of the special game, the controller executes a step of vibrating the control lever by causing the vibration generator to vibrate.

* * * * *